United States Patent
VanDeRiet et al.

(10) Patent No.: US 7,931,257 B2
(45) Date of Patent: Apr. 26, 2011

(54) MULTILAYER LOAD BEARING STRUCTURE

(75) Inventors: Douglas M. VanDeRiet, Holland, MI (US); Christopher C. Hill, Holland, MI (US); Andrew J. Kurrasch, Saugatuck, MI (US); John F. Aldrich, Grandville, MI (US); Timothy Hoogland, Zeeland, MI (US); Jeffrey A. Weber, Minneapolis, MN (US); Jason Holt, Minneapolis, MN (US); Ryan S. Brill, Allendale, MI (US)

(73) Assignee: Herman Miller, Inc., Zeeland, MI (US)

( * ) Notice: Subject to any disclaimer, the term of this patent is extended or adjusted under 35 U.S.C. 154(b) by 347 days.

(21) Appl. No.: 11/645,234

(22) Filed: Dec. 21, 2006

(65) Prior Publication Data

US 2007/0246873 A1  Oct. 25, 2007

Related U.S. Application Data

(63) Continuation of application No. 10/972,153, filed on Oct. 22, 2004.

(60) Provisional application No. 60/513,775, filed on Oct. 23, 2003, provisional application No. 60/599,201, filed on Aug. 5, 2004.

(51) Int. Cl.
*A47C 27/00* (2006.01)
*F16F 3/00* (2006.01)

(52) U.S. Cl. ............... 267/142; 267/80; 267/84

(58) Field of Classification Search ............ 267/80, 267/81, 91, 130, 131, 133, 153, 142–146, 267/83–85, 93–95, 102–106; 5/653, 722, 5/723; 248/620, 621; 297/452.5
See application file for complete search history.

(56) References Cited

U.S. PATENT DOCUMENTS

| | | | |
|---|---|---|---|
| 1,982,516 A | 11/1934 | Holmested | |
| 2,233,592 A | 3/1941 | Dunajeff | |
| 2,433,012 A * | 12/1947 | Zalicovitz | 5/247 |
| 2,549,902 A | 4/1951 | Hibbard et al. | |
| 2,897,879 A | 8/1959 | Brown et al. | |
| 3,081,129 A | 3/1963 | Ridder | |
| 3,126,554 A | 3/1964 | Janapol | |
| 3,174,741 A | 3/1965 | Wolff | |
| 3,198,578 A | 8/1965 | Geoffrey et al. | |
| 3,233,885 A | 2/1966 | Propst | |

(Continued)

FOREIGN PATENT DOCUMENTS

BE  628357 A  5/1963

(Continued)

OTHER PUBLICATIONS

"SKYDEX Smarter Cushioning," SKYDEX Technologies, Inc., http://www.skydex.com/technology.htm, 2002, 1 page.

(Continued)

*Primary Examiner* — Robert A Siconolfi
*Assistant Examiner* — Vu Q Nguyen
(74) *Attorney, Agent, or Firm* — Brinks Hofer Gilson & Lione

(57) ABSTRACT

Support elements and support structures form the basis of ergonomic body supports for chairs, mattresses and other structures. The support elements may be individually designed according to their location and body support function. Thus, the structures that include the support elements may provide point-tailored support for any part of the body to enhance comfort, fit, and proper anatomical support.

24 Claims, 51 Drawing Sheets

U.S. PATENT DOCUMENTS

| | | | |
|---|---|---|---|
| 3,242,512 A | 3/1966 | Beckman |
| 3,251,077 A | 5/1966 | Beckman |
| 3,255,470 A | 6/1966 | Knittel et al. |
| 3,261,037 A | 7/1966 | Cermak et al. |
| 3,262,137 A | 7/1966 | Beckman et al. |
| 3,262,138 A | 7/1966 | Knittel |
| 3,263,247 A | 8/1966 | Knittel et al. |
| 3,276,048 A | 10/1966 | Beckman |
| 3,280,410 A | 10/1966 | Propst et al. |
| 3,340,548 A | 9/1967 | Janapol |
| 3,393,012 A | 7/1968 | Chancellor, Jr. |
| 3,398,012 A | 8/1968 | Parkes et al. |
| 3,559,978 A | 2/1971 | Molt |
| 3,591,876 A | 7/1971 | Swindlehurst |
| 3,633,228 A | 1/1972 | Zysman |
| 3,681,797 A | 8/1972 | Messner |
| 3,767,261 A | 10/1973 | Rowland |
| 3,774,967 A | 11/1973 | Rowland |
| 3,790,150 A | 2/1974 | Lippert |
| 3,806,576 A | 4/1974 | Richardson et al. |
| 3,843,477 A | 10/1974 | Rowland |
| 3,889,302 A | 6/1975 | Ketterer et al. |
| 3,940,811 A | 3/1976 | Tomikawa et al. |
| 3,999,234 A | 12/1976 | Regan |
| 4,033,567 A | 7/1977 | Lipfert |
| 4,036,526 A | 7/1977 | Baechle et al. |
| 4,190,914 A | 3/1980 | Diallo |
| 4,283,864 A | 8/1981 | Lipfert |
| 4,286,344 A * | 9/1981 | Ikeda ............................ 5/717 |
| 4,367,897 A | 1/1983 | Cousins |
| 4,383,342 A | 5/1983 | Forster |
| 4,399,574 A | 8/1983 | Shuman |
| 4,415,147 A | 11/1983 | Biscoe et al. |
| 4,509,510 A | 4/1985 | Hook |
| 4,559,656 A | 12/1985 | Foster |
| 4,605,582 A | 8/1986 | Sias et al. |
| 4,644,593 A | 2/1987 | O'Brien |
| 4,673,605 A | 6/1987 | Sias et al. |
| 4,686,724 A | 8/1987 | Bedford |
| 4,713,854 A | 12/1987 | Graebe |
| 4,744,351 A | 5/1988 | Grundei et al. |
| 4,809,374 A | 3/1989 | Saviez |
| 4,826,249 A | 5/1989 | Bradbury |
| 4,890,235 A | 12/1989 | Reger et al. |
| 4,972,351 A | 11/1990 | Reger et al. |
| 4,980,936 A | 1/1991 | Frickland et al. |
| 5,025,519 A | 6/1991 | Spann et al. |
| 5,105,488 A | 4/1992 | Hutchinson et al. |
| 5,153,956 A | 10/1992 | Nold |
| 5,163,196 A | 11/1992 | Graebe et al. |
| 5,165,125 A | 11/1992 | Callaway |
| 5,239,715 A | 8/1993 | Wagner |
| 5,316,375 A | 5/1994 | Breen |
| 5,328,245 A | 7/1994 | Marks et al. |
| 5,426,799 A | 6/1995 | Ottiger et al. |
| 5,452,488 A | 9/1995 | Reinhardt |
| 5,459,896 A | 10/1995 | Raburn et al. |
| D368,399 S | 4/1996 | Buffon |
| 5,502,855 A | 4/1996 | Graebe |
| 5,533,220 A | 7/1996 | Sebag et al. |
| 5,558,314 A | 9/1996 | Weinstein |
| 5,558,398 A | 9/1996 | Santos |
| 5,572,804 A | 11/1996 | Skaja et al. |
| 5,588,165 A | 12/1996 | Fromme |
| 5,615,869 A | 4/1997 | Phillips et al. |
| 5,624,161 A | 4/1997 | Sorimachi et al. |
| 5,628,079 A | 5/1997 | Kizemchuk et al. |
| 5,632,473 A | 5/1997 | Dias Magalhaes Queiroz |
| 5,638,565 A | 6/1997 | Pekar |
| 5,720,471 A | 2/1998 | Constantinescu et al. |
| 5,747,140 A | 5/1998 | Heerklotz |
| 5,785,303 A | 7/1998 | Kutschi |
| 5,787,533 A | 8/1998 | Fromme |
| 5,820,573 A | 10/1998 | Ramos |
| 5,975,641 A | 11/1999 | Delesie |
| 5,976,451 A | 11/1999 | Skaja et al. |
| 6,029,962 A | 2/2000 | Shorten et al. |
| 6,052,852 A | 4/2000 | Huang |
| 6,059,368 A | 5/2000 | Stumpf et al. |
| 6,098,313 A | 8/2000 | Skaja |
| 6,101,651 A | 8/2000 | Tang |
| 6,113,082 A | 9/2000 | Fujino |
| 6,134,729 A | 10/2000 | Quintile et al. |
| 6,170,808 B1 | 1/2001 | Kutschi |
| 6,217,121 B1 | 4/2001 | Mollet |
| 6,343,391 B1 | 2/2002 | Le Gette et al. |
| 6,343,394 B1 | 2/2002 | Gandolfi |
| 6,353,953 B1 | 3/2002 | Tanaka et al. |
| 6,382,603 B1 | 5/2002 | Monson et al. |
| 6,406,009 B1 | 6/2002 | Constantinescu et al. |
| 6,425,153 B1 | 7/2002 | Reswick |
| 6,427,990 B1 | 8/2002 | Hartmann |
| 6,477,727 B1 | 11/2002 | Fromme |
| 6,540,950 B1 | 4/2003 | Coffield et al. |
| 6,546,578 B1 | 4/2003 | Steinmeier |
| 6,598,251 B2 | 7/2003 | Habboub et al. |
| 6,663,178 B2 | 12/2003 | Fourrey et al. |
| D486,027 S | 2/2004 | Baxter et al. |
| 6,711,766 B2 * | 3/2004 | Monk et al. ........................ 5/420 |
| 6,726,285 B2 | 4/2004 | Caruso et al. |
| 6,901,617 B2 | 6/2005 | Sprouse, II et al. |
| 6,986,182 B2 | 1/2006 | Mossbeck |
| 7,356,859 B2 | 4/2008 | McCraw |
| 2002/0078509 A1* | 6/2002 | Williams ........................ 5/716 |
| 2002/0106479 A1 | 8/2002 | Coffield et al. |
| 2002/0117885 A1 | 8/2002 | Barile, Jr. et al. |
| 2003/0001424 A1 | 1/2003 | Mundell et al. |
| 2004/0245839 A1 | 12/2004 | Bodnar et al. |
| 2004/0245840 A1 | 12/2004 | Tubergen et al. |
| 2004/0245841 A1 | 12/2004 | Peterson et al. |
| 2005/0116526 A1 | 6/2005 | VanDeRiet et al. |
| 2005/0279591 A1 | 12/2005 | Coffield et al. |
| 2006/0267258 A1 | 11/2006 | Coffield et al. |
| 2006/0286359 A1 | 12/2006 | Coffield et al. |
| 2007/0246873 A1 | 10/2007 | Brill et al. |
| 2007/0262634 A1 | 11/2007 | Brill et al. |
| 2008/0217977 A1 | 9/2008 | Aldrich et al. |
| 2009/0085388 A1 | 4/2009 | Parker et al. |

FOREIGN PATENT DOCUMENTS

| | | |
|---|---|---|
| DE | 9312478 U1 | 10/1993 |
| DE | 297 12 721 U1 | 10/1998 |
| EP | 0 086 578 A2 | 8/1983 |
| EP | 0086578 A2 | 8/1983 |
| EP | 0 111 898 B1 | 12/1983 |
| EP | 0228350 A2 | 7/1987 |
| EP | 0 734 666 B1 | 2/1996 |
| EP | 1034726 A1 | 9/2000 |
| EP | 1046361 A1 | 10/2000 |
| EP | 1057433 A1 | 12/2000 |
| EP | 1 121 880 B1 | 1/2001 |
| EP | 1099397 A1 | 5/2001 |
| EP | 0996349 B1 | 11/2001 |
| EP | 0895739 B1 | 9/2002 |
| EP | 1859768 A | 11/2007 |
| GB | 2 088 206 A | 6/1982 |
| JP | 2000051010 | 2/2000 |
| WO | WO 99/003379 | 1/1999 |
| WO | WO 99/22160 | 5/1999 |
| WO | WO 01/15572 A1 | 3/2001 |
| WO | WO 2005/041719 A2 | 5/2005 |
| WO | WO 2007/131370 | 11/2007 |

OTHER PUBLICATIONS

Nebel, Antonio et al., The Miracles of Science, Presentation Slides, Sep. 2003, 44 pages.
Sitting Machine Photograph, Circa 1987-88, 1 pg.
Lattoflex Bettsystem, Winx 100, Jan. 2001, 16 pages.
Lattoflex Bettsystem, Winx 200, Jan. 2001, 20 pages.
Lattoflex Bettsystem, Winx 300, Jan. 2000, 20 pages.
Frolic website pages, printed Feb. 28, 2002, 52 pages.
Photo, "interlübke" Support System, 1 page, date unknown.
Photo, "UBila," 1 page, date unknown.
Examination Report Under Section 18(3) in International Application No. GB0608532.8, dated Mar. 7, 2007, 3 pages.

Office Action from U.S. Appl. No. 11/433,891, Aug. 28, 2009, 11 pages.
Combined Search Report & Exam Report for Great Britain Application No. 0801934.1, dated Feb. 19, 2008, 3 pages.
International Preliminary Report on Patentability for International Application No. PCT/US2004/034933, dated Mar. 3, 2009, 8 pages.
International Preliminary Report on Patentability for International Application No. PCT/US2007/010625, dated Nov. 17, 2008, 10 pages.
International Search Report and Written Opinion of the International Searching Authority for International Application No. PCT/US2007/010625, dated Aug. 11, 2008, 13 pages.
International Search Report and Written Opinion of the International Searching Authority for International Application No. PCT/US2004/051221, dated May 13, 2008, 13 pages.
Office Action from Canadian Application No. 2542978, dated Jan. 14, 2009, 3 pages.
Office Action from Canadian Application No. 2542978, dated Jan. 25, 2008, 3 pages.
Office Action from Great Britain Application No. 0608532.8, dated Oct. 9, 2007, 1 page.
Office Action from U.S. Appl. No. 10/972,153, dated May 10, 2006, 7 pages.
Office Action from U.S. Appl. No. 10/972,153, dated Nov. 3, 2006, 7 pages.
Office Action from U.S. Appl. No. 10/972,153, dated May 8, 2007, 8 pages.
Office Action from U.S. Appl. No. 10/972,153, dated May 2, 2008, 8 pages.
Office Action from U.S. Appl. No. 10/972,153, dated Nov. 21, 2008, 7 pages.
Office Action from U.S. Appl. No. 11/433,891, dated Aug. 18, 2008, 19 pages.
Office Action from U.S. Appl. No. 11/433,891, dated Apr. 10, 2009, 9 pages.
Office Action from U.S. Appl. No. 11/433,891, dated Aug. 28, 2009, 13 pages.
Office Action from U.S. Appl. No. 11/645,234, dated Jun. 8, 2009, 13 pages.
Office Action from U.S. Appl. No. 11/645,234, dated Dec. 30, 2009, 12 pages.
Notice of Allowance from U.S. Appl. No. 11/433,891, dated Feb. 1, 2010, 6 pages.

* cited by examiner

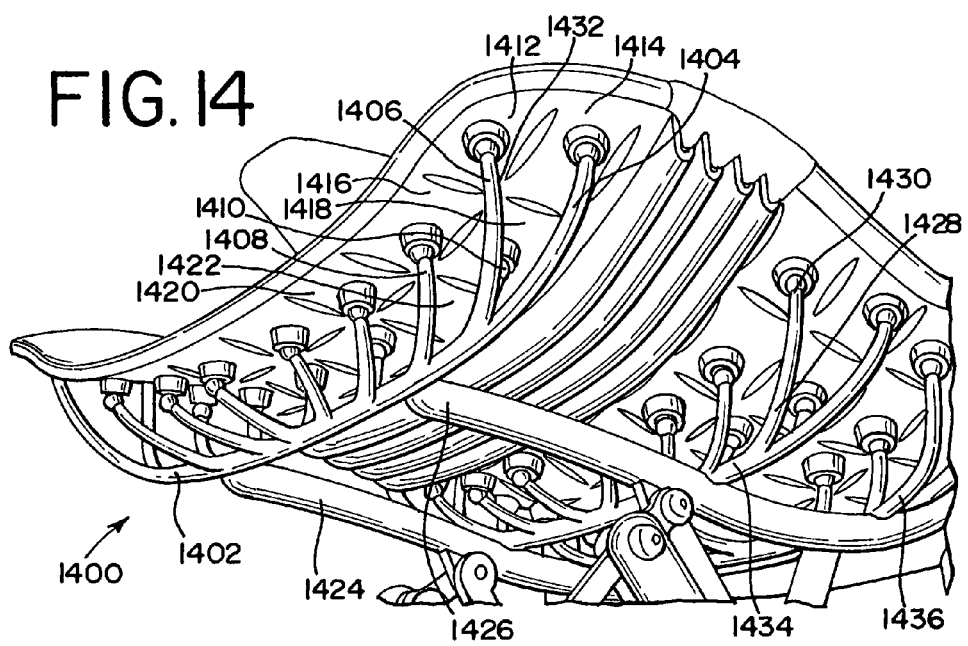

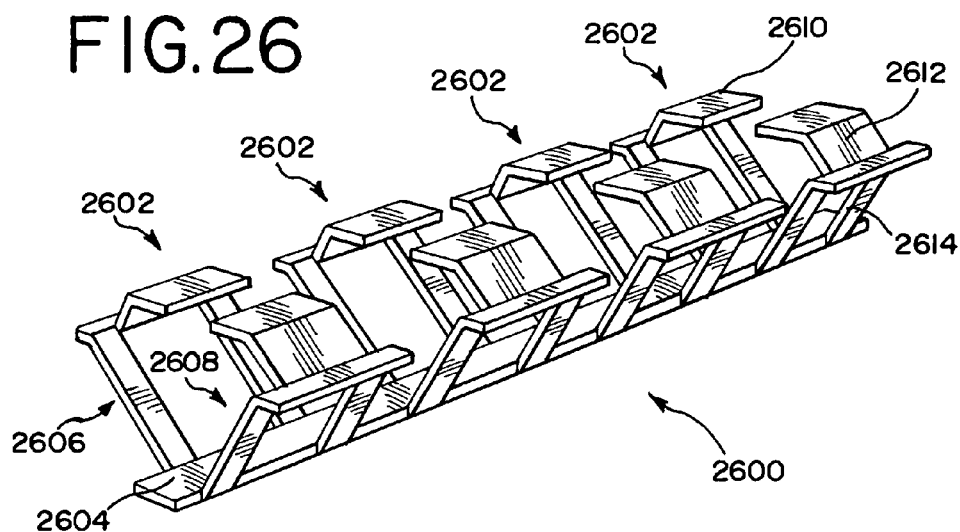
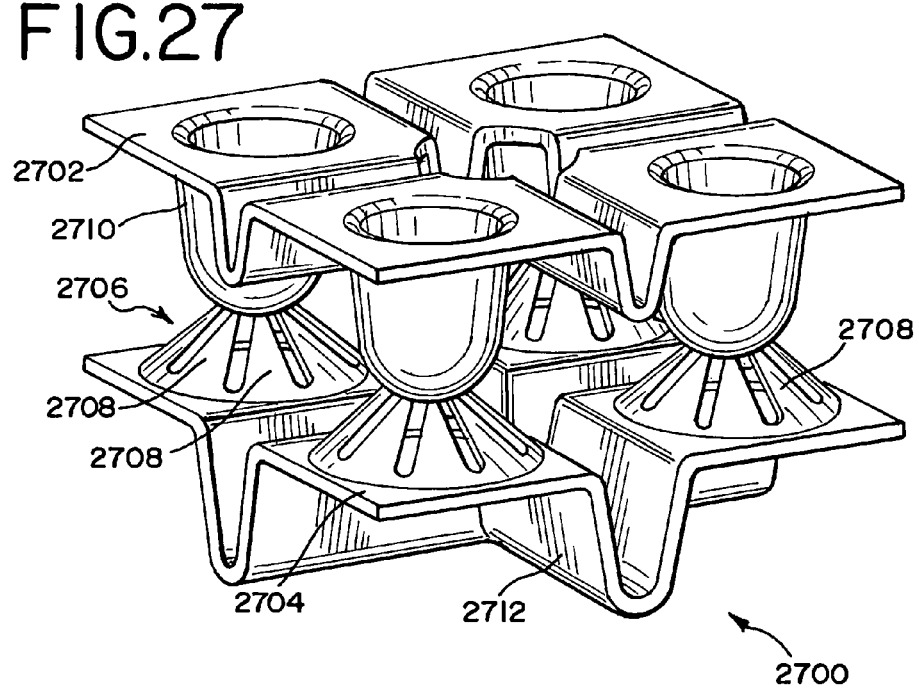

MULTILAYER LOAD BEARING STRUCTURE

PRIORITY CLAIM

This application is a Continuation application of U.S. patent application Ser. No. 10/972,153, titled PIXELATED SUPPORT STRUCTURES AND ELEMENTS, filed Oct. 22, 2004 and further claims the priority benefit of both U.S. Provisional Patent Application No. 60/513,775, titled PIXELATED SUPPORT STRUCTURES AND ELEMENTS, filed Oct. 23, 2003, and U.S. Provisional Patent Application No. 60/599,201, titled PIXELATED SUPPORT STRUCTURES AND ELEMENTS, filed Aug. 5, 2004.

BACKGROUND

1. Technical Field

The present invention relates to load bearing structures. In particular, the present invention relates to multiple layer load bearing structures.

2. Background Information

People spend a significant number of hours sitting each day. Regardless of the task being performed, or the leisure activity being pursued, support structures that properly support the body not only make the individual more comfortable, but may also provide significant health benefits. For this reason, extensive research and development has occurred and continues to occur into support structures for chairs, mattresses, and so forth.

In the past, for example, bed systems have encompassed a wide range of designs, ranging from simple cushions to complex arrangements of individual bearing elements. These past designs have been successful to varying degrees, but do not always provide the appropriate level of support for each part of the body. Thus, while some progress has been made in providing ergonomic body support structures, there remains a need for improved support structures that provide excellent fit and comfort, as well as healthy support for the body, across a wide range of individual body types.

BRIEF SUMMARY

Structural components consistent with the present invention provide pixelated body support elements as well as pixelated body support structures incorporating the pixelated body support elements. The support structures may be employed in the design of a backrest or seat for a chair, as examples, or may be incorporated into any other body support device (e.g., a mattress or bed system). The pixelated support elements may be independently designed according to their selected or assigned location in the support structure. The resultant design may thereby provide point-tailored support for the body that varies according to support most beneficial or desirable for any given body region.

In one implementation, a pixelated support element for a pixelated support structure may include a spring cradle that includes a cradle base and a spring support structure. In addition, the pixelated support element includes a spring element at least partially disposed in the spring cradle. The spring cradle may then be designed to impart a selected spring stiffness to the spring element.

In another implementation, the pixelated support element may include an upper support layer defining a series of peaks and valleys and a lower base layer also defining a series of peaks and valleys. Additionally, an elastomer material is disposed between the upper support layer and the lower base layer, and imparts a selected degree of stiffness to the pixelated support element.

Similarly, a pixelated support structure consistent with the present invention may include a support spine, a spline disposed laterally across the support spine, and cantilever branches extending outwardly from the spline. Each cantilever branch may include a terminal end connected to the spline, a support end opposite the terminal end, and a load bearing element connected to the support end. Additionally, a bridging connection is provided between pixelated support elements, thereby connecting sets of load bearing elements together into larger groups (e.g., a 2×2 or 4×4 group of load bearing elements). The bridging connection between elements prevents neighboring support elements from pinching the body between them as they flex differentially.

In a similar implementation, the pixelated support structure may include a support spine, a first spline laterally disposed across the support spine, and multiple pixelated support elements connected to the spline in a longitudinal array across the spline. A wide variety of pixelated support elements may be employed. As one example, one or more of the pixelated support elements may include a spline connection, a spring arm emerging from the spline connection, and a load bearing element at the end of the spring arm.

Generally, the support spine may be curved in accordance with a selected anatomical structure. Thus, as examples, the support spine may take the form of a back rest curved spine, or a seat rest curved spine.

In addition, the support spine may be flexible lengthwise so that the support elements follow gross motions of the body. The overall support structure may then have a springing action all along its length (both cantilever and torsional), or may be hinged along its length and driven into the desired position, for example, by rigid body mechanics.

BRIEF DESCRIPTION OF THE DRAWINGS

FIG. 14 shows a pixelated support structure including load bearing elements support by cantilevers.

FIG. 26 shows a section of support elements arranged along a common spine.

FIG. 27 illustrates a variation of the pixelated support element shown in FIG. 7.

DETAILED DESCRIPTION

Before turning to a detailed discussion of the Figures, it is noted that pixelated body support generally refers to an array of individual body-support elements that in combination provide support for some or all of an individual's body. For example, the body support may include an array of closely spaced pixelated support elements that define a support surface for an individual. As will be explained in more detail below, the pixelated support elements may take many forms, including, for example a spring-loaded element formed as, or biased by, mechanical or pneumatic springs or by other devices. Furthermore, the stiffness or biasing force of the pixelated support elements may be individually designed as desired to suit the particular body support needs of the individual and the application.

Several exemplary implementations of pixelated support elements (referred to below as "elements" or "support elements") are discussed next. Subsequently, pixelated support structures that may incorporate the pixelated support elements are presented.

Figure 1:
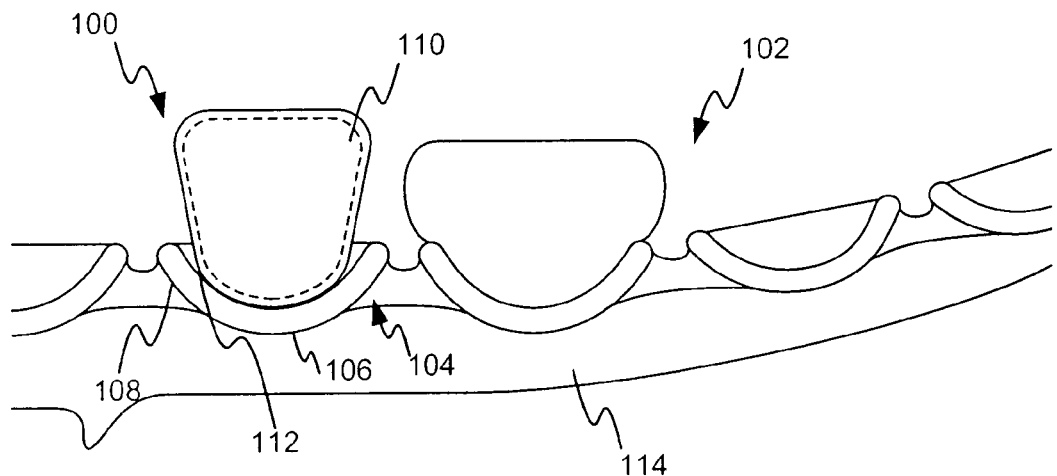
FIG. 1 illustrates an elastic block pixelated support element resting a spring cradle.

With regard first to FIG. 1, that figure shows two pixelated support elements 100, 102. The support element 100 is shown in an uncompressed state, while the support element 102 is shown in a compressed state. Each support element 100, 102 may be constructed in the same manner. For example, the support element 100 includes a spring cradle 104 that may generally be regarded as including a cradle base 106 and a spring support structure 108. In addition, a spring element 110 is partially disposed in the spring cradle 104. As shown in FIG. 1, the spring cradle 104 provides an open area forming a spring compression area 112. The spring cradle 104 is attached (e.g., through adhesive bonding or mechanical linkage) to a spline 114.

In this instance, the spring element 110 is an elastic element that is shown as roughly rectangular or block shaped. However, it is noted that any other geometric shape may be used instead, depending on the desired characteristics of the particular design. Because the spring element 110 is elastic, it therefore deforms as weight is applied (e.g., as element 102 illustrates), and recovers as the weight is removed (e.g., as element 100 illustrates). In one implementation, the spring element 110 may be a gel filled structure.

The spring compression area 112 is shown as an open space between the spring element 110 and the spring support structure 108. The larger the spring compression area 112, the softer the associated spring element 110 feels. Likewise, the smaller the spring compression area 112, the stiffer the associated spring element 110 feels. Thus, as examples, the radius and depth of the spring cradle 104 may be individually designed for each spring cradle to provide a pre-selected amount of stiffness for the associated spring element 110.

Figure 2:
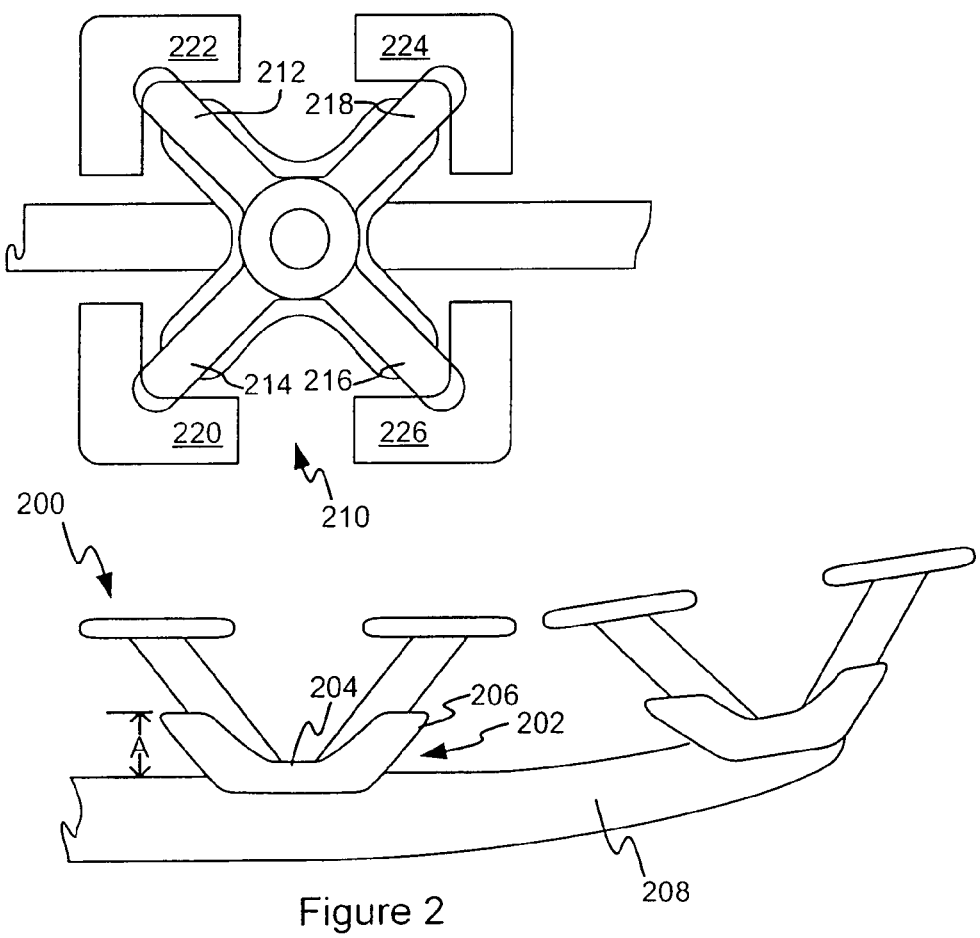
FIG. 2 depicts a spring arm pixelated support element resting in a spring cradle.

FIG. 2 shows a top view and a side view of a second pixelated support element 200. The element 200 includes a spring cradle 202 that may generally be regarded as including a cradle base 204 and a spring support structure 206. The cradle base 204 attaches to the spline 208. In addition, a spring element 210 is partially disposed in the spring cradle 202. The spring element 210 includes four elastic spring arms 212, 214, 216, 218, although additional or fewer support arms may be used in other implementations.

At end of each spring arm 212-218 is an L-shaped load bearing element 220, 222, 224, 226. Other shapes are also suitable. Thus, as examples, the load bearing elements 220-226 may be square, rectangular, or circular.

The spring support structure 206 is formed as a cradle arm for each elastic spring arm 212-218. The cradle arm extends along the elastic spring arms 212-218, thereby imparting a pre-selected tension in the each spring arm 212-218. The tension may be individually adjusted for each spring arm 212-218, and individually adjusted from support element to support element by changing the materials, dimensions, or length of cradle arm extending along the elastic spring arm. The height of the cradle arm is denoted in FIG. 2 as dimension A.

Figure 3:
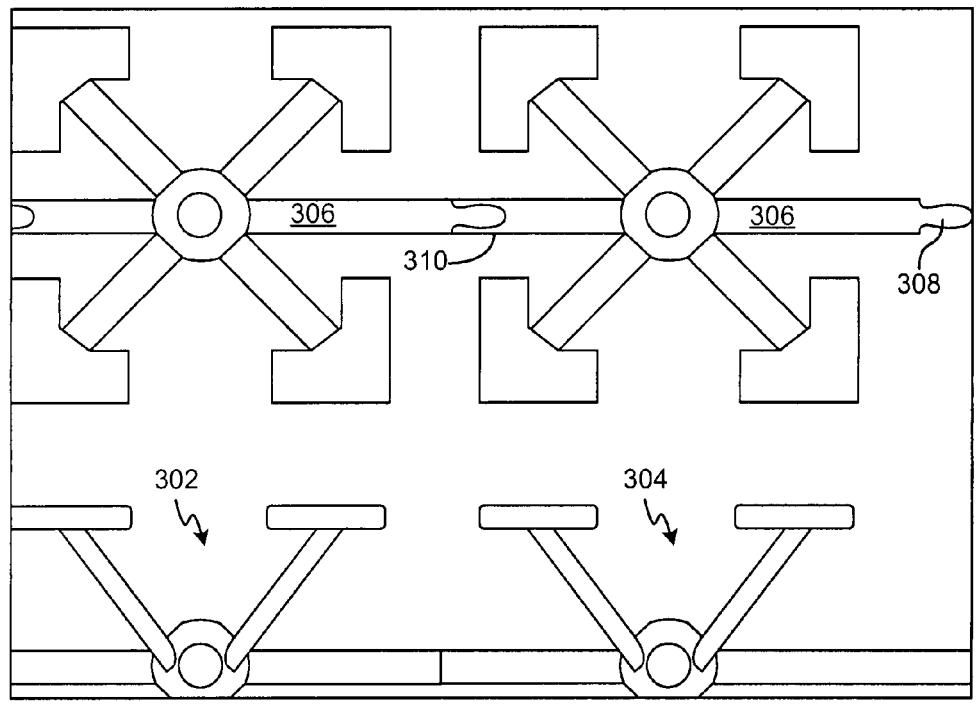
FIG. 3 illustrates an interconnection structure for pixelated support elements.

FIG. 3 illustrates an interconnection structure for pixelated support elements. In particular, FIG. 3 shows a first support element 302 and a second support element 304. Each support element 302-304 may be constructed as noted above with regard to FIG. 2, as an example. However, rather than or in addition to being attached to a spline, the support elements 302-304 may include their own branches 306.

Each branch 306 includes an interconnection mechanism at each end. The interconnection mechanism may include a male connector 308 on one end of the branch 306 and a mating female connector 310 on the opposite end of the branch 306. Then support elements 302-304 may then be coupled together to form a linear array of elements in which the connected branches 306 form a spline.

Figure 4:
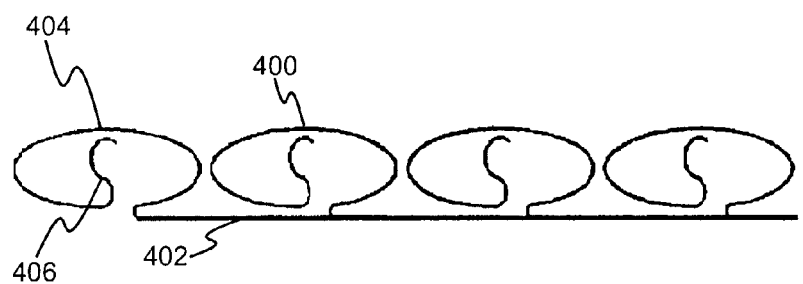
FIG. 4 shows another example of a pixelated support element.

FIG. 4 shows another example of pixelated support elements 400 arranged along a spline 402. The elements 400 are formed as a curved shell 404 that terminates in a spring arm 406. The spring arm 406 may be formed as an undulating section of material that provides tension and a restorative force when a load is applied that causes a portion of the curved shell 404 pushes down on the spring arm 406.

Figure 5:
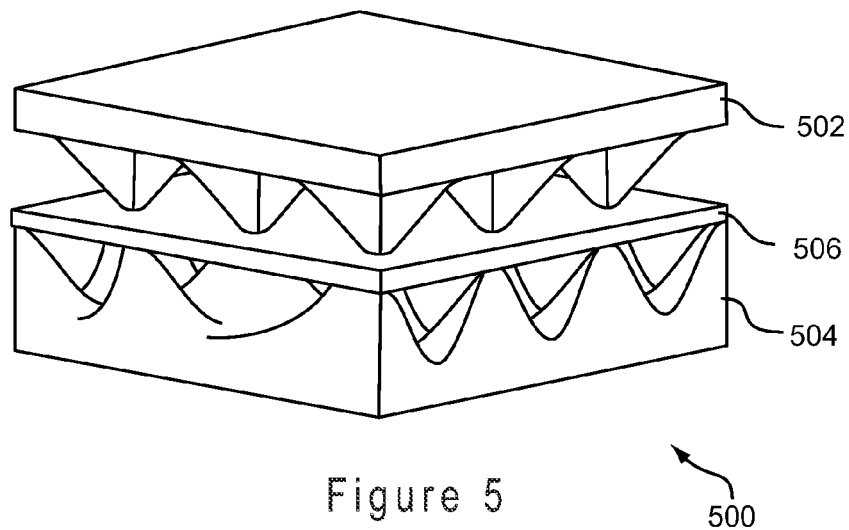
FIG. 5 illustrates a perspective view of a pixelated support element including an upper support layer, a lower base layer, and a tensile membrane between the upper support layer and the lower base layer.

Turning next to FIG. 5, that figure shows a perspective view of a pixelated support element 500. More specifically, the pixelated support element 500 includes an upper support layer 502 and a lower base layer 504. An elastomer material 506 is disposed between the upper support layer 502 and the lower base layer 504.

Figure 6:
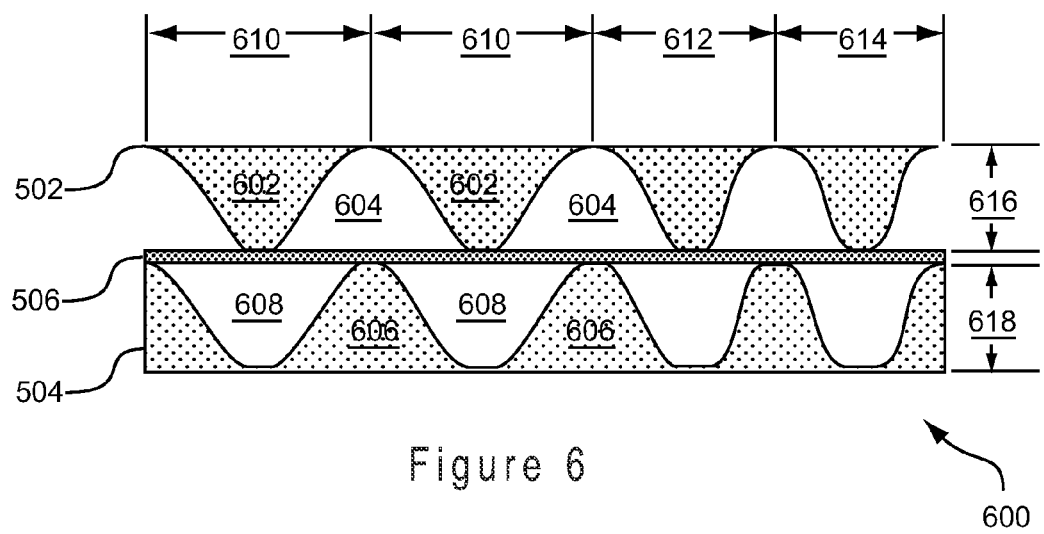
FIG. 6 shows a side view of the pixelated support element of FIG. 5.

FIG. 6 shows a side view of the pixelated support element 500 of FIG. 5. FIG. 6 shows that the upper support layer 502 includes a series of peaks 602 and valleys 604. Similarly, the lower base layer 504 includes a series of peaks 606 and valleys 608 disposed such that the peaks 606 align with the valleys 604.

The peaks 602 and 606 are characterized by a separation distance that may vary from peak to peak. FIG. 6 illustrates three such separation distances in decreasing order of magnitude with reference numerals 610, 612, and 614. Similarly, FIG. 6 shows that the peaks and valleys may have independently adjustable heights and depths, as shown by reference numerals 616 and 618. The depths and heights provide a pre-selected travel distance for the upper support layer 502. As one example, the travel distance may be set to be approximately 1 inch, although longer and shorter distances may also be employed.

The elastomer material 506 stretches both up and down when a load is applied to the upper support layer 502. The spring range provided by the elastomer material 506 is determined by the height of the peaks of both the upper support layer 502 and the lower base layer 504. In one implementation, the height of the peaks and the depths of the valleys may be approximately 1 inch. The spring rate may be varied by changing the separation distance between peaks as shown in FIG. 6.

For example, when the separation distance is greater (as shown on by the separation distance 610 on the left side of FIG. 6), the corresponding portion of the element 500 provides a softer feel. Alternatively, when the separation distance is less (as shown by the separation distances 612-614 on the right side of FIG. 6), then the element 500 also provides a stiffer feel. As examples, the separation distances 610, 612, and 614 may be 2.0 inches, 1.625 inches, and 1.5 inches. In addition, the material or thickness of the elastomer material 506 may be varied at design time to impart addition or lesser stiffness in any particular area. The elastomer material 506 may be made from many different materials, including a polymer material such as Hytrel™ material (elasticized polyethelene), Santoprene™ material (elastomerized polypropylene), Polyisopene™ material, or a polybutadience or polyurethane material.

Thus, the element 500 allows the spring rate and resultant stiffness to be tailored across the element 500. As a result, the element 500 may be made stiffer where significant pressure is exerted, and softer where less pressure is exerted (or when a softer feel is desired).

Figure 7:
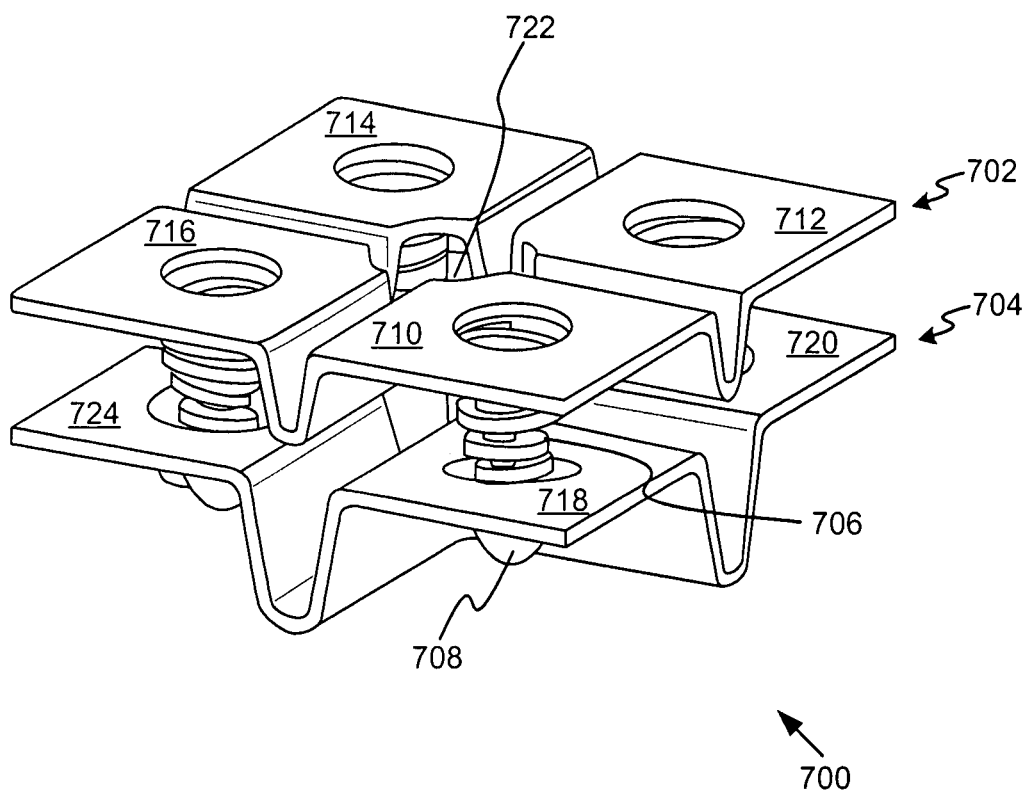
FIG. 7 shows a pixelated support element including a double action spring.

FIG. 7 provides another example of a pixelated support element 700. The element 700 includes an upper load bearing element 702, a lower base element 704, and a spring system between the upper load bearing element 702 and the lower base element 704. The spring system includes a compression spring 706 between the upper and lower elements 702-704, and an elastomeric spring 708 disposed below the compression spring 706. The two springs 706-708 provide sufficient restoring force, while allowing a height reduction in which the element 700 functions.

The compression spring 706 may be a conical compression spring integrally molded to the upper load bearing element 702. The elastomeric spring 708 may then be an elastomeric membrane retained co-axially with the compression spring 706. Retention may be accomplished using the perimeter of the compression spring 706, or by adding a nipple to elastomeric spring 708 to retain the compression spring 706.

In one implementation, the compression spring 706 is substantially softer than the elastomeric spring 708 and thus compresses first. When compressed, the compression spring 706 may then form a conical solid plunger that engages the elastomeric spring 708. The elastomeric spring 708 then begins to stretch in elongation.

The overall element 700 may provide linear spring action in two regions: first during compression of the compression spring 706 (and minor stretching of elastomeric spring 708) and then a second, steeper spring rate as the elastomeric spring 708 stretches. Either spring 706-708 may be set to be the primary travel, or it may be evenly split between the two springs 706-708.

FIG. 7 shows that the upper load bearing element 702 may be formed into a pixelated upper load bearing element array. For example, the upper array may include the pixelated elements 710, 712, 714, 716 in a 2×2 array. The lower base element 704 may then be formed as a pixelated lower base element array, including corresponding pixelated elements 718, 720, 722, 724. The pixelated elements 710-724 may individually biased by spring systems and may be interconnected with hinges, such as a living hinge, including the peak and valley shape shown in FIG. 7. Although FIG. 7 shows 2×2 pixelated arrays of square pixelated elements 710-724, the array may be larger or smaller in any particular dimension, and may include pixelated elements that are rectangular, round, or any other shape.

Figures 8, 9:
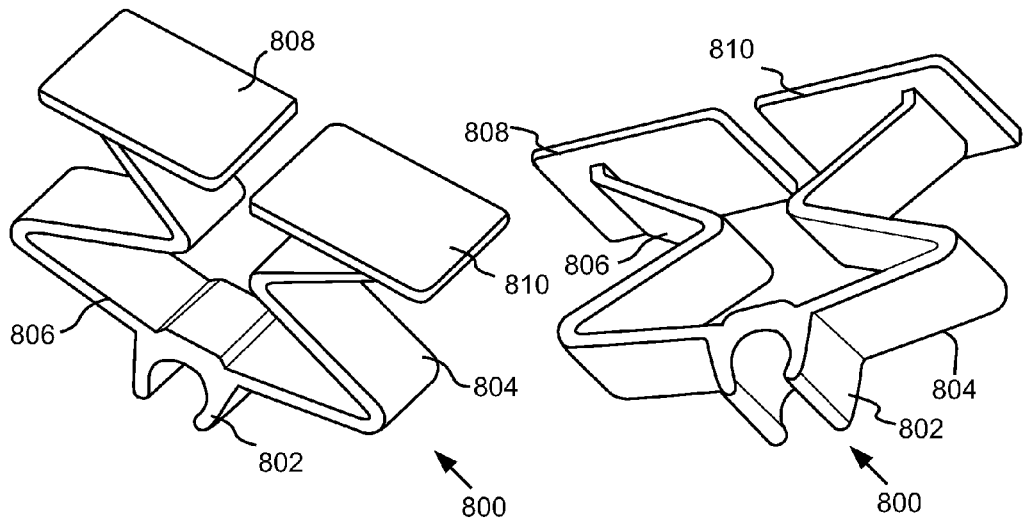
FIG. 8 portrays a pixelated support element including two support arms.
FIG. 9 shows a second view of the pixelated support element of FIG. 8.
Figure 10:
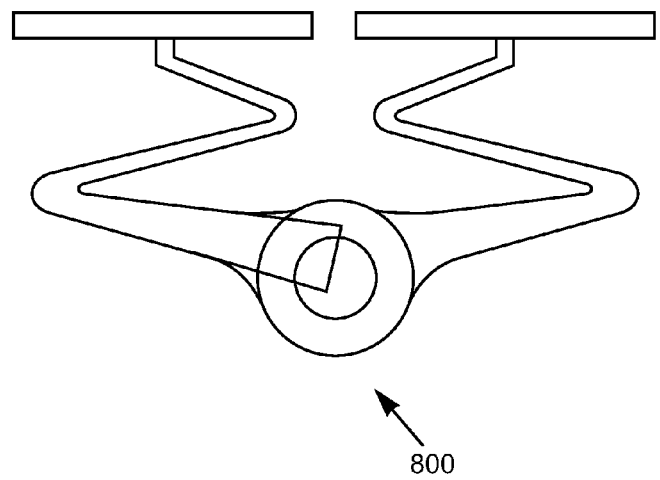
FIG. 10 illustrates exemplary dimensioning for the pixelated support element shown in FIG. 8.

FIGS. 8-10 show another implementation for a pixelated support element 800. FIGS. 8 and 9 provide a perspective view of the element 800, which includes a spline connection 802, spring arms 804 and 806, and load bearing elements 808 and 810. The element 800 may be a single molded piece (e.g., of thermoplastic elastomer), or constructed from separate components secured together by fasteners. In one implementation, the load bearing elements 808 and 810 of the support element 800 retain horizontal orientation when loaded with a vertically downward force.

The spline connection 802 provides an interference fit connector that may slide onto or snap onto a generally round spline. More generally, the spline connection 802 provides a base connection that may be attached or adhered to an underlying support structure. In an alternate embodiment, however, the support element 800 may be molded as a single piece with a spline or with a spline and a spine, such as those shown below in FIGS. 16 and 17. As another example, the base connection 802 may include cross pin holes through which a securing pin may be inserted to secure the support element 800 to a spline (including matching cross pin holes).

The underlying support structure may be a substantially one dimensional spline, or may be a two dimensional rigid or flexible backing structure. The backing structure may take the shape, as examples, of a backrest or a seat rest for a chair, optionally ergonomically curved. Thus, the backrest may be curved to provide back support that includes lumbar support, while the seat may be curved to provide support that matches the natural curves of the buttocks and thighs.

The spring arms 804 and 806 emerge from the spline connection 802 to provide a pair of compression arms that extend upwardly from the spline connection 802. The load bearing elements 808 and 810 are then connected to the free ends of the spring arms 806 and 804 respectively. As shown in FIGS. 8-10, the spring arms 804, 806 are formed in an undulating or zig-zag shape to provide a biasing force.

FIG. 10 provides exemplary dimensions for the element 800 that are particularly suitable when the element 800 is incorporated into a pixelated support structure in a chair.

Figure 11:
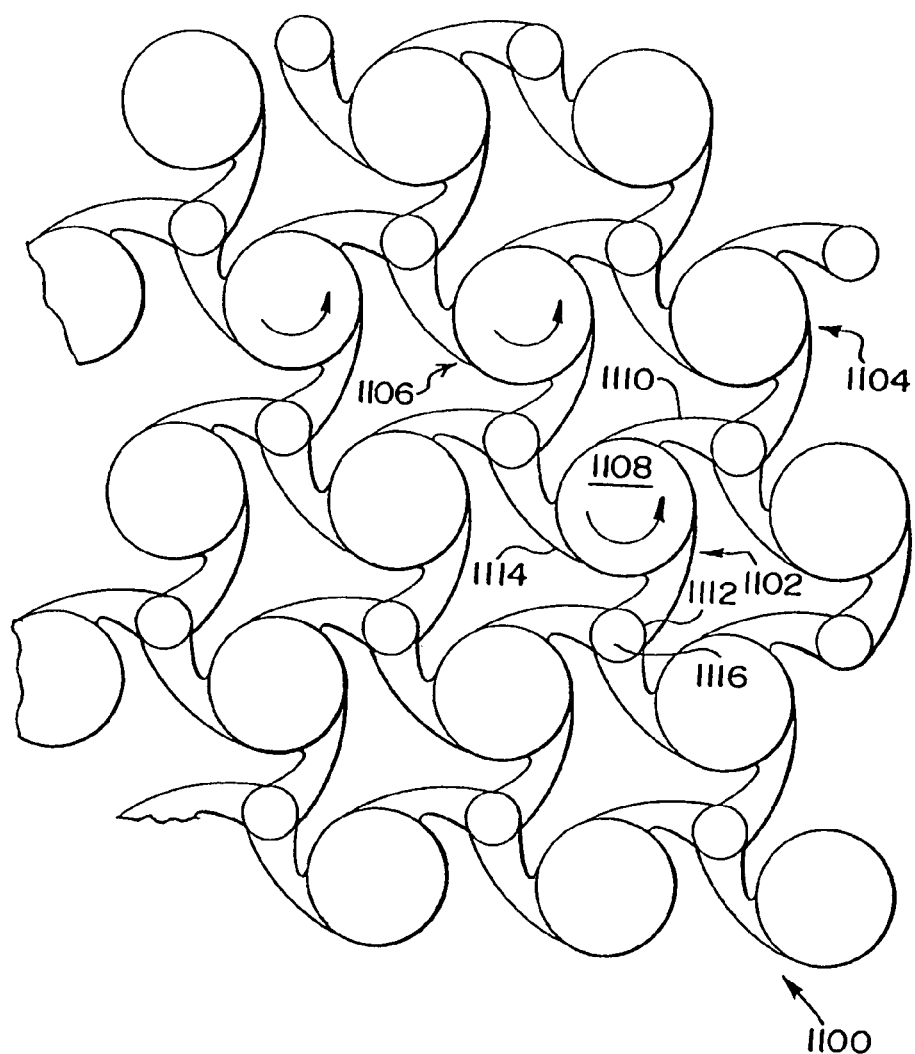
FIG. 11 depicts a support structure including pixelated support elements lending a rotational aspect to the load bearing elements.

FIG. 11 depicts a support structure 1100 including pixelated support elements (three of which are labeled 1102, 1104 and 1106) coupled together. More specifically, each of the pixelated support elements, for example the element 1102, includes a load bearing element 1108, and rotational arms 1110, 1112, and 1114. Rotational arms from sets of three neighboring pixelated support elements connect along a helix shaped path at a lower support coupling present at the end of each rotational arm. One lower support coupling is labeled 1116 at the end of the rotational arm 1112.

Although the load bearing elements are show as circular, they may take another shape in accordance with the particular design. The helical rotational arms 1110-1114, through the support couplings, allow the pixelated support elements to rotate off-center (e.g., as shown, counterclockwise) and move together when a load is applied to the load bearing elements. The load bearing elements may thus provide a shearing action that provides a pleasant feel to the body.

In general, the support structure 1100 may be formed through a molding process. In particular, a thermoplastic elastomer may be injected into a mold providing the load bearing element, rotational arm, and support coupling elements set forth above.

Figure 18:
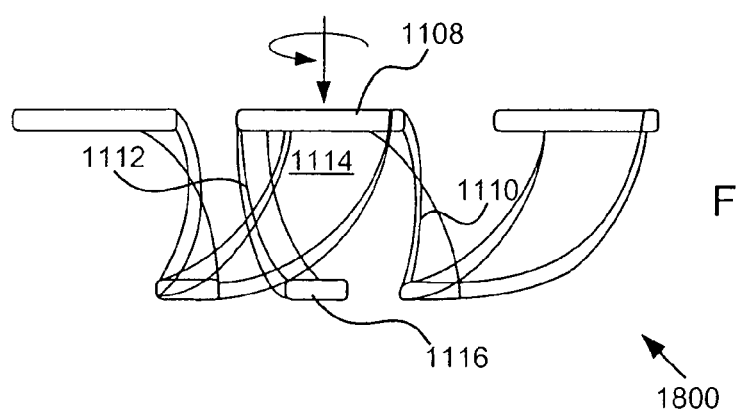
FIG. 18 shows a side view of the pixelated support structure shown in FIG. 11.

Turning briefly to FIG. 18, that Figure shows a side view 1800 of a portion of the support structure 1100. FIG. 18 shows the load bearing element 1108 and its three helical rotational arms 1110, 1112, and 1114. The helical rotational arm 1112 is shown connected to the support coupling 1116. The support couplings may be secured to a rigid base of an underlying support structure.

Figure 12:
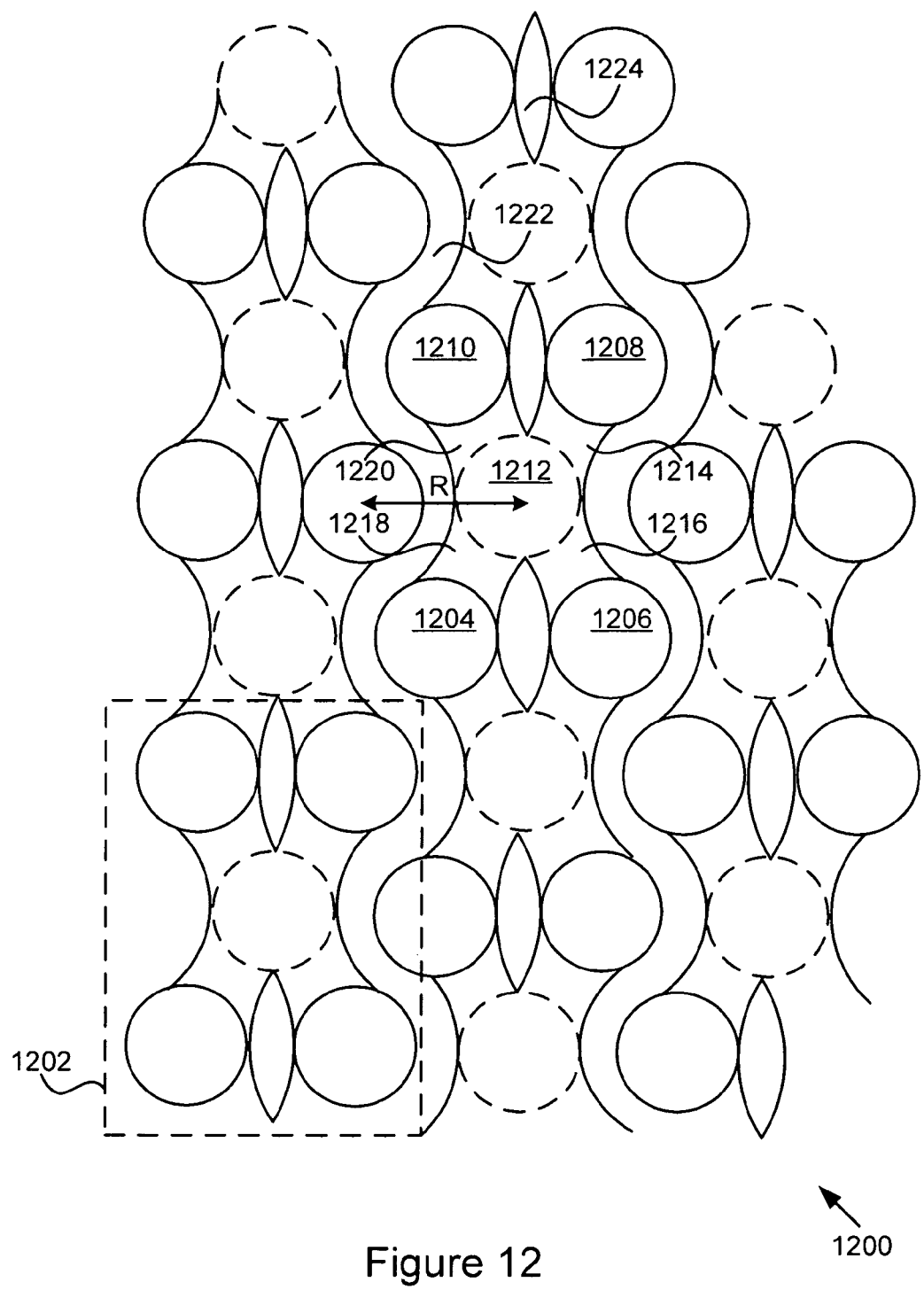
FIG. 12 shows another example of a support structure including multiple pixelated support elements.

FIG. 12 shows another example of a support structure 1200 including multiple pixelated support elements 1202. Each support element 1202 includes four load bearing elements, for example, the load bearing elements 1204, 1206, 1208, and 1210. A lower base element 1212 is provided for each support element 1202, and cantilever support arms 1214, 1216, 1218, and 1220 connect the load bearing elements 1204-1210 to the lower base element 1212. A distance R separates the lower base element 1212 and the load bearing elements. Material cutouts 1222 and 1224 are also shown.

The support structure 1200 may be formed in a manner similar to the support structure 1100. For example, a mold may be formed to provide the load bearing element, base element, and support arm shapes shown in FIG. 12. A thermoplastic elastomer may then be injected into the mold to realize the support structure 1200. The base elements may be secured to a rigid base of an underlying support structure.

Figure 13:
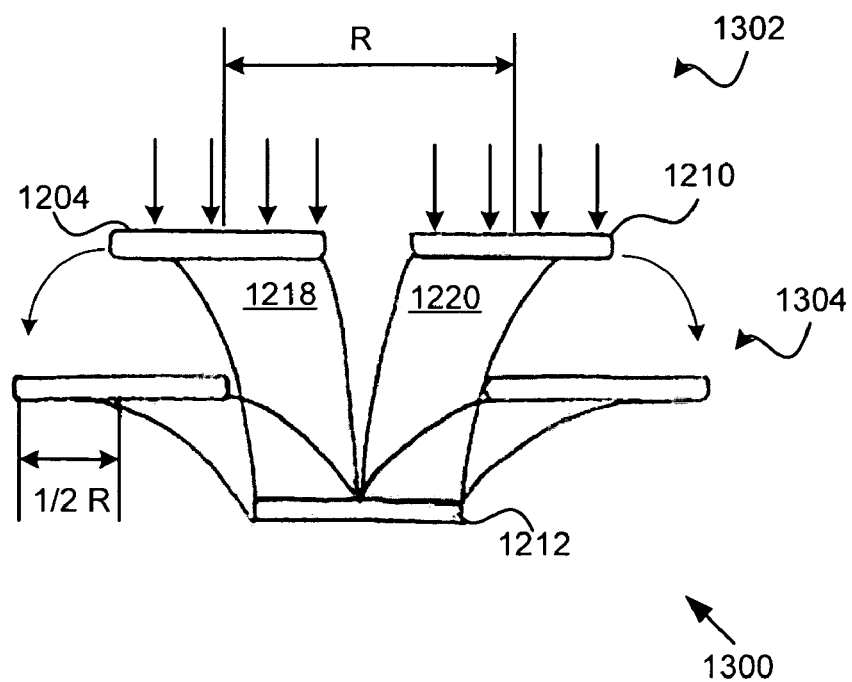
FIG. 13 shows a pixelated support element of FIG. 12, in an uncompressed and a compressed state.

FIG. 13 shows a side view 1300 of a portion of the support structure 1200, in an uncompressed state 1302 and a compressed state 1304. As shown in FIG. 13, the cantilever support arms 1218 and 1220 couple load bearing elements 1204 and 1210 to a lower base element 1212. The cantilever support arms 1218 and 1220 will deflect in an arc when a load is applied to the load bearing elements 1204 and 1210. The spacing of the bearing elements equalizes as the elements are deflected downwards. The materials, dimensions, and construction of the cantilever support arms 1218 and 1220 may be independently designed and selected to impart a desired stiffness, and may, for example, provide approximately 1 inch of vertical travel and (½)*R horizontal travel under compression.

Figure 19:
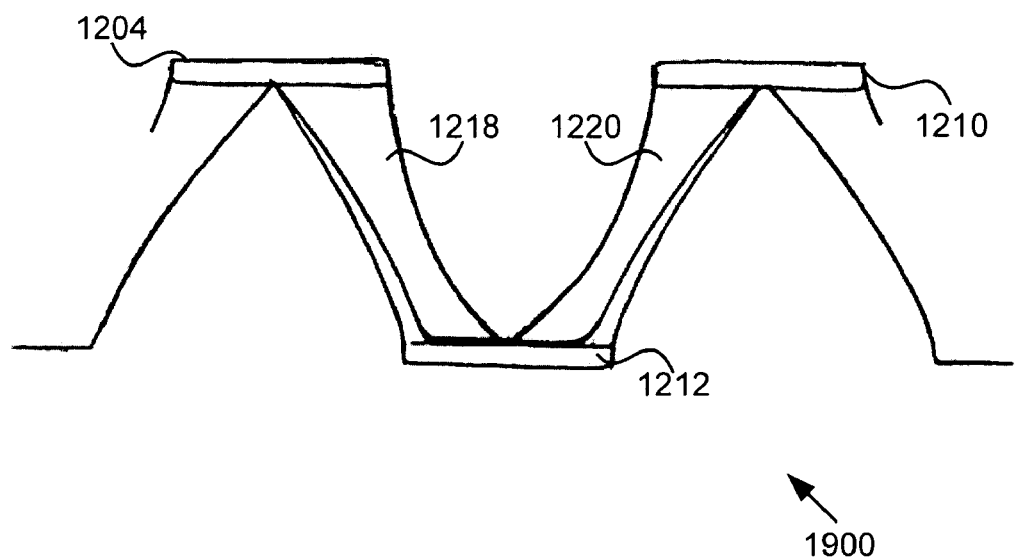
FIG. 19 shows a side view of the pixelated support structure shown in FIG. 12.

Turning briefly to FIG. 19, that Figure shows a side view 1900 of a portion of the support structure 1200. The side view shows the state of the support structure 1200 in an unloaded state. More specifically, FIG. 19 shows the load bearing elements 1204 and 1210 connected by the cantilever support arms 1218 and 1220 to the base element 1212.

The pixelated support elements discussed above (or those of other design) may be incorporated into pixelated support structures, several examples of which are set forth below.

With regard next to FIG. 14, a pixelated support structure 1400 is shown. The structure 1400 includes splines 1402, 1434, and 1436, cantilever branches (four of which are labeled 1404, 1406, 1408, and 1410) that extend outwardly from the spline 1402, and load bearing elements (six of which are labeled 1412, 1414, 1416, 1418, 1420, and 1422).

FIG. 14 also shows two support spines 1424 and 1426. The spline 1402 is disposed laterally across the support splines 1424 and 1426 as shown. The cantilever branches 1404-1410 generally may be regarded as including a terminal end connected to the spline 1402 (or integrated with the spline 1402, for example as a single injection molded piece) and a support end opposite the terminal end. One terminal end is labeled 1428 and one support end is labeled 1430 in FIG. 14.

The load bearing element 1412 connects to the support end of the cantilever branch 1406, and the load bearing element 1414 connects to the support end of the cantilever branch 1404. Similarly, the load bearing element 1416 connects to the support end of the cantilever branch 1408, while the load bearing element 1418 connects to the support end of the cantilever branch 1410.

Bridging connections may connect the individual load bearing elements. The bridging connections give surface continuity that prevents pinching of the skin. For example, as shown in FIG. 14, the bridging connection 1432 connects the load bearing elements 1412, 1414, 1416, and 1418 at their corners. The bridging connection 1432 forms a junction for the four load bearing elements 1412-1418. In other words, sequences of four load bearing elements are connected together (e.g., at their corners) to form 2×2 pixelated groups that extend in a linear array laterally across the spline 1402. In other implementations, the groups may be larger than a 2×2 group or smaller than a 2×2 group. The load bearing elements 1412-1418 are otherwise disconnected from one another, and thereby provide an independent pixel support for the body part at rest on the particular load bearing element.

The spines 1424 and 1426 may support additional splines disposed from one another and constructed as noted above, including as examples the splines 1434 and 1436. Thus, the load bearing elements not only extend laterally across the splines, but also longitudinally along the spines 1424 and 1426. When bridging connections are added to couple together sets of four load bearing elements, a two dimensional pixelated mat of load bearing elements is formed and supported by the spines 1424-1426. Each of the cantilever branches may be independently designed by selection, dimension, and composition of materials and dimensioning to provide a pre-selected stiffness, adjusted, for example, according to the body part supported by the load bearing element attached to the cantilever branch.

The spines 1424-1426 may be curved to accommodate a selected anatomical structure. For example, in FIG. 14, the spines 1424-1426 are curved to form an ergonomic seat rest. As another example, the spines 1424-1426 may also be curved to form a back rest, including lumbar support.

Figure 15:
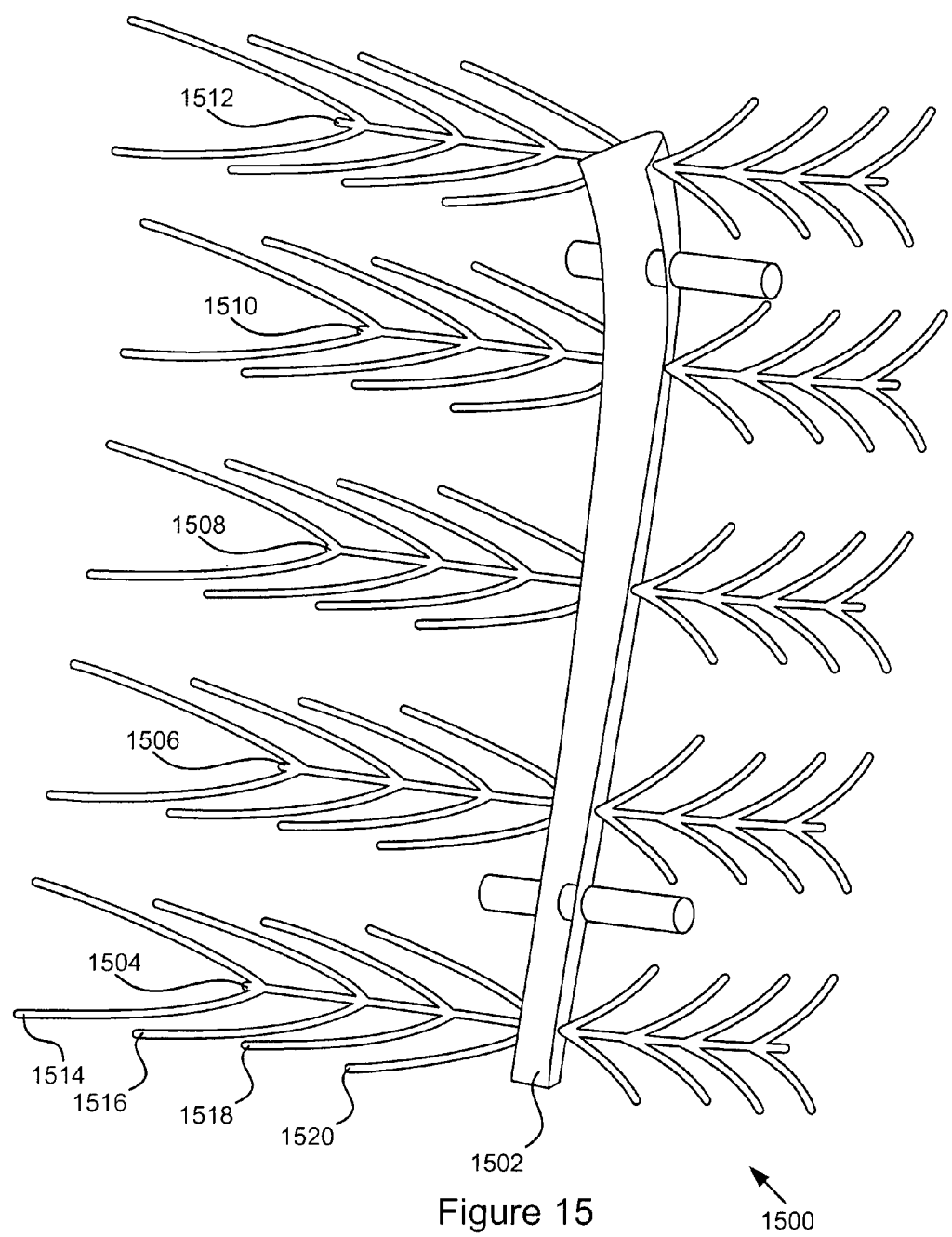
FIG. 15 depicts a second view of the pixelated support structure of FIG. 14.

FIG. 15 depicts an alternate implementation of a pixelated support structure 1500 similar to that shown in FIG. 14. In FIG. 15, a spine 1502 supports five splines 1504, 1506, 1508, 1510, and 1512 disposed laterally across the spine 1502. Each spline includes one or more cantilever branches to either side of the spine 1502. Several of the cantilever branches for the spline 1504 are labeled 1514, 1516, 1518, and 1520.

Although not illustrated in FIG. 15, one or more of the cantilever branches may support a load bearing element as illustrated above in FIG. 14. Additionally, the load bearing elements may be connected via bridging connections to form pixel groups of multiple bearing elements. As shown above in FIG. 14, the bridged load bearing elements may then form a one dimensional array laterally across a given cantilever branch, or a two dimensional array extending across multiple cantilever branches.

Figure 16:
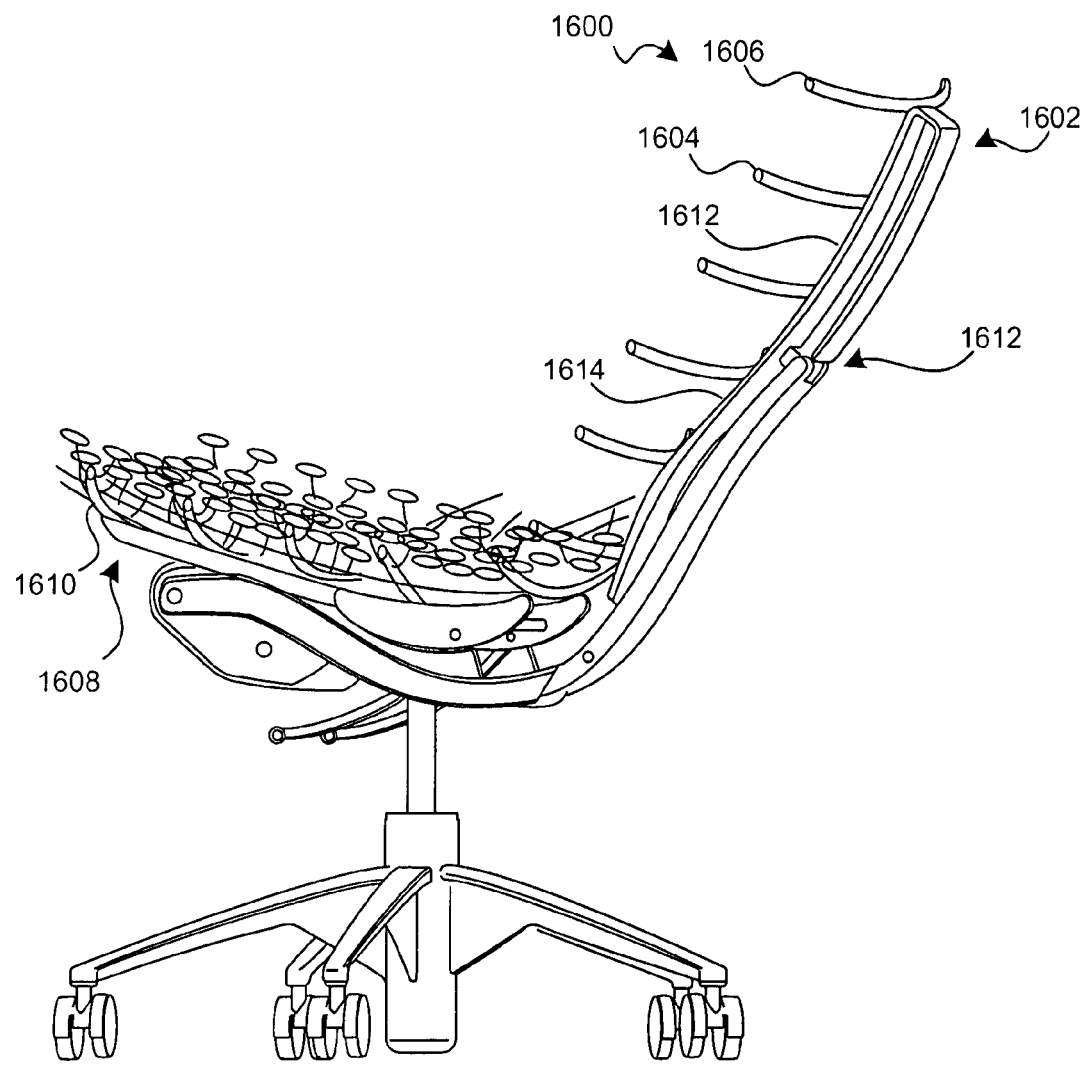
FIG. 16 shows a pixelated support structure including a flexible spine and crossing splines.

Turning next to FIG. 16, a pixelated support structure 1600 includes a spine 1602 and one or more perpendicularly crossing splines (two adjacent splines are labeled 1604 and 1606). Each spline 1604, 1606 will carry one or more pixelated support elements to form a one dimensional array of support elements laterally across a given spline. When multiple adjacent splines carry the pixelated support elements, the elements may then form a two dimensional array extending along the spine 1604 in one dimension and along the spines 1604-1606 in a second dimension.

As shown in FIG. 16, the spine 1602 is curved to form a back rest, including lumbar support. Note also that a similar spine 1608 and crossing splines (e.g., the spline 1610) may also be provided to form an ergonomically curved seat rest. The splines 1604, 1606, and 1610, in one implementation, may have a substantially round cross section. The splines 1604, 1606, 1610 may also be curved (e.g., initially away from the spines 1602, 1608) to form a curvature, depression or other shape for supporting the back or buttocks. Suitable construction materials include glass filled nylon, polycarbonates, Polyethylene Terephthalate (PET) plastics, and the like.

One or more sections of the spines may be implemented using a flexible material. Thus, for example, the spine 1602 may include an upper spine section 1612 and a lower spine section 1614 that may flex either by chair kinematics or user movement. The upper spine section 1612 and the lower spine section 1614 may be joined at an inflection point 1616 that may be a floating inflection point, for example. The inflection point may be implemented using a pin, hinge, or other coupling structure. In this manner, for example, the support structure 1600 may act as an analog of the human spine, in that the spine section 1612 will flex together with the human spine (e.g., as the user reclines).

In one implementation, the upper spine section 1612 flexes backwards while the lower spine section 1614 flexes forward. To this end, the upper spine section 1612 may, for example, be sprung forward with a cable and spring assembly that can be overcome by pushing back against the upper spine section 1612. Thus, instead of the support spine 1602 being a relatively rigid structure, the support spine 1602 may instead flex along one or more sections. As shown in FIG. 16, for example, the lower spine section 1614 flexes inward to support the lower back, and the upper spine section 1612 flexes backwards. The spine 1602, splines, and support elements may be formed individually or in combination as a single molded piece.

Figure 17:
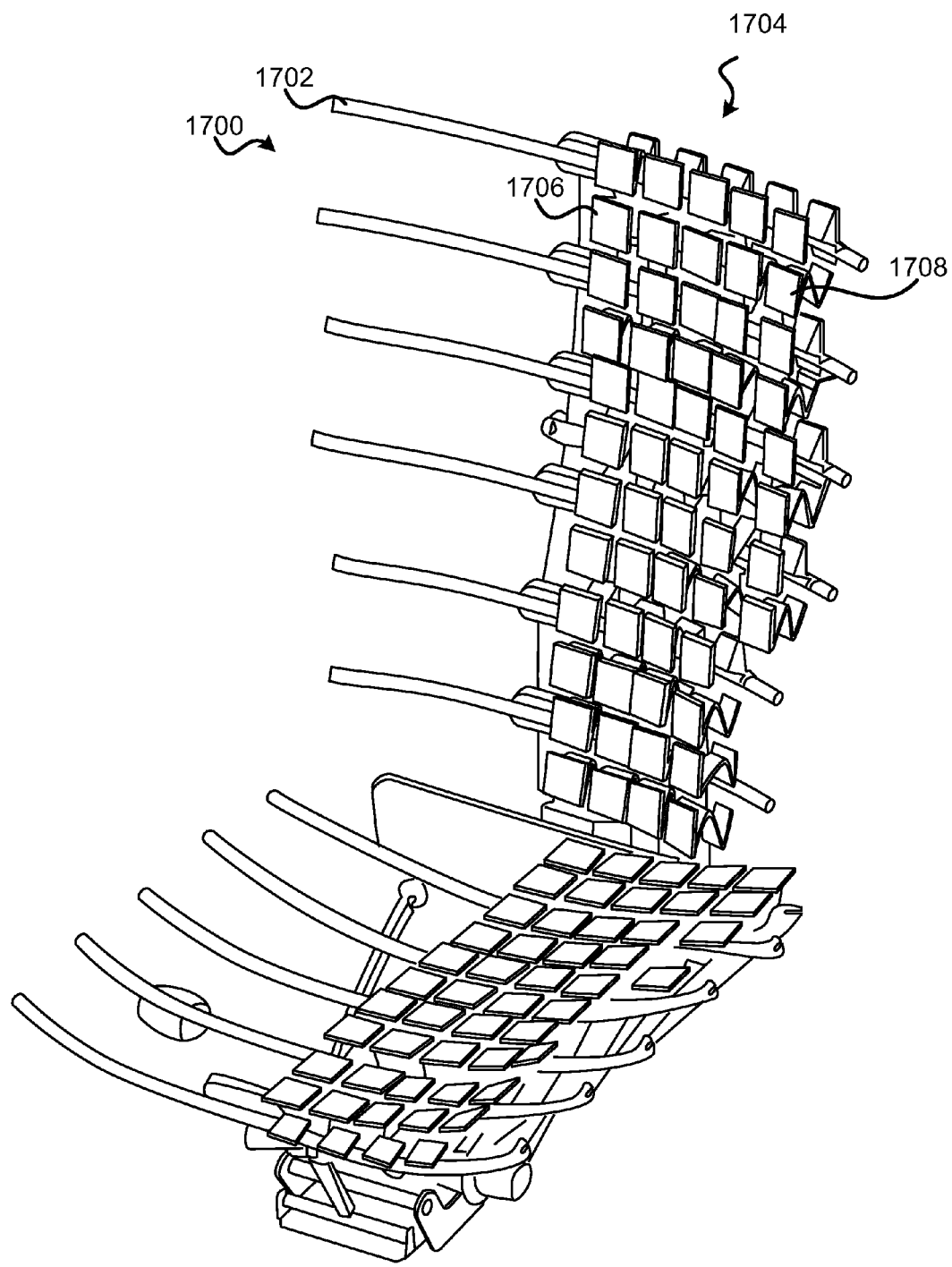
FIG. 17 shows another view of the pixelated support structure of FIG. 16.

FIG. 17 shows another view of a pixelated support structure 1700 similar to that shown in FIG. 16, but including pixelated support elements. In FIG. 17, splines laterally cross supporting spines (occluded in this view). As with the implementation shown in FIG. 16, the spines may be constructed as one or more sections of flexible spine sections to provide, for example, a flexible support for the upper and lower back. For example, the spline 1702 extends across a back rest spine near the top of the back rest spine. The spline 1702 carries multiple pixel support elements 1704. Five of the support elements 1704 are shown in position across the innermost portion of the spline 1702, including a first support element 1706 and a fifth element 1708.

The pixel support elements 1704 may be selected from any of the pixel support elements described above. For example, the pixel support elements shown in FIGS. 8, 9, and 10 may be connected to (or integrally molded with) the splines through their spline connection 802.

Note that each support element 1704 may then include spring arms 804 and 806, and load bearing elements 808 and 810 at the end of the spring arms 804 and 806. As noted above, each support spring arm 804 and 806 may then be independently designed to provide a pre-selected stiffness. In that manner, each support element 1704 may provide a different level of resistance and support to provide an enhanced ergonomic and comfortable body support.

Figure 20:
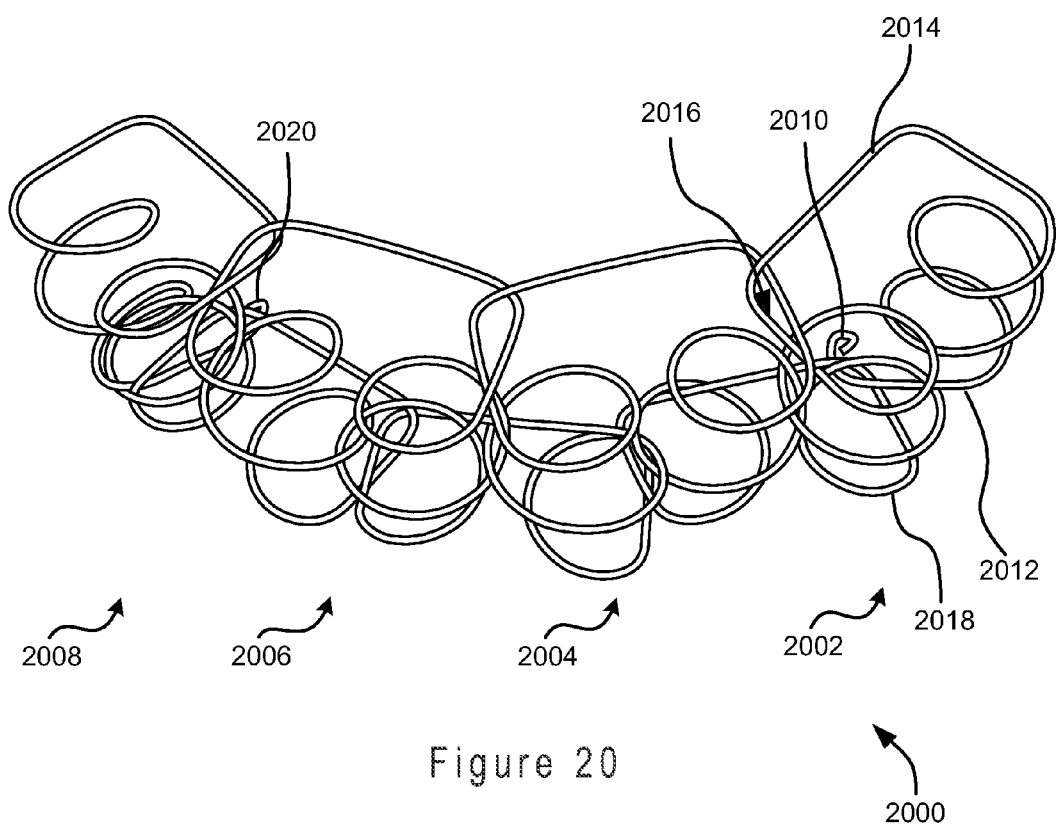
FIG. 20 shows an interconnected set of pixelated support elements.

Many different spring designs may be employed to form a pixelated support element. One example is shown in FIG. 20, which shows an interconnected spring system 2000 that includes multiple interlinked springs 2002, 2004, 2006, and 2008. The spring system 2000 includes an initial termination 2010, which winds into a first spring coil 2012 (as shown, including two turns). The first spring coil 2012 continues through a relatively straight connector 2014 through a neighboring spring interlinking point 2016 and into a second spring 2018 (as shown, also including two turns). The spring system 2000 continues across the springs 2004, 2006, and 2008 until it reaches the final termination 2020.

The spring system 2000 may be implemented, for example, using Dux® D-springs available from Dux company of Sweden as part of the Dux Pascal™ spring system. The Pascal™ spring system is a cassette system, in which each cassette includes a continuous wire spring inside of tube pockets with a fabric mesh outer layer or shell. The cassettes may be ordered by specifying wire diameter and size. The size may include the number of springs along in one dimension and the number of rows of springs along a second dimension.

Cassettes of different specifications may be employed as desired across a pixelated support structure to tailor support for any part of the body. Thus, for example, stiffer cassettes may be employed where additional support is desired, while softer cassettes may be employed where less support is needed.

As one example, the pixelated support elements may be designed to give approximately 5 pounds of force at a one inch deflection (per support element). That amount of force may be independently chosen according to the individuals who will use the support structures. For example, taking a hypothetical male weighing 250 lbs, that individual has a median distribution approximated by 5 lbs/4 sq. inches (the area of a 2×2 inch pixel) in the neutral seated position. The values may increase to 9 lbs/4 sq. inches in some areas, and drop to zero around the periphery of the pixel.

Table 1, below, depicts an array of 2"×2" support elements supporting the hypothetical individual noted above and were obtained through pressure mapping. The value in each cell is the load carried by that area, with the front of the seat horizontally at the bottom of the table (left to right), and with the centerline of the seat vertically along the table (bottom to top).

TABLE 1

| 0.0475 | 0.8075 | 1.33   | 1.2425 |
|--------|--------|--------|--------|
| 0.955  | 3.68   | 4.195  | 5.46   |
| 2.98   | 6.595  | 8.0925 | 6.1325 |
| 5.4025 | 6.15   | 8.7675 | 7.4525 |
| 5.025  | 6.1375 | 6.6375 | 3.42   |
| 3.745  | 4.54   | 4.705  | 2.4175 |
| 2.2825 | 4.37   | 4.94   | 2.105  |
| 0.1425 | 1.2425 | 1.2125 | 0.0675 |

The pressure map shown in Table 1 may thus help indicate the particular support element stiffnesses desired at any given point, or for any given part of the body.

Exemplary relative pixel size, material, and stiffness include: Small: Hytrel 4074™ material, Flex Mod 9.5 ksi, 2.8 lb/in, Medium: Hytrel 4774™ material, Flex Mod 17 ksi, 5 lb/in, Large: Hytrel 5526™ material, Flex Mod 30 ksi, 8.8 lb/in, extra-large: Hytrel 6356™ material, Flex Mod 48 ksi, 14.1 lb/in, and extra-extra-large: Hytrel 7246™ material, Flex Mod 83 ksi, 24.4 lb/in.

Figure 21:
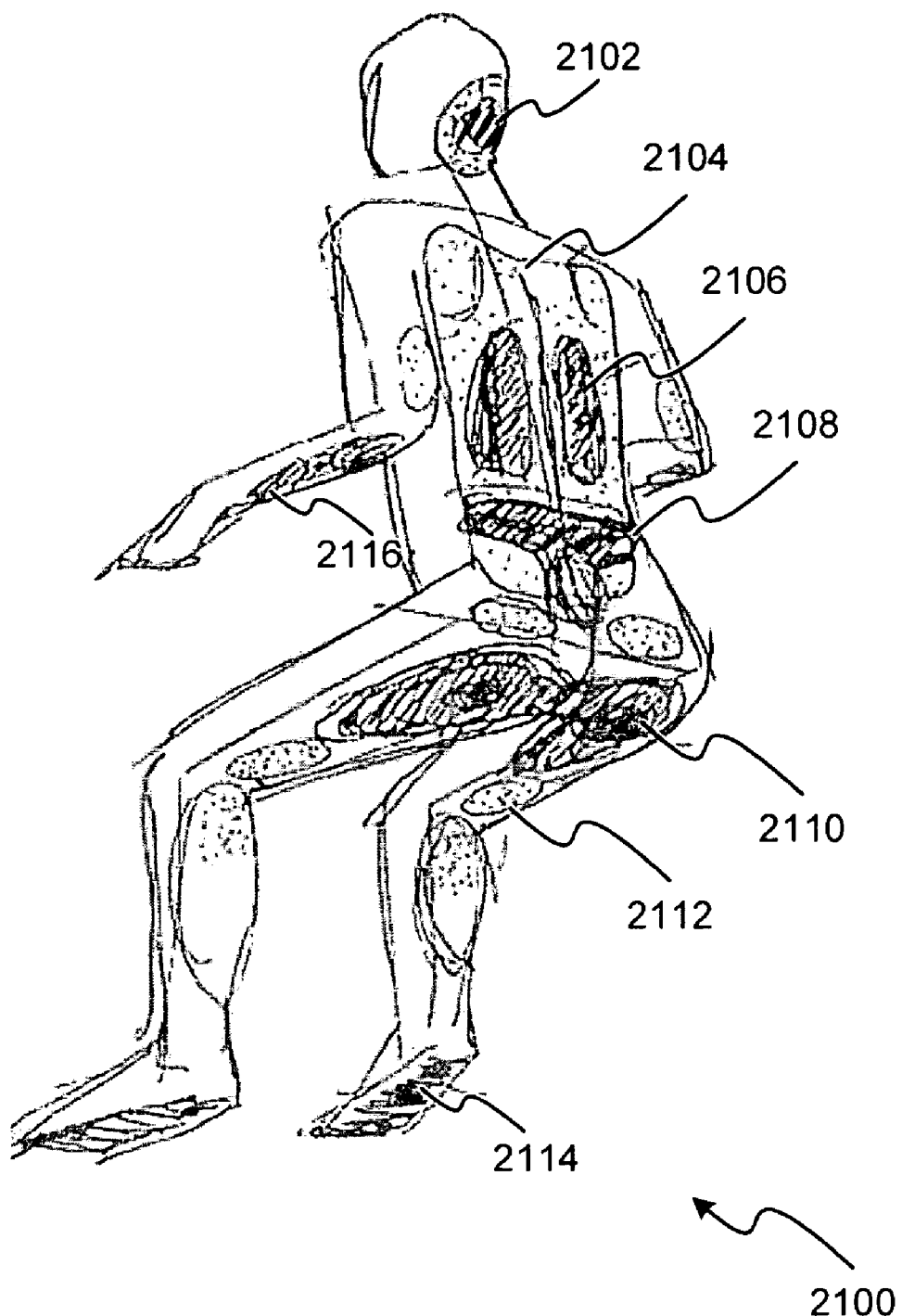
FIG. 21 presents a support diagram of the human body.

FIG. 21 shows a support diagram 2100 of the human body that indicates exemplary locations where additional support may be provided by pixelated support elements. For example, the support elements may be tailored to provide additional support for the cranial cap 2102 or along all or some of the cervical spine 2104. Similarly, the latissimus dorsi muscles 2106, lumbar/sacrum area 2108 and ischia (the sit bones) 2110 may be targeted for additional support. Other areas that may receive support include the hind leg 2112, feet 2114, and arms 2116 between the wrist and elbow.

The spring rate of the support elements may be individually set for any of the locations. Thus, firmer support may start at higher load areas, with the support optionally feathering out as the support surface extends away. For example, firm support may be provided along the spine 2104, and softened laterally away form the spine 2104.

Figure 22:
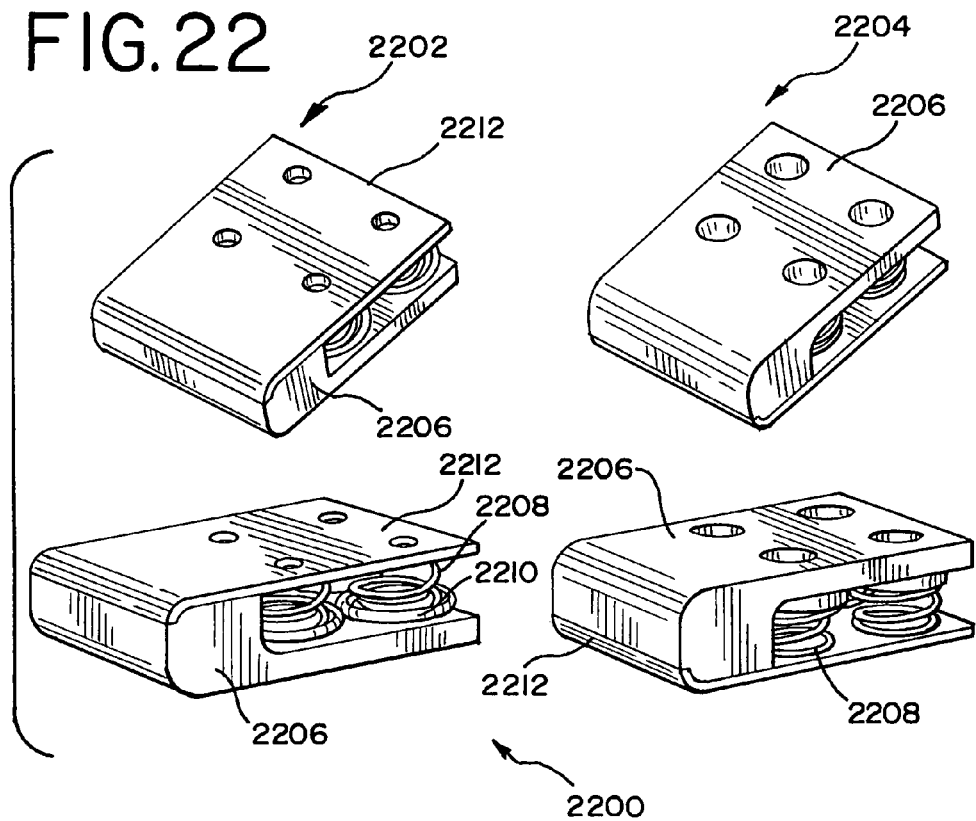
FIG. 22 shows a cutaway section of a continuous surface that includes individual support elements.

Addition examples of pixelated support elements and their implementations are discussed below. For example, with regard to FIG. 22, a support element 2200 is shown in a bottom view 2202 and a top view 2204. The support element 2200 represents a cutaway section of a continuous surface. The support element 2200 includes a porous or textured layer 2206 formed, as examples from foam or a soft composite material. The textured layer 2206 provides the primary interface between the sitter and the suspension elements 2208.

The suspension elements 2208 may be implemented as springs that rest in a cup 2210. The springs may be steel springs, thereby providing a wide range of spring rate tuning capability. The cups 2210 provide an intermediate transition between the soft textured layer 2206 and the springs and a relatively rigid bottom structural surface 2212. Note that the textured surface 2206 may be relieved to enhance air flow and reduce heat buildup.

Figure 23:
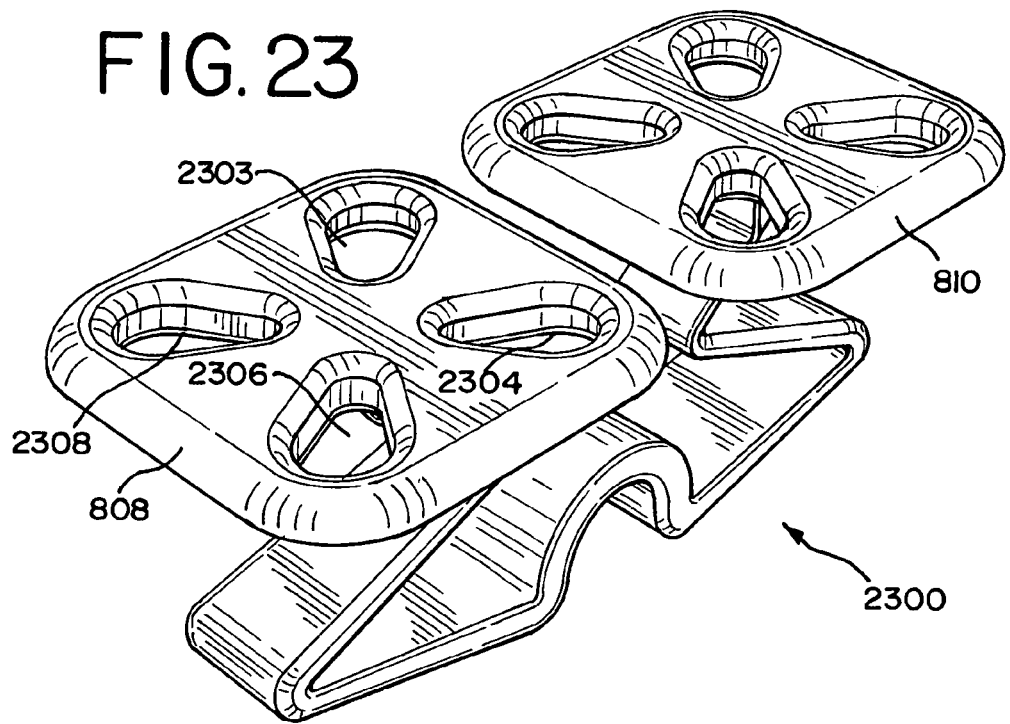
FIG. 23 illustrates a variation of the support element illustrated in FIG. 8.

FIG. 23 presents a support element 2300 that is a variation on the pixelated support element 800 shown in FIG. 8. Specifically, the support element 2300 includes cutouts 2302, 2304, 2306, and 2308 in the load bearing elements 808 and 810. The cutouts 2302-2308 may optionally be included to provide a porous surface that enhances aeration through the textile material interface support on the load bearing elements 808 and 810.

Figure 24:
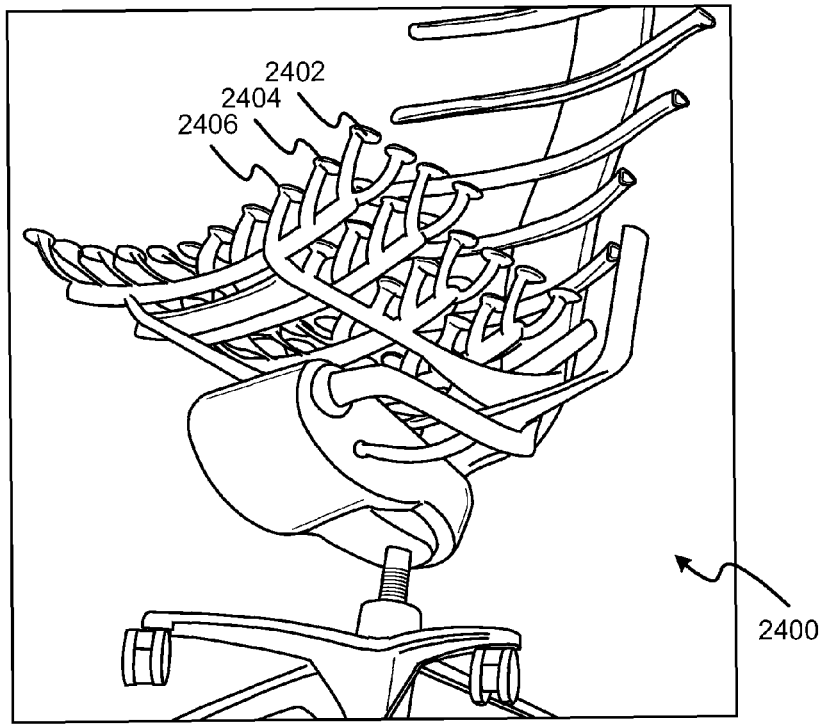
FIG. 24 portrays a variation on the cantilevered support structure shown in FIG. 14.
Figure 25:
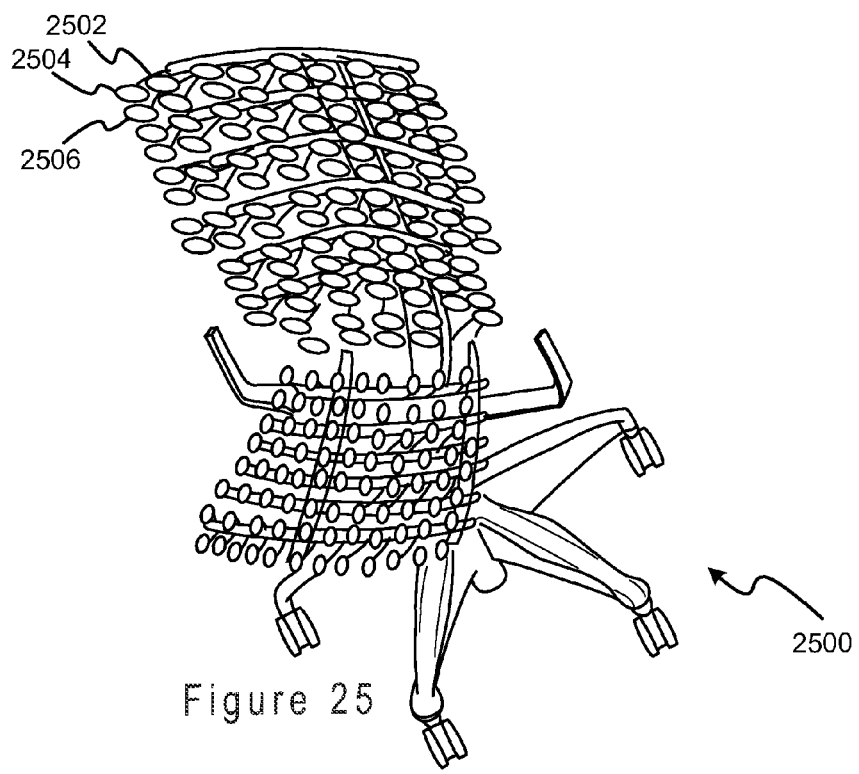
FIG. 25 presents a second view of the cantilevered support structures shown in FIG. 24.

FIGS. 24 and 25 present pixelated support structures 2400 and 2500 that are a variation on the pixelated support structures 1400 shown in FIG. 14. In particular, rather than connecting the load bearing elements with bridging connections, the load bearing elements are independent. As examples, the seat rest support elements 2402, 2404, and 2406 are not connected by bridging connections. Similarly, the back rest support elements 2502, 2504, and 2506 project up from their support spline without interconnection between other support elements.

The interface between the sitter and the support elements (e.g., a soft foam or fabric support) may be made thicker to mask the independent support elements. As noted above, each cantilever branch may be individually tuned to provide selected stiffness. As a result, the seat rest or back rest may provide stiffer or softer support for the body at selected locations.

Turning next to FIG. 26, that figure presents a section 2600 of support elements 2602 arranged along a central spine 2604. Each support element 2602 includes two cantilever sections 2606 and 2608. Each cantilever section 2606 includes a load bearing element 2610 and two spring arms 2612 and 2614.

The spring arms 2612 and 2614 form a spring that collapses upon itself. The support elements 2602 may, for example, be attached to the spines that form the back rest or seat rest shown in FIGS. 14-17, 24, or 25 instead of the cantilevered support elements. The support elements 2602 may be manufactured from Hytrel™ material in an injection molding process. In one implementation, there is approximately 2.0 inches between load bearing element centers, and approximately 1.5-2.0 inches vertically from the spine 2604 to the load bearing elements 2610.

FIG. 27 shows a support element 2700 that is a variation of the double action spring pixelated support element 700. More specifically, the support element 2700 includes an upper load bearing element 2702, a lower base element 2704, and a spring system 2706 between the upper load bearing element 2702 and the lower base element 2704.

The spring system 2706 includes the cantilever elements 2708 made of a flexible material. The cantilever elements 2708 flex downwardly to resist the action of the plunger elements 2710 that extend downward from the upper load bearing element 2702. In particular, the cantilever elements 2708, arranged conically, invert to constantly resist the plunging action of the plunger elements 2710.

The lower base element 2704 and cantilever elements 2708 may be formed from an elastomer, such as Hytrel™ material, while the upper support element 2702 may be, for example, polypropylene. A co-molding process may be employed to form the lower base element 2704 to integrate the cantilever elements 2708 into the more rigid lower base element 2704.

In addition, the V-slots 2712 may be included to provide a living hinge between individual lower base elements. Optionally, the intersection of each set of four support elements is left open. As a result, the plunger elements 2710 may articulate to some degree.

Figure 28:
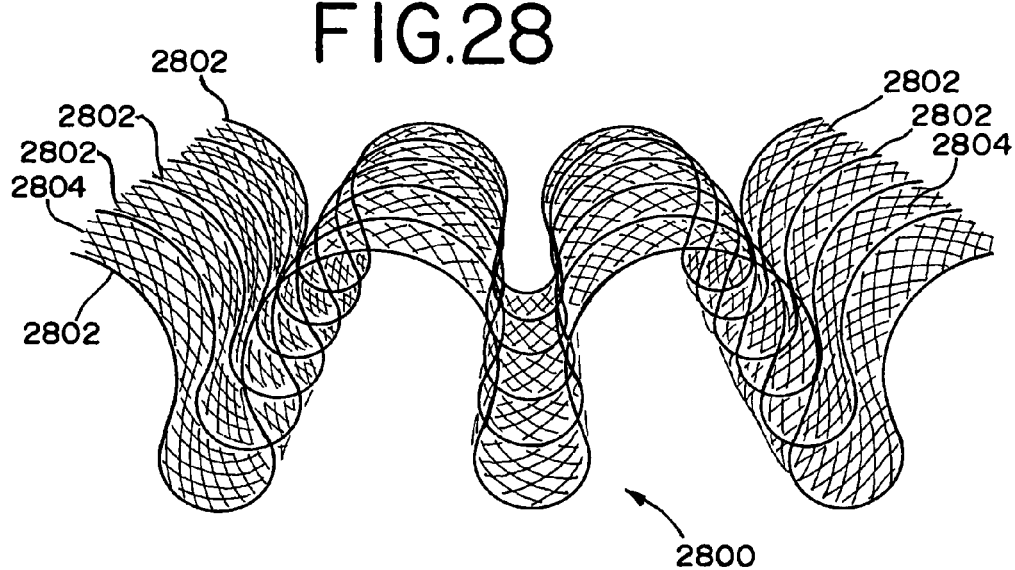
FIG. 28 portrays a support element made from a wire and mesh.

Turning to FIG. 28, that figure shows a support element 2800 fabricated from parallel wires 2802 (e.g., steel wire) and mesh 2804 attached between the wires 2802. The support element 2800 may, as shown, be formed into an undulating shape that provides spring action for compression and restoration. The mesh 2804 may be a three dimensional knitted material In one implementation, the mesh 2804 is a '3 mesh' manufactured by Muller Textil of Woonsocket, R.I., USA. The mesh 2804 may provide the interface between the sitter and the support element 2800 as a whole.

Figure 29:
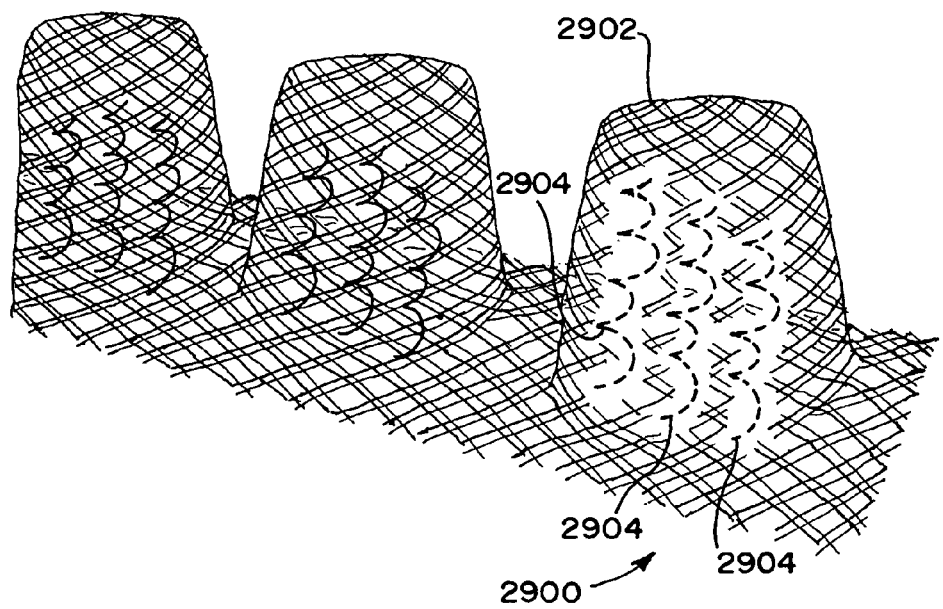
FIG. 29 shows a support element made form a wire and mesh.

FIG. 29 also shows a support element 2900 fabricated from mesh 2902 and spring action filaments 2904. The support element 2900 is formed in a tapered cylindrical shape, though other shapes may also be employed. The top of the truncated tapered cylinder forms a load bearing element. The mesh 2902 may be implemented in the same way as noted above with regard to the support element 2800 shown in FIG. 28.

The filaments 2904 may be nylon filaments woven by hand into the wall of the mesh 2902. The filaments impart a spring effect to the mesh 2902 and thereby provide a restorative force as the mesh 2902 deforms when a load is applied to the load bearing element. In general, either of the support elements 2800 or 2900 may, be characterized by a distance of approximately 2.0 inches between load bearing element centers, and approximately 1.5-2.0 inches of vertical travel.

Figure 30:
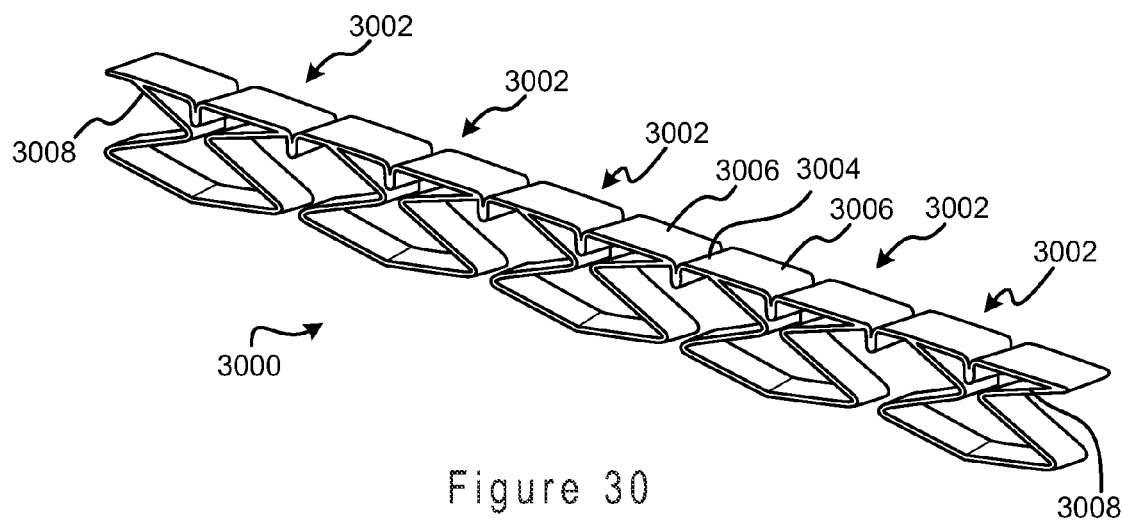
FIG. 30 illustrates an extruded section of support elements such as those shown in FIG. 8.

FIG. 30 shows a section 3000 of support elements 3002 connected at bridging connections 3004 (e.g., a hinge) between load bearing elements 3006. The load bearing elements 3006 are present at the end of spring arms 3008. The support elements 3002 may be, for example, the support elements illustrated above in FIG. 8 or 23.

When the support elements 3002 are connected as shown in FIG. 30, the section 3000 imparts a degree of control over the load bearing elements 3006. In other words, the bridging connections 3004 may constrain movement of the load bearing elements 3006 so that they do not catch or pinch the sitter.

The section 3000 may be extruded as a single piece. Individual sections may then be cut apart in desired lengths to be attached, as examples, to the back rest or seat rest spines shown in FIGS. 14-17 and 24-25. The sections may be attached by employing a mechanical means of snapping or dovetailing the sections 3000 onto the spines. When the wall thickness of the spring arms 3008 is held approximately constant, extruding multiple support elements 3002 in a section 3000 may yield a consistent spring rate among multiple support elements 3002. On the other hand, when the wall thickness of the spring arms 3008 is varied, the spring rate may be changed. For example, the spring arms 3008 for the central support elements 3002 may be made thicker to increase the spring rate for those support elements 3002, and thereby provide additional support.

Figure 31:
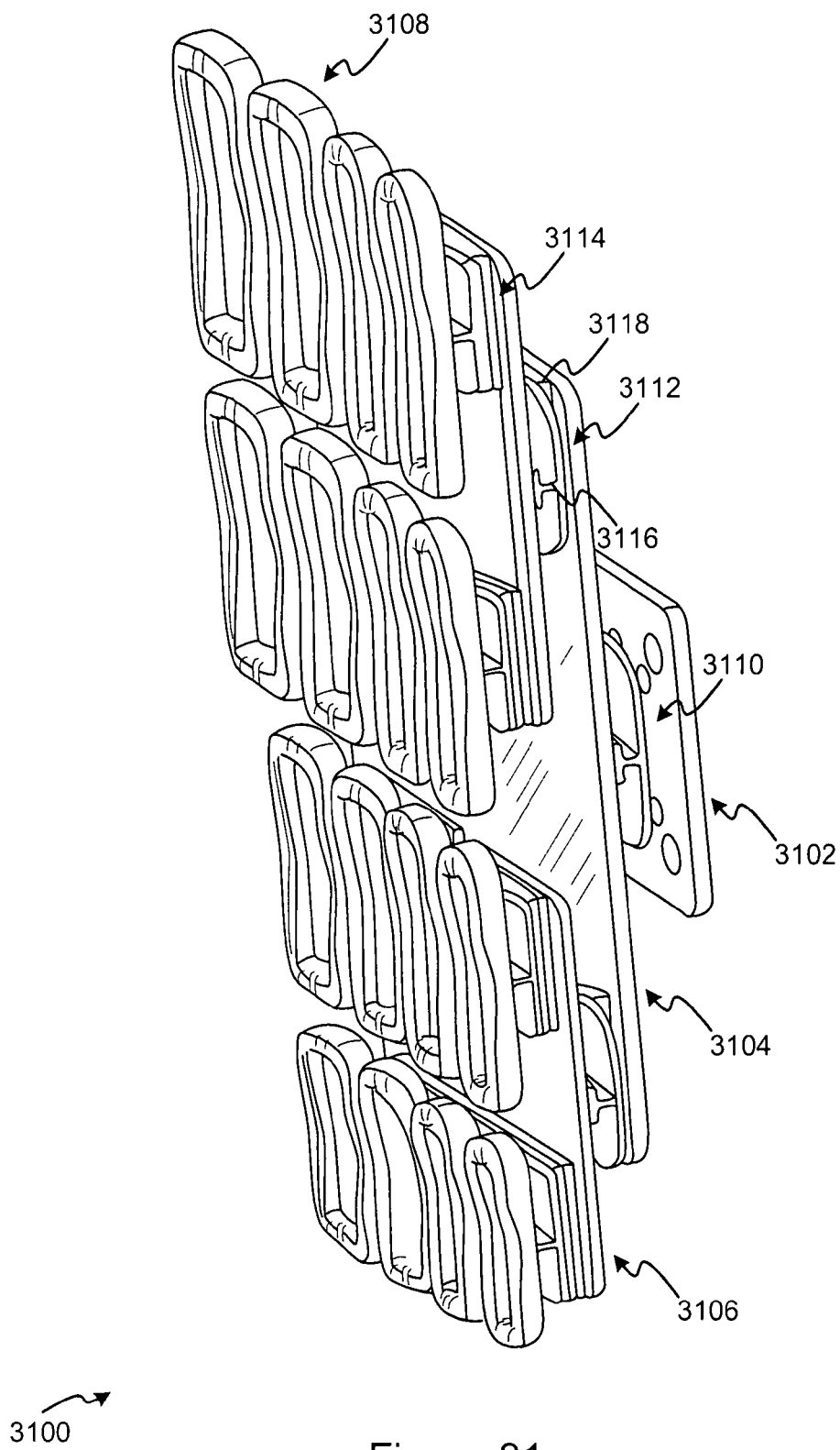
FIG. 31 shows a view of a multi-tier pixelated support structure.

FIG. 31 shows a view of a multi-tier pixelated support structure 3100. The structure 3100 includes a first tier 3102, a second tier 3104 and a third tier 3106. The third tier 3106 supports load bearing elements 3108 that may vary in shape and size. Although sixteen (16) load bearing elements 3108 are shown in FIG. 31, the structure 3100 may include more or fewer load bearing elements. The structure 3100 may couple tiers 3102-3106 together through hinges such as hinges 3110, 3112, and 3114 as examples.

Each hinge may be formed from cantilevers or living hinges. For example, the hinge 3112 includes a first H-shaped cantilever 3116 and a second perpendicularly oriented H-shaped cantilever 3118. Accordingly, the tiers and load bearing elements may support loads by bending in two independent directions.

The hinges may be manufactured from polypropylene, for example. The structure 3100 may be formed in individual pieces for the load bearing elements, hinges, and tiers. The pieces may then be snapped or otherwise secured together to form the overall structure 3100.

The first tier 3102 may provide a connection mechanism to an underlying support structure to which the structure 3100 will attach. The connection mechanism may be a snap-on interface, bolt or screw holes, or any other type of connection mechanism. Multiple structures 3100 may be attached to the underlying support structure to form a larger pixelated support surface for the back, seat, arms, or other area of the body.

The size of the load bearing elements 3108, the size of the cantilevers, and the materials that form the structure 3100 may be independently adjusted to tailor the support provided by the load bearing elements. For example, a back rest incorporating the structure 3100 may adjust the size of the load bearing elements 3108 to increase support closer toward the spine and down the back.

Figure 32:
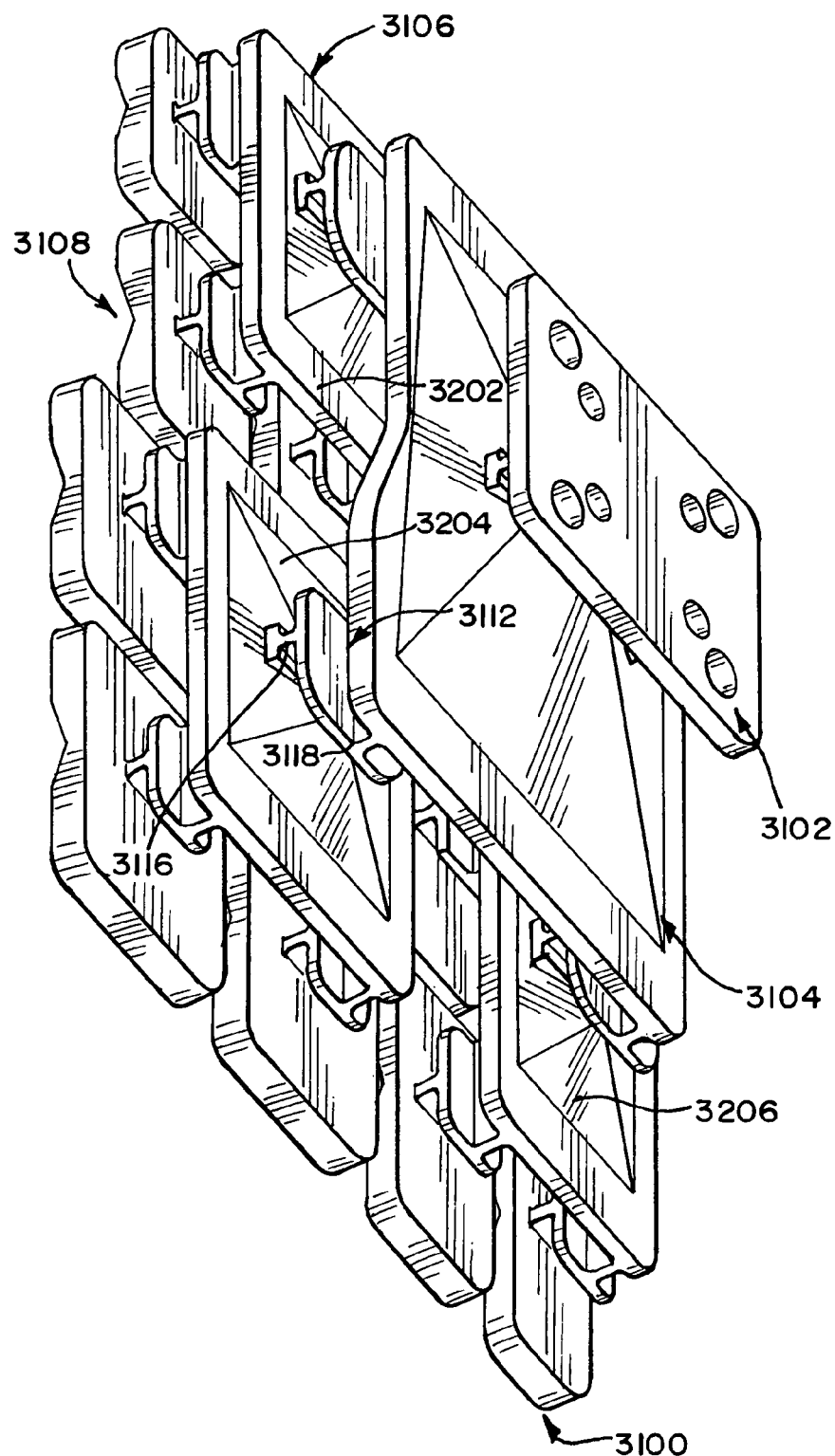
FIG. 32 shows a second view of the multi-tier pixelated support structure shown in FIG. 31.
Figure 33:
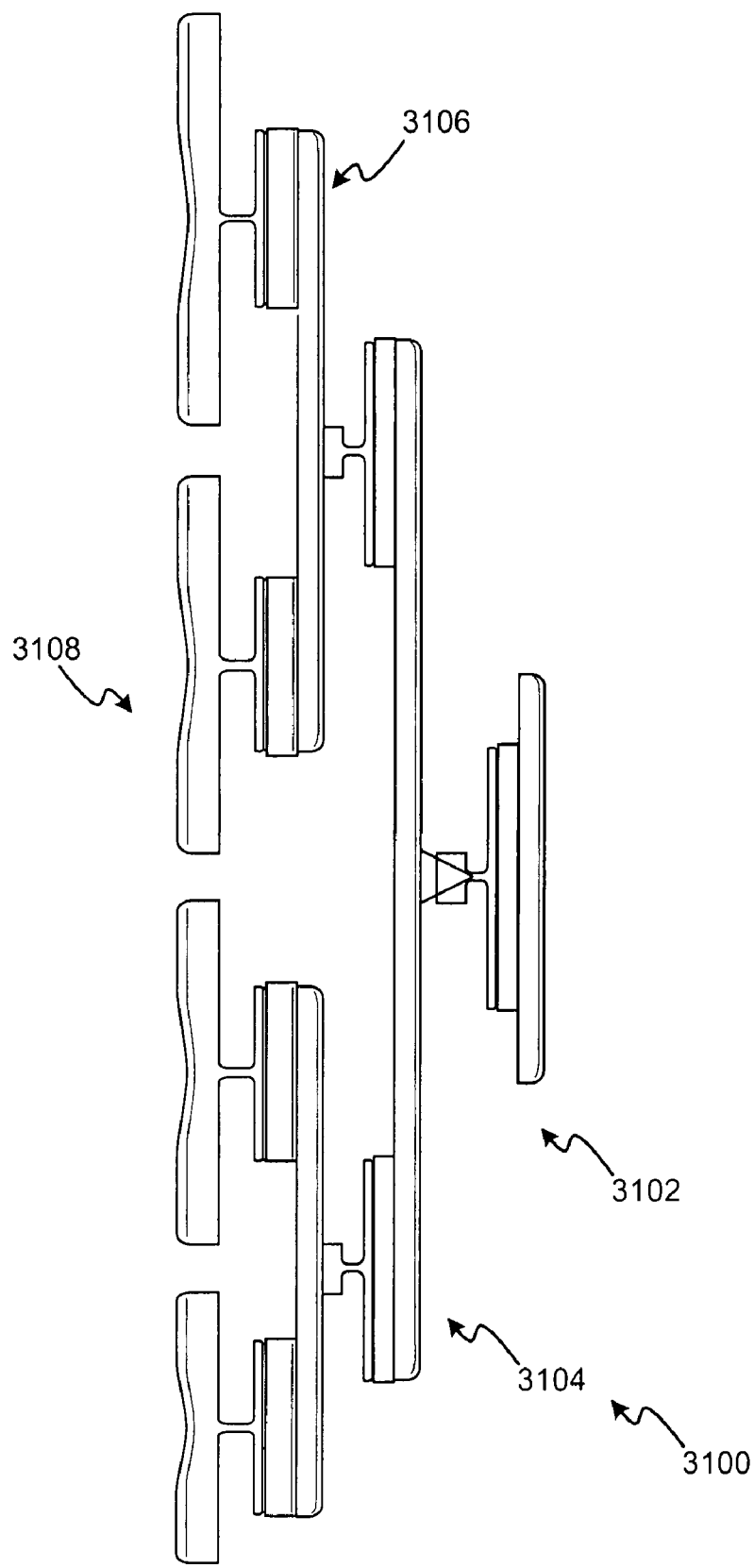
FIG. 33 illustrates a third view of the multi-tier pixelated support structure shown in FIG. 31.

FIGS. 32 and 33 show additional views of the multi-tier pixelated support structure shown in FIG. 31. FIG. 32 shows the structure 3100 from the bottom. FIG. 33 illustrates a side view of the structure 3100. The second tier 3106 may include four sub-tiers, three of which are visible in FIG. 32 as sub-tiers 3202, 3204, and 3206. Each sub-tier may connect to the first tier 3102 through H-shaped cantilevers oriented at 90 degrees to one another.

Figure 34:
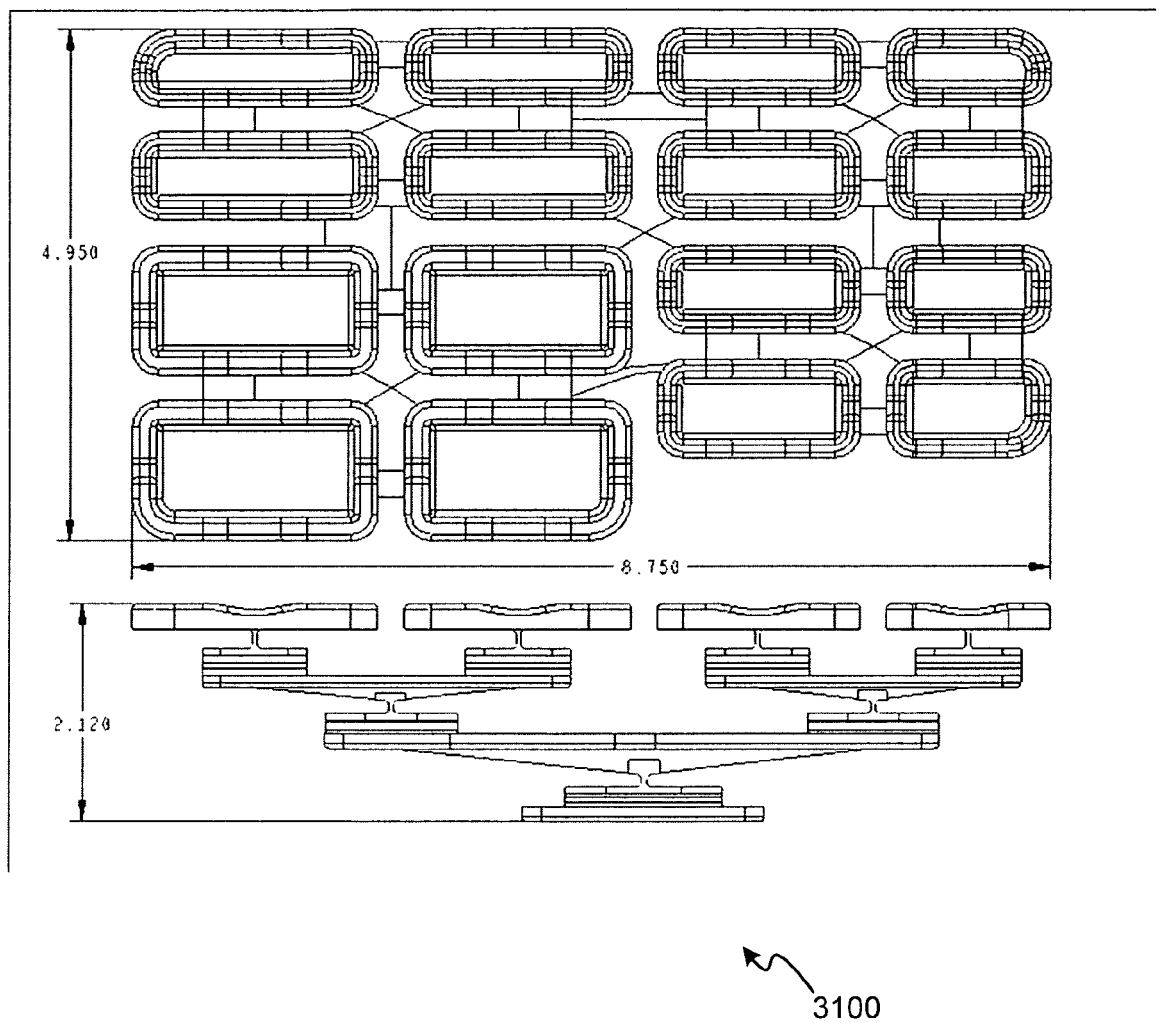
FIG. 34 shows dimensional information for the multi-tier pixelated support structure shown in FIG. 31.

FIG. 34 shows exemplary dimensional information for the multi-tier pixelated support structure 3100. The structure 3100 may vary widely in size and shape to suit any particular design. Thus, any of the load bearing elements 3108, tiers 3102-3108, and H-shaped cantilevers may be independently sized and shaped. In the example shown in FIG. 34, the structure 3100 includes sixteen (16) load bearing elements that vary in length and width. The structure is approximately 8.750 inches wide, 4.950 inches long, and 2.120 inches high.

Figure 35:
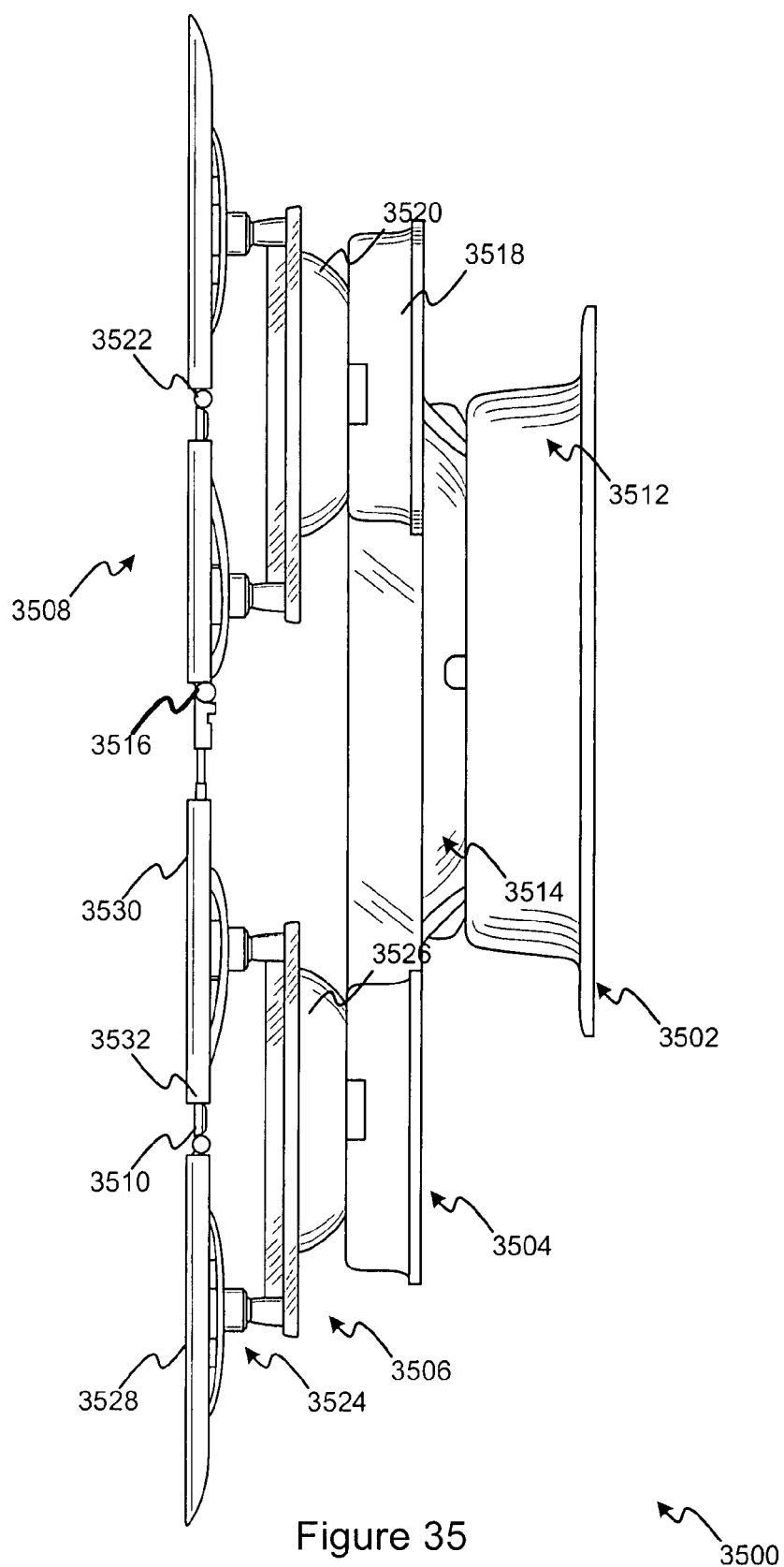
FIG. 35 shows a view of another implementation of a multi-tier pixelated support structure.

FIG. 35 shows a view of another implementation of a multi-tier pixelated support structure 3500. The structure 3500 includes a first tier 3502, a second tier 3504 and a third tier 3506. The third tier 3506 supports load bearing elements 3508 that may vary in shape and size and that may be connected by bridges 3510. The structure 3500 may support sixteen (16) load bearing elements, for example, although the structure may instead support more or fewer load bearing elements.

The first tier 3502 may be formed as a spherical molded socket 3512. A corresponding spherical ball section 3514 of the second tier 3504 couples into the socket 3512 as described in more detail below. The spherical socket 3512 has a center point 3516 near the contact surfaces of the load bearing elements 3508. Accordingly, as the second tier 3504 moves, the load bearing elements 3508 move vertically around point 3516 and uncomfortable horizontal shifting may be reduced.

Similarly, the second tier 3504 may include molded spherical sockets 3518. The third tier 3506 may then include a molded spherical ball section 3520 that couples into the socket 3518. As shown in FIG. 35, the socket 3518 has a center point 3522 that may be near the contact surfaces of the load bearing elements 3508. As the ball section 3520 moves, the load bearing elements 3508 move vertically around point 3522. As will be shown in more detail below, the load bearing elements 3508 may also connect to the third tier 3506 through a ball and socket connection 3524.

The horizontal spacing of the components of the structure 3500 may be from any given center point may be independently adjusted. For Example, the ball section 3520 may be located more closely to the center point 3516 than the ball section 3526. In that case, the load bearing elements supported by the portion of the second tier that includes the ball section 3520 provide the feeling of additional force or pressure with respect to rotation around the center point 3516. Similarly, because the load bearing element 3528 is farther than the load bearing element 3530 from the center point 3532, the load bearing element 3528 has less force or pressure with respect to rotation around the center point 3532. The other multi-tiered pixelated support structures may also vary the relative locations of pivots between tiers in order to configure the force applied to each load bearing element.

Figure 36:
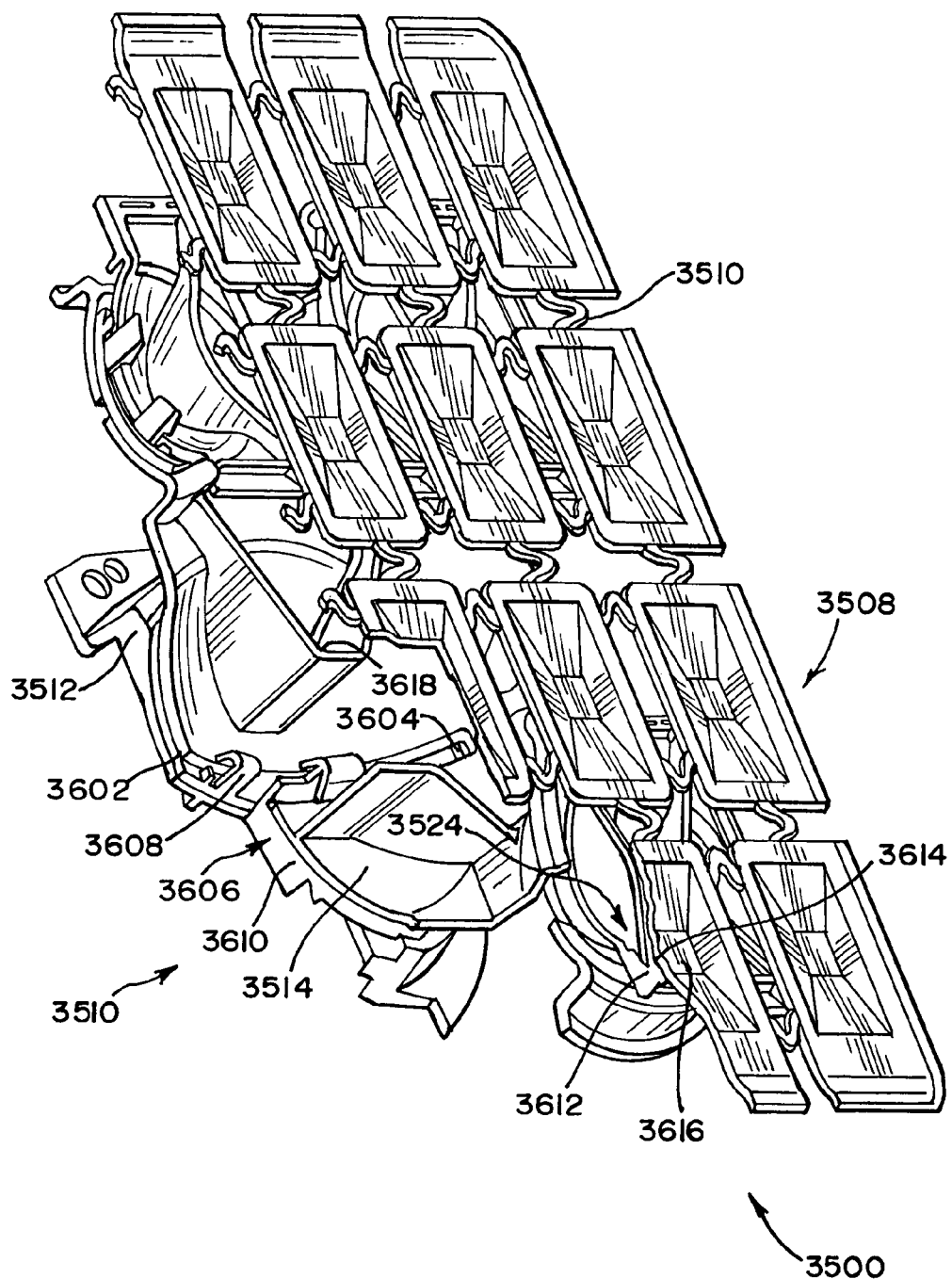
FIG. 36 shows a second view of the multi-tier pixelated support structure shown in FIG. 35.

In FIG. 36, a sectional view of the structure 3500 is present. The socket 3512 in the first tier 3502 couples to the ball section 3514 through a bearing 3602. The bearing 3602 may extend up through a slot 3604 in the ball section 3514 and down through a perpendicular slot 3606 through the socket 3512. Ribs 3618 may be included to strengthen the ball section 3514.

Each slot permits motion of the second tier 3504 along its length, although stops may be inserted to constrain that motion in some implementations. In addition, a friction mechanism such as a rubber O-ring may be placed between the ball section 3514 and the socket 3512 to provide resistance to gravitational or other forces that would deflect the structure when no load is applied. The bearing tabs 3608, 3610 may snap through the slots 3604, 3606 to retain the bearing 3602 in place. The third tier 3506 may couple to the second tier 3504 through the same bearing and slot arrangement.

A sectional view of the socket connection 3524 is also shown in FIG. 36. The socket connection 3524 includes a stem 3612 that terminates in a ball 3614. The load bearing element may then include a socket 3616 that mates with the ball 3614. The socket connection 3524 may permit the load bearing elements 3508 significant freedom of motion to comfortably support or conform to a load.

Figure 37:
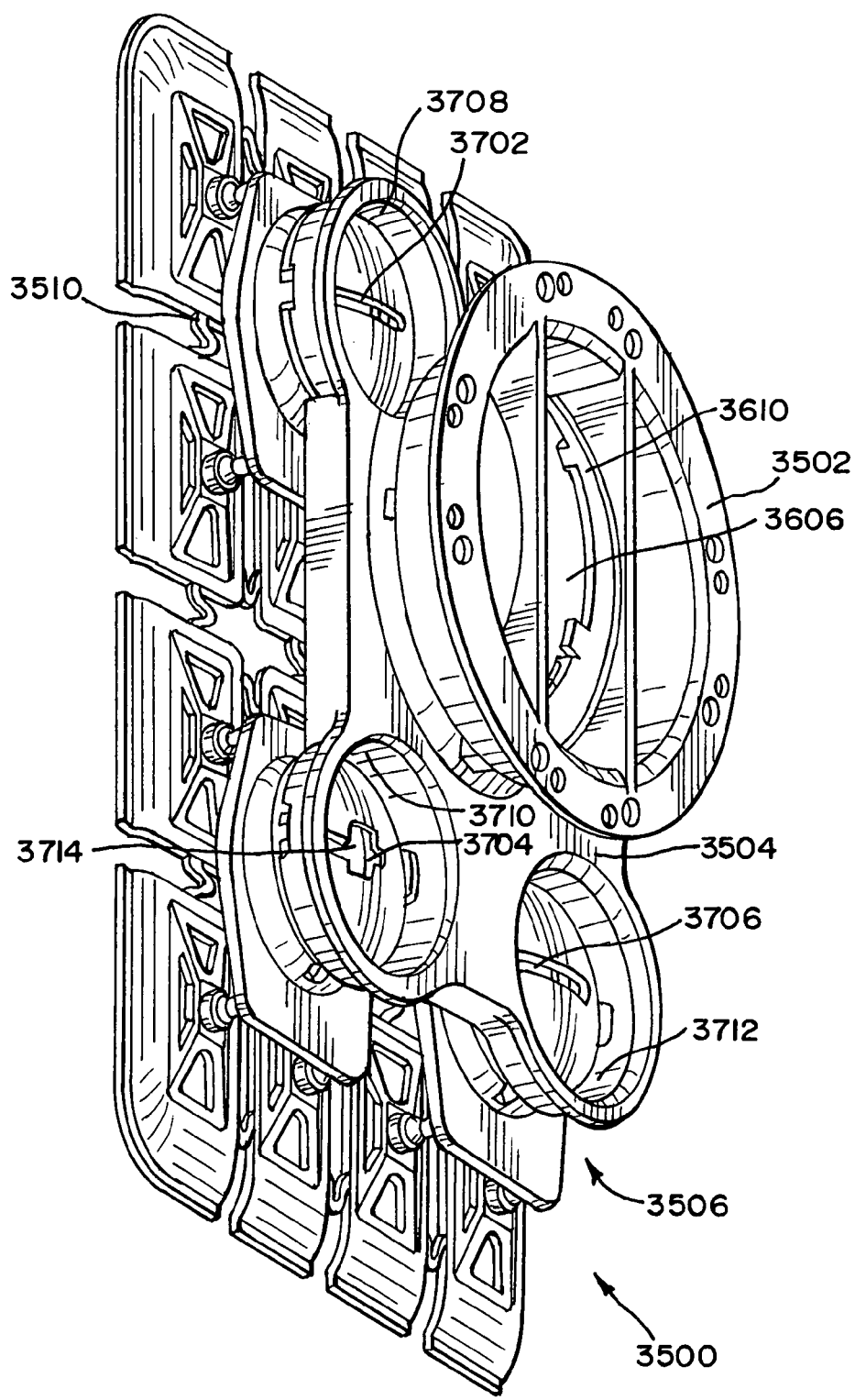
FIG. 37 illustrates a third view of the multi-tier pixelated support structure shown in FIG. 35.

FIG. 37 illustrates a bottom view of the multi-tier pixelated support structure shown in FIG. 35. The bottom view shows the slot 3606 through the socket 3512 and the bearing tabs 3610 that extend down through the slot 3606. In addition, FIG. 37 illustrates the slots 3702, 3704, and 3706 in sockets 3708, 3710, and 3712 provided in the second tier 3504. Tabs 3714 for a spherical bearing that couples a portion of the third tier 3506 to the second tier 3504 are also shown.

The load bearing elements 3508 may be formed from polypropylene, for example. Rigid nylon may be used to form the tiers 3502-3506. The bearing pieces may be formed from Acetal material or another self lubricating material.

Figure 38:
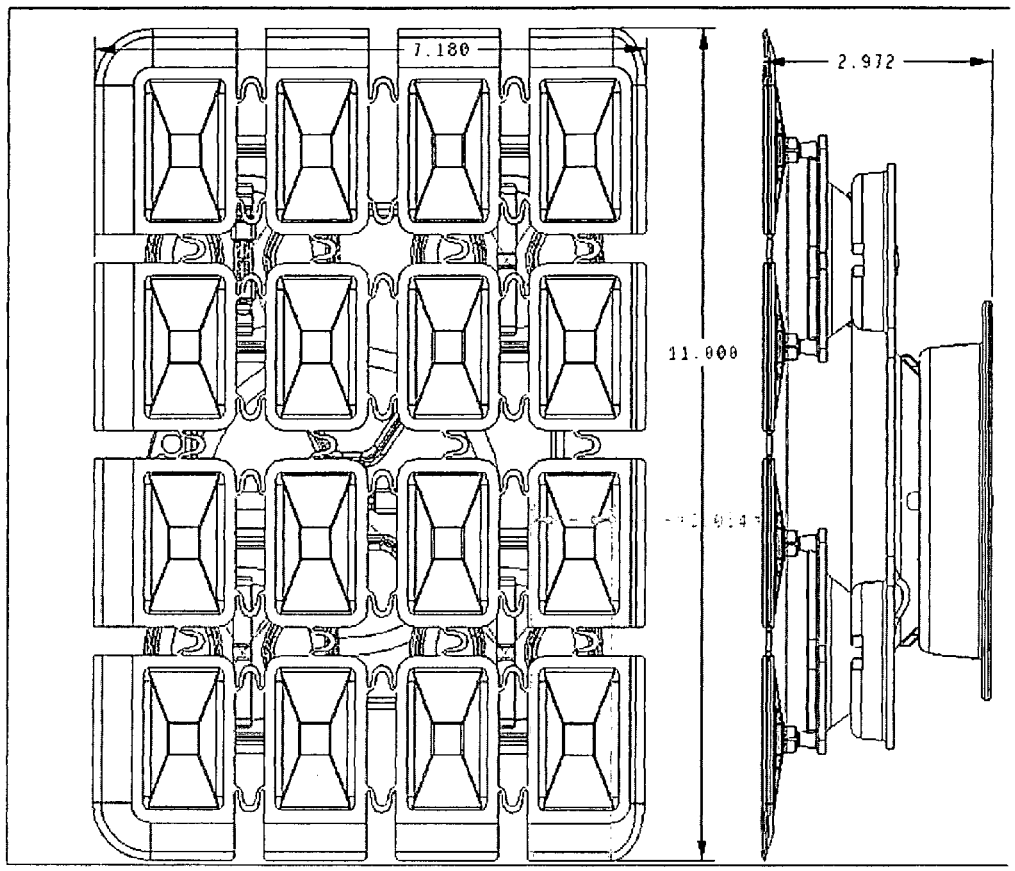
FIG. 38 shows dimensional information for the multi-tier pixelated support structure shown in FIG. 35.

FIG. 38 shows exemplary dimensional information for the multi-tier pixelated support structure 3500. The structure 3500 may vary widely in size and shape to suit any particular design. The tiers 3502-3506, load bearing elements 3508, ball and socket joints, and bearings may be independently sized and shaped. In the example shown in FIG. 38, the structure 3500 includes sixteen (16) load bearing elements 3508. The structure is approximately 11.000 inches wide, 7.180 inches long, and 2.972 inches high.

Figure 39:
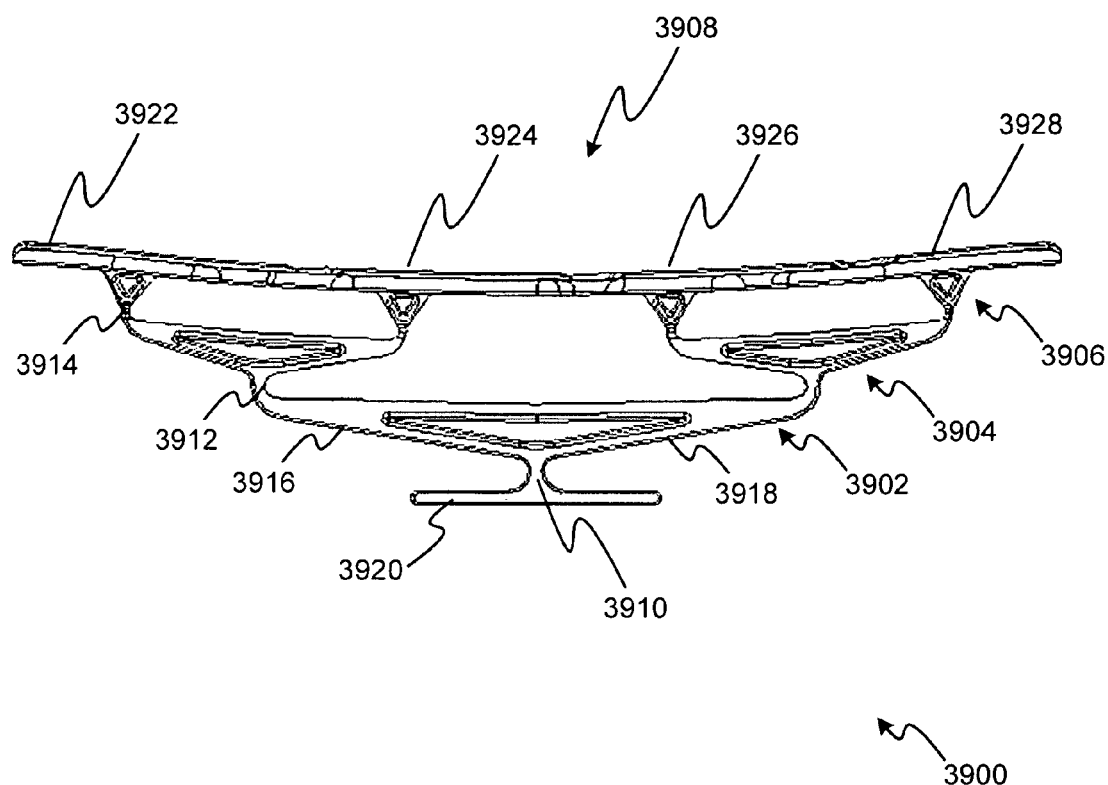
FIG. 39 shows a side view of a multi-tier pixelated support structure.

FIG. 39 shows a side view of a multi-tier pixelated support structure 3900. The structure 3900 includes a first tier 3902, a second tier 3904 and a third tier 3906. The third tier 3906 supports load bearing elements 3908. The load bearing elements 3908 may vary in shape, size, and number. Four load bearing elements, one supported by each of the four support arms in the third tier 3906 are labeled 3922, 3924, 3926, and 3928.

The structure 3900 may couple together the tiers 3902-3906 using living hinges (three of which are identified as 3910, 3912, and 3914 in FIG. 39) or in another manner. Support arms may branch out from each hinge. For example, the first support arm 3916 and the second support arm 3918 branch out from the hinge 3910. Alternatively, the support arms may be elastic and deflect under dynamic load.

The structure 3900 may also include a base connection 3920. The base connection 3920 may connect the structure 3900 to an underlying support structure. The underlying support structure may define the skeleton for a chair or any other support structure. The base connection 3920 may include a snap-on interface, bolt or screw holes, or other type of connection mechanism. One or more structures 3900 may be attached to the underlying support structure to form a larger pixelated support surface for the back, seat, arms, or other area of the body.

The structure 3900 may be formed from injection molded polypropylene. Injection molding may be employed for individual pieces of the structure 3900, including the load bearing elements 3908, tiers 3902-3906, and support arms 3916-3918, or for the structure 3900 as a whole. Individual pieces may then be snapped, screwed, glued, or otherwise secured together to form the structure 3900.

Figure 40:
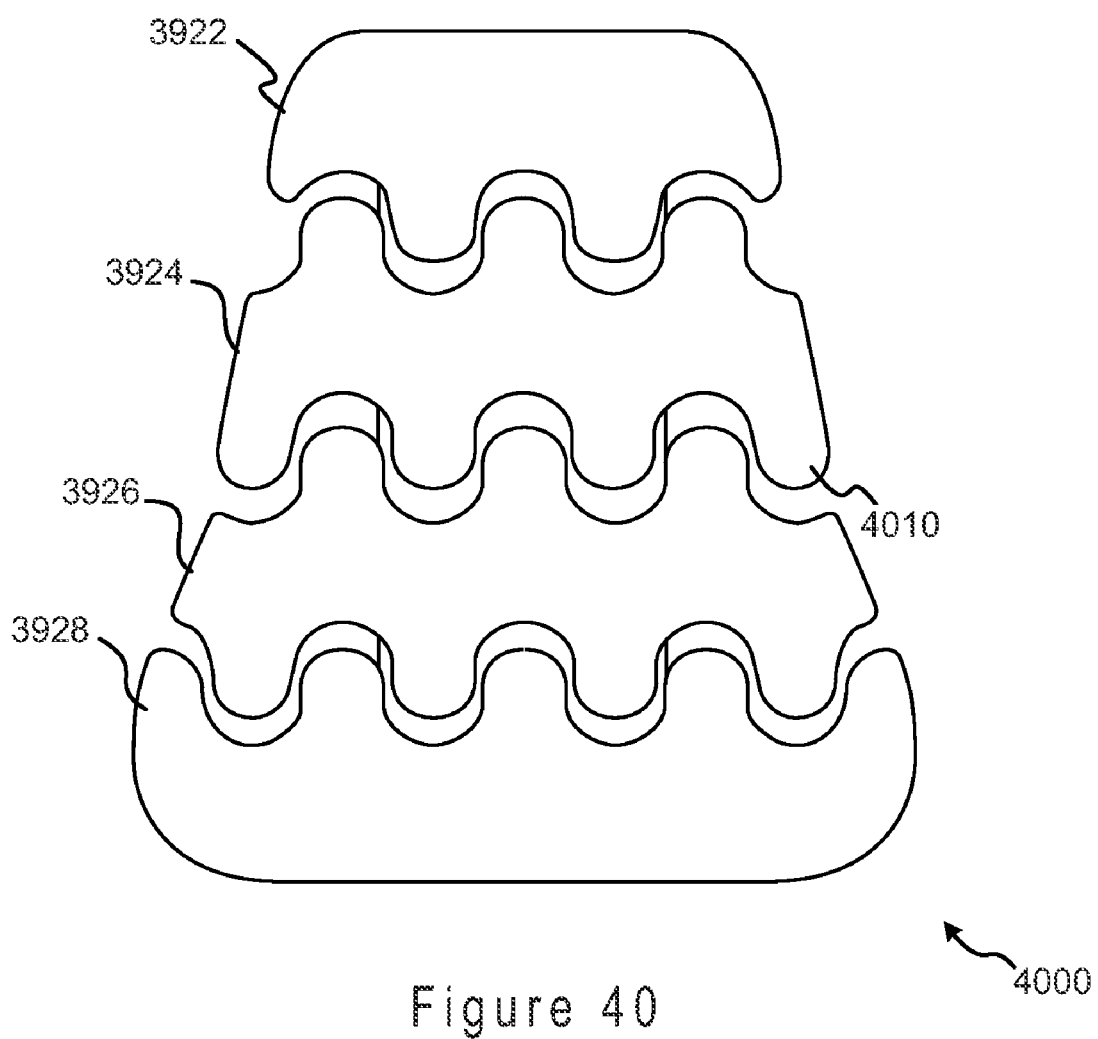
FIG. 40 shows a top view of a multi-tier pixelated support structure.
Figure 41:
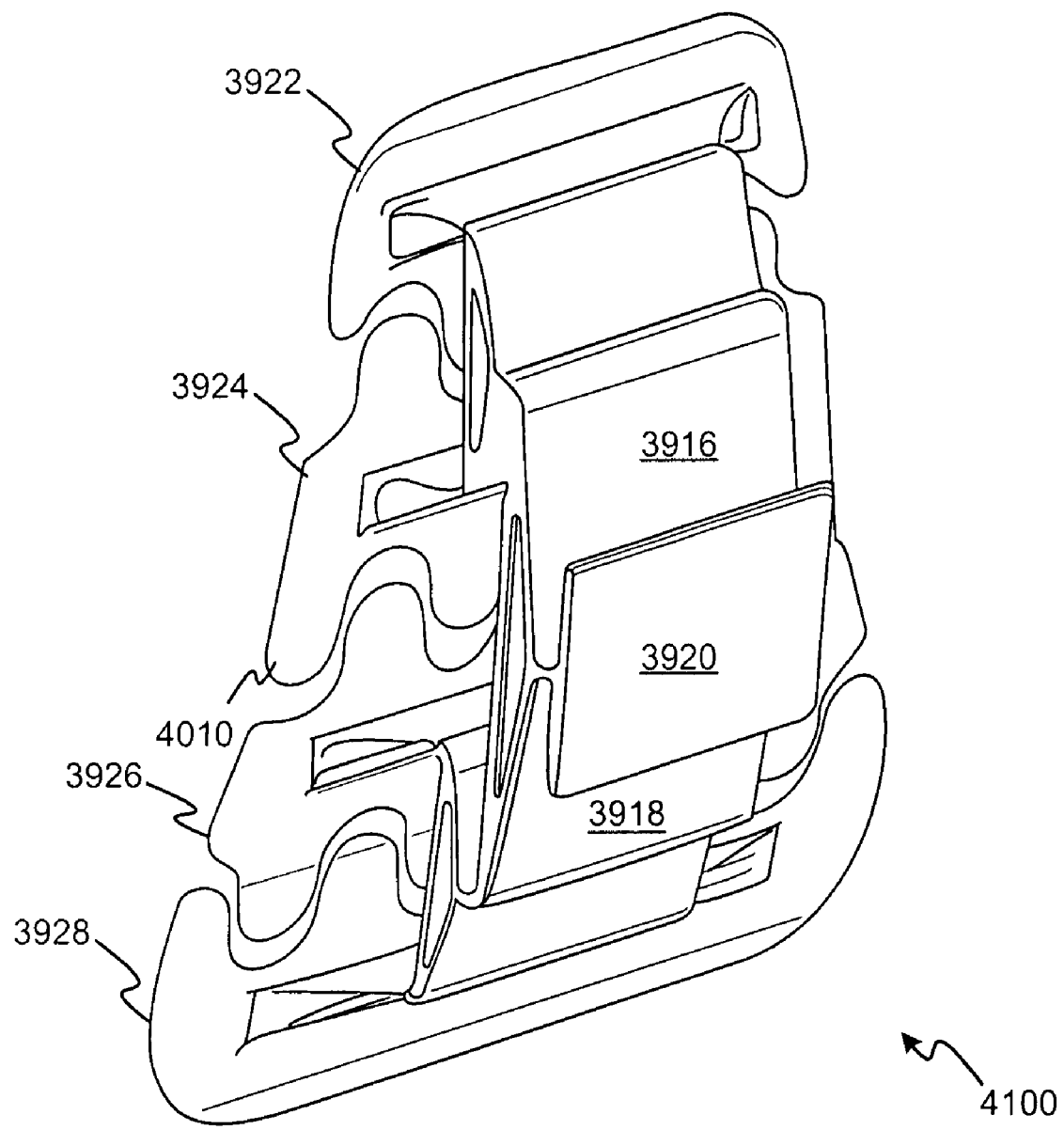
FIG. 41 shows a perspective view of a multi-tier pixelated support structure.

In FIG. 40, a top view 4000 of the structure 3900 is present. One or more of the load bearing elements 3922-3928 may include a shaped edge 4010. For example, the shaped edge may be scalloped to reduce the amount of straight edges between neighboring load bearing elements. The shaped edges 4010 may thereby reduce pinching of clothing or skin between the load bearing elements 3922-3928 as they move in response to an applied load. FIG. 41 provides a perspective view from the back of the multi-tier pixelated support structure 3900.

The structure 3900 may vary widely in shape and size. In one implementation where the structure 3900 is used to support part of a body, the structure 3900 may be 10.5 inches tall, and may vary between 6 inches and 9.5 inches wide. Other dimensions may be employed, and each load bearing element 3922-3928 may individually vary in size, shape, dimension, and material. In addition, the structure 3900 may include more or fewer tiers.

Figure 42:
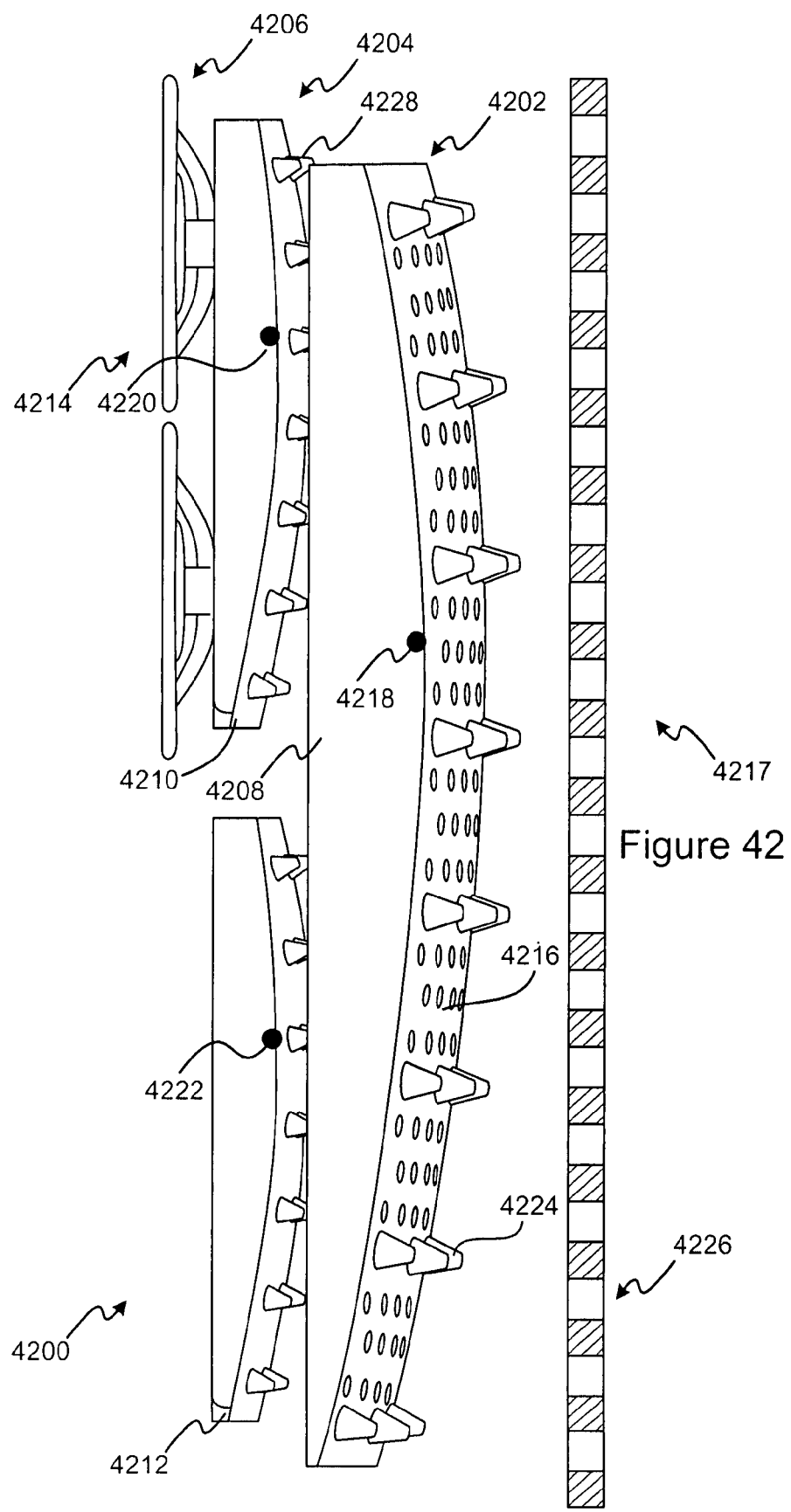
FIG. 42 shows a side view of a multi-tier pixelated support structure.

FIG. 42 shows a side view of a multi-tier pixelated support structure 4200. The support structure 4200 includes a first tier 4202, a second tier 4204 and a third tier 4206. Each tier may include support elements. In FIG. 42, the first tier 4202 includes a first tier support element 4208 and the second tier 4204 includes the second tier support elements 4210 and 4212. The third tier 4206 may include one or more load bearing elements 4214.

The first tier 4202 may include curvature in one or more planes on one or more surfaces. In FIG. 42, the first tier 4202 is curved in two planes on the lower surface 4216 that contacts the underlying support structure 4217. The curvature may vary and may provide additional force or pressure at selected locations over the structure 4200.

For example, in FIG. 42, the curvature of the first tier 4202 varies in two directions from the center point 4218. The center point 4218 may be the tangent point between the first tier 4202 and the underlying support structure 4217 when the support structure 4200 is unloaded. Center points 4220 and 4222 are also shown for the support elements 4210 and 4212.

To the left of the center point 4218, the first tier 4202 may have a first radius, while to the right of the center point 4218, the first tier 4202 may have a second radius. In addition, the distance between center points 4218-4222 may vary. In FIG. 42, the distance between the center points 4218 and 4220 is shorter than the distance between the center points 4218 and 4222. Additional force or pressure may be given by increasing or decreasing the distance between center points, or increasing or decreasing the radius of curvature, or both.

The lower surface 4216 may include pegs 4224 that interface with receptacles 4226 in the underlying support structure 4208. In one implementation, the underlying support structure 4217 may be peg board or another perforated or dimpled structure that may accept the pegs 4224. The pegs 4224 may be sized accordingly and in one implementation may be 0.25 inches in diameter and 0.25 inches tall.

The first tier support element 4208 may also include receptacles that interface with pegs 4228 on the second tier support elements 4210, 4212. The load bearing elements 4214 may be secured to the second tier support elements 4210 using a fastener, snap fit, or other securing mechanism. The load bearing elements 4214 may be elastic or springy to add cushioning during dynamic loads. Alternatively, the elements 4214 may be implemented as an additional set of curved rolling surfaces. An elastic band may secure the second tier support element 4210 or 4212 to the first tier support element 4208. Similarly, an elastic band may secure the first tier support element 4208 to the underlying support structure 4217.

Figure 43:
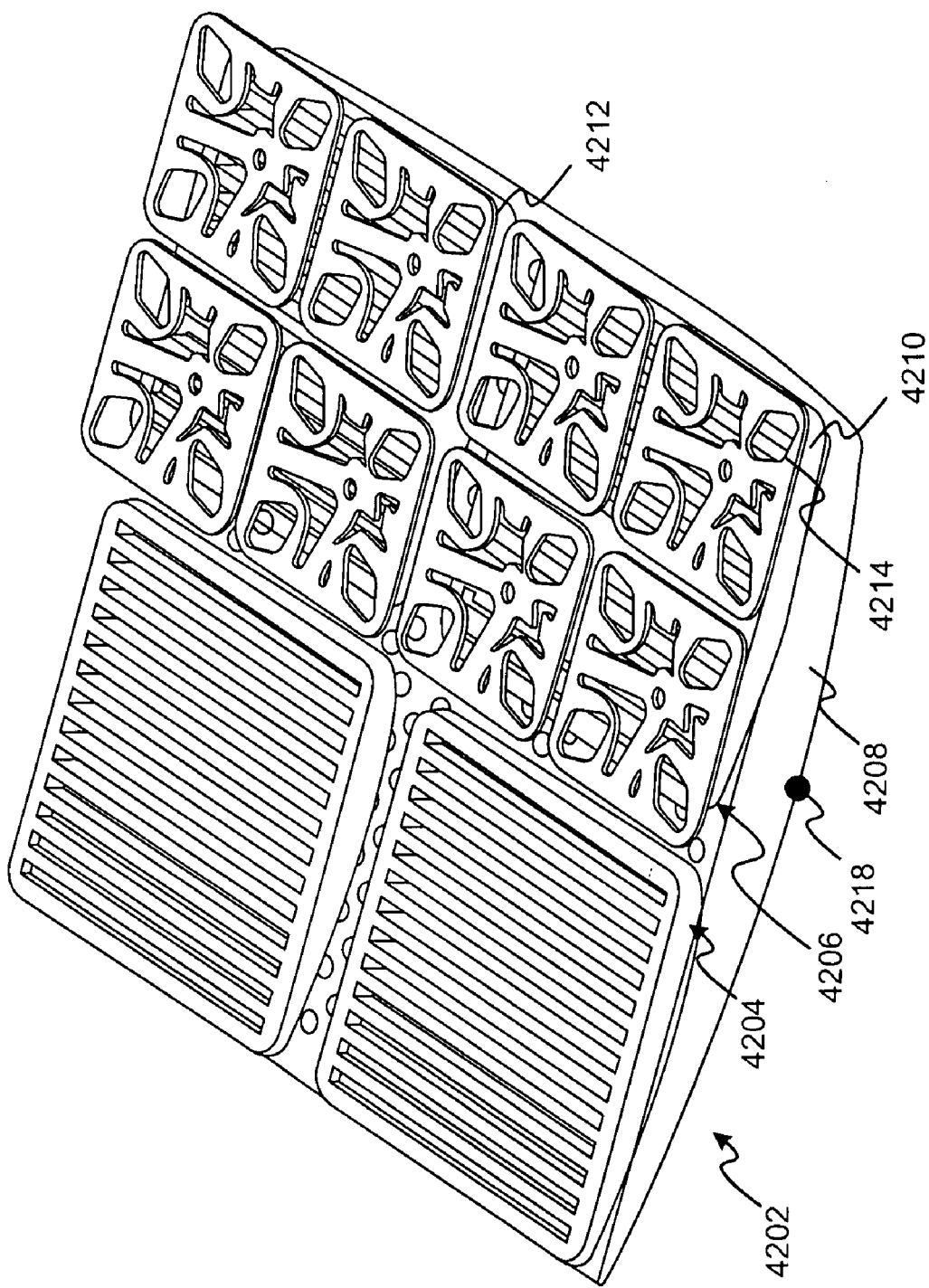
FIG. 43 shows a perspective view of a multi-tier pixelated support structure.

FIG. 43 shows a top perspective view 4300 of the support structure 4200. The support structure 4200 and its constituent parts may vary widely in size, shape, and material. The structure 4200 may be formed from injection molded polypropylene. In one implementation, the support structure 4200 may be approximately 2 inches tall. The first tier 4202 may be approximately 1 inch thick, the second tier 4204 may be approximately 0.5 inches thick, and the third tier 4206 may be approximately 0.5 inches thick.

The first tier support element 4208 may approximately be 8 inches wide and 8 inches long, the second tier support elements may approximately be 4 inches wide and 4 inches long, and the load bearing elements 4214 may be 2 inches wide and 2 inches long. In FIG. 43, the support structure is shown to accommodate one first tier support element 4208 supporting four second tier support elements supporting sixteen load bearing elements 4214. Any other number of tiers, support elements, and load bearing elements may be employed.

Figure 44:
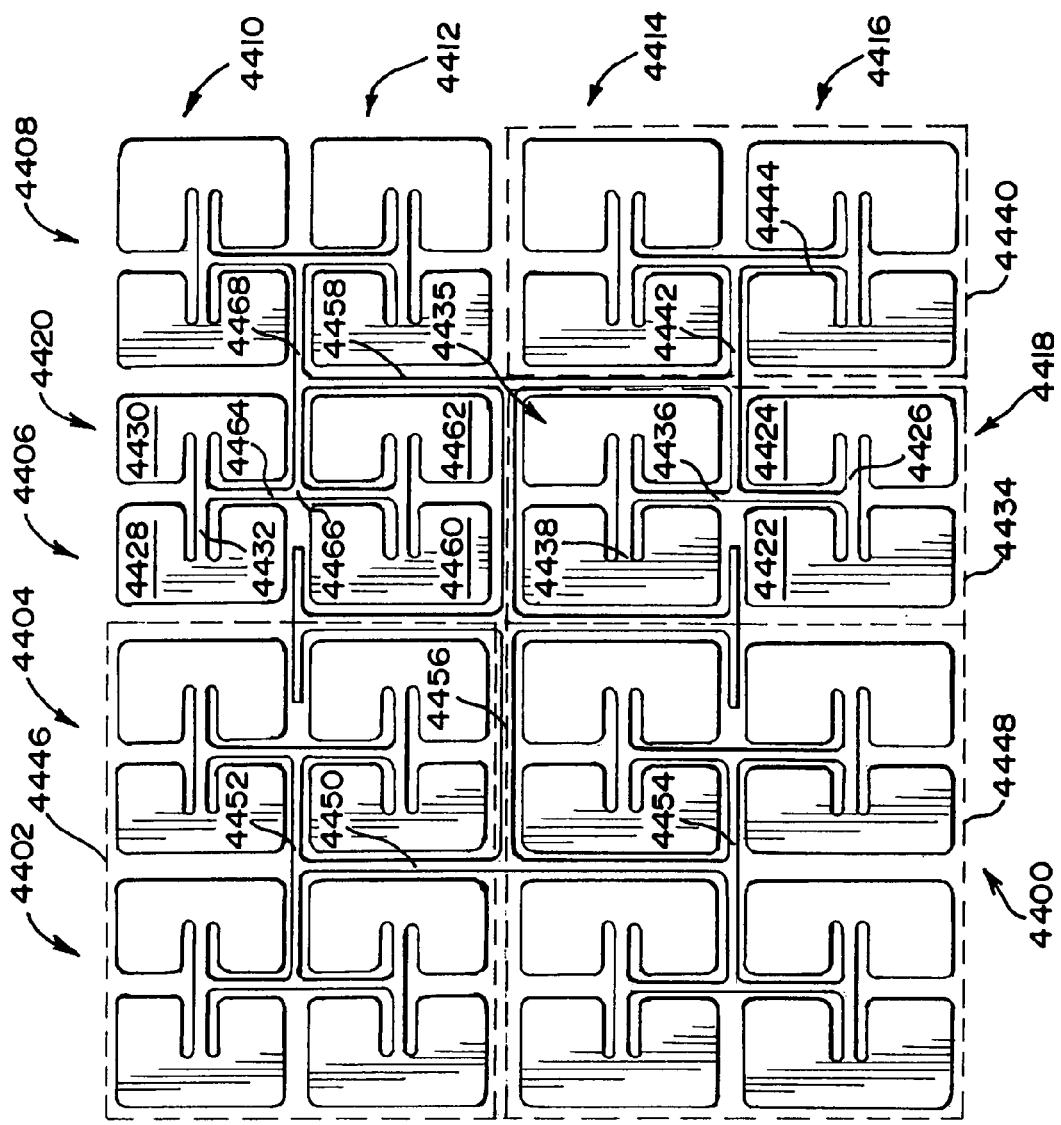
FIG. 44 shows a top view of a torsional pixelated support structure.

FIG. 44 shows a top view of a torsional pixelated support structure 4400. As shown, the structure 4400 includes four rows 4402, 4404, 4406, and 4408 and four columns 4410, 4412, 4414, and 4416 of load bearing elements, such as the load bearing elements 4404 and 4406. The structure 4400 may include more or fewer rows 4402-4408 and columns 4410-4416. In one implementation, the structure may be formed from injected molded polypropylene.

The structure 4400 may vary widely in size. In one implementation the structure 4400 may be approximately 12.5 inches wide and approximately 11 inches long. The structure 4400 may be sized and curved as noted below to cradle, conform to, or otherwise accommodate any body part, including the spine, arms, legs, or any other part.

The structure 4400 shown in FIG. 44 includes 16 sets of load bearing elements that may be located at intersections of the rows 4402-4408 and columns 4410-4416. Each set may include one or more interconnected load bearing elements. As shown in FIG. 44, each set may be formed as a pair of load bearing elements, such as the element pairs 4418 and 4420. Each element pair may include a first load bearing element and a second load bearing element connected by a bar or beam or other section of material. The load bearing elements and connecting bar for the element pair 4418 are labeled 4422, 4424, and 4426, while the load bearing elements and connecting bar for the element pair 4420 are labeled 4428, 4430, and 4432.

Load bearing elements, or sets of load bearing elements, may twist or otherwise deflect around a connecting bar. The connecting bar may operate as a torsional spring. For example, the load bearing elements 4428 and 4430 may twist in the same or opposite direction around the connecting bar 4432.

The length of each load bearing element may be individually adjusted. Each length may be selected to set the force and pressure at any particular load bearing element or set of load bearing elements. As load bearing elements increase in size, the force and pressure decreases and as the load bearing elements decrease in size, the force and pressure increases.

For example, as shown in FIG. 44, the load bearing elements 4428 and 4430 may be smaller than the load bearing elements 4460 and 4462. The load bearing elements 4428 and 4430 may then provide additional force and pressure with respect to the load bearing elements 4460 and 4462. As a set, the load bearing elements 4428 and 4430 may twist in one direction (e.g., into or out of the page), with the set of load bearing elements 4460 and 4462 twisting in the opposite direction due to the coupling provided by the connecting bar 4464.

The sets of load bearing elements 4428 and 4430, and 4460 and 4462 twist around a pivot point 4466 where the connecting bar 4464 couples to the connecting bar 4468. The connecting bar 4468 provides a fulcrum connection to the connecting bar 4466. The force and pressure provided by the load bearing elements may be tailored to provide selected support for any body part, or according to other criteria.

As another example, a set of two pairs of load bearing elements is labeled 4434 in FIG. 44. In the set 4434, the element pair 4418 is connected to an adjacent element pair 4435 by a connecting bar 4436. The connecting bar 4436 may connect between the two connecting bars 4426, 4438 that couple together the individual load bearing elements. The sets of load bearing elements 4418, 4435 may twist or otherwise deflect around the connecting bar 4442, which provides a fulcrum connection to the connecting bar 4436.

Similarly, multiple sets of load bearing element sets may connect together through a connecting bar. The set 4434 connects to the adjacent set 4440 through the connecting bar 4442. The connecting bar 4442 for the larger set of four load bearing element sets may connect between the connecting bar 4436 and the connecting bar 4444 for the next smaller sets of two load bearing element sets. Each set 4434, 4440 may then twist or otherwise deflect around the connecting bar 4442.

Load bearing elements may be grouped together and interconnected in incrementally larger sets. For example, FIG. 44 shows a first group 4446 of four sets of load bearing elements coupled together to an adjacent group 4448 of four sets of load bearing elements through a connecting bar 4450. The connecting bar 4450 may connect between the connecting bars 4452 and 4454 for the smaller sets of four load bearing elements. Similarly, the connecting bar 4456 may then connect adjacent groups of eight sets of load bearing elements by coupling between the connecting bars 4450 and 4458.

Figure 45:
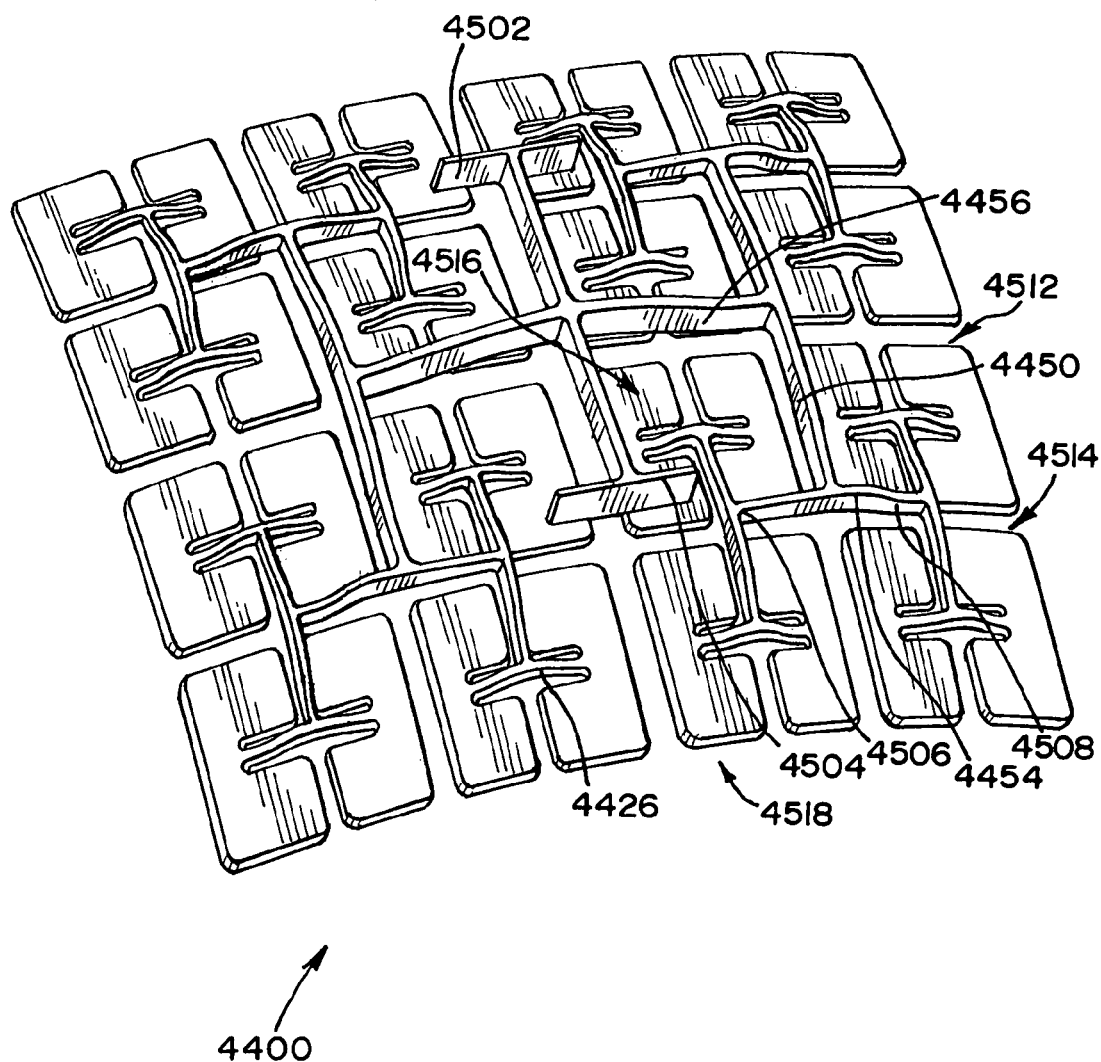
FIG. 45 shows a bottom view of a torsional pixelated support structure.

A bottom view of the structure 4400 is present in FIG. 45. The bottom view shows the structure 4400 curved in two planes. The curvature may match the curvature of the back, legs, or another body part. The curvature in any plane is optional.

The connecting bars may perpendicularly connect between other connecting bars, or may connect at other angles. Each connecting bar may flex as well as twist to enhance spring action. Each connecting bar may also vary in depth or width to increase its stiffness. As the connecting bars couple together increasing numbers of load bearing elements, each connecting bar may also increase in size to accommodate the increasing load. For example, the connecting bars between individual load bearing elements (e.g., connecting bar 4426) may be the shallowest, while connecting bars between sets of eight sets of load bearing elements (e.g., connecting bar 4456) may be the deepest.

Securing tabs 4502 and 4504 may be added to a connecting bar. Screws or other fasteners may pass through the securing tabs 4502 and 4504 to secure the structure 4400 to an underlying frame or spine. Alternatively, the securing tabs 4502 and 4504 may snap-fit into a mating connector on the frame or spine. The structure 4400 may couple to the frame or spine in other manners at other points, however.

The connecting bars may vary in size and thickness. The thickness may vary according to the load borne by any given portion of the connecting bar. As an example, FIG. 45 shows that the connecting bar 4454 includes a left branch 4506 and a right branch 4508. The left and right branches 4506, 4508 increase in thickness as they near the connecting bar 4450 where greater loads are expected. The left and right branches 4506, 4508 decrease in thickness away from the connecting bar 4450 toward the individual load bearing element pairs 4512, 4514, 4516, and 4518 where relatively lighter loads are present.

Figure 49:
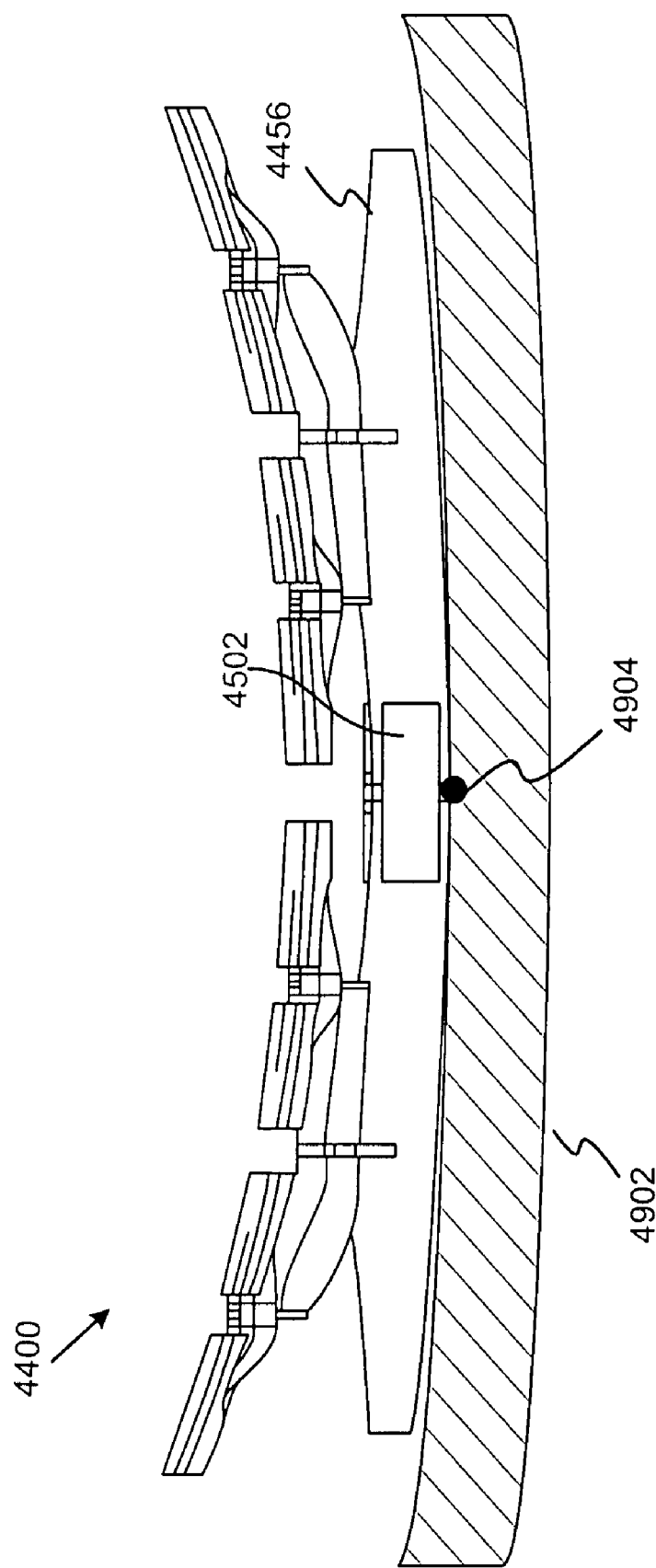
FIG. 49 shows a pixelated support structure running on an underlying supporting structure.

FIG. 49 shows that a connecting bar (e.g., the connecting bar 4456) in the support structure 4400 may run along a supporting surface 4902 at a contact point 4904. The supporting surface 4902 may be part of an underlying support structure defining a chair or other object. The connecting bar and/or the supporting surface may be flat, curved, or may have other shapes. For example, the connecting bar may have a selected radius (e.g., 3 inches), and the supporting may have a larger (e.g., 4 inches) or smaller radius. As another example, the connecting bar may be flat, and the supporting surface may be curved in a convex or concave manner.

The contact point 4904 moves along the supporting surface 4902 in accordance with the position of the load on the structure 4400. For example, as the load on the structure 4400 shifts left, the contact point 4904 may shift left. The curvature or lack of curvature in the connecting bar and/or the supporting surface may be selected to establish a force vector through the contact point in a given direction. In the context of a seat, for example, the force vector may be selected so that the occupant is pushed back into the chair when the occupant load is at any given position in the structure 4400. Alternatively, the force vector may be selected so that the occupant is pushed out of the chair when the occupant load moves far enough forward along the structure 4400.

Returning again to FIG. 44, the face of one or more load bearing elements may be contoured. In other words, the interface between a load bearing element and the skin may be selected to impart any desired feel to the load bearing elements. In addition, the connection bars shown in the structure 4400 may take other forms, for example a form that permits the load bearing elements or sets of load bearing elements to translate.

Figure 50:
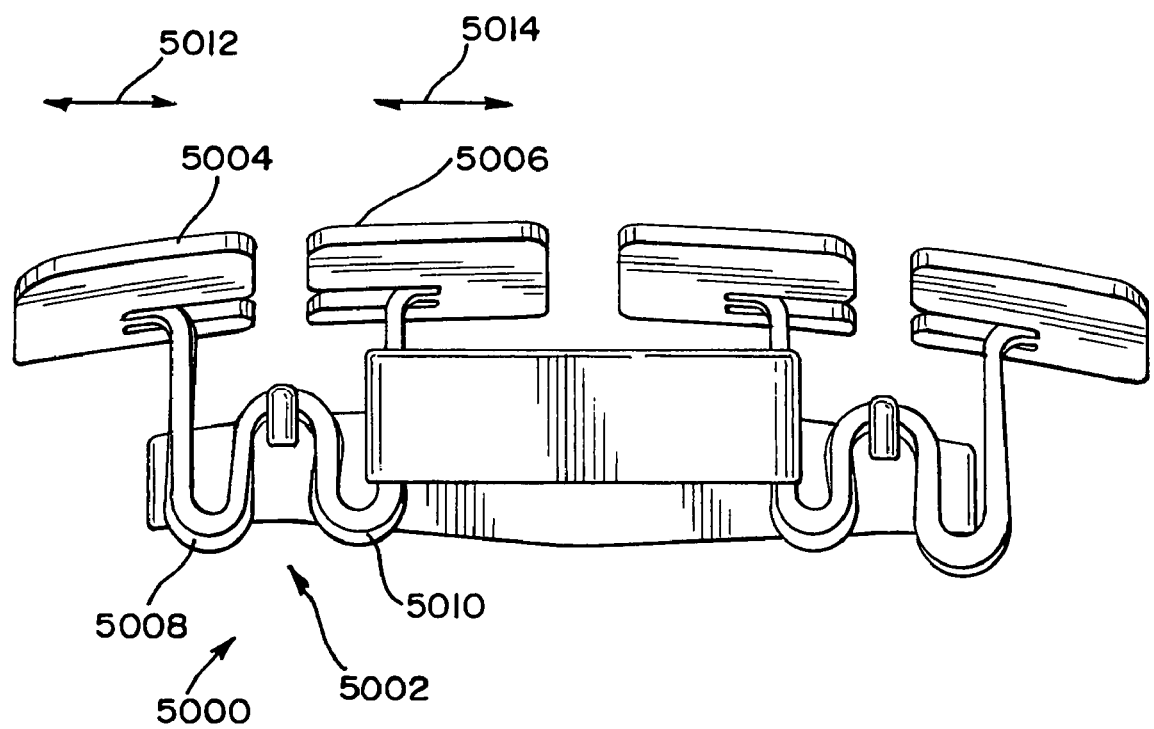
FIG. 50 shows a pixelated support structure with translating load bearing elements.

FIG. 50 shows a torsional support structure 5000 that employs a translational coupling 5002 that may be employed between load bearing elements 5004 and 5006. The translational coupling 5002 may include spring elements 5008 and 5010. The spring elements 5008 and 5010 may include an undulating shape (such as the U-shape shown in FIG. 50) that permits the load bearing elements 5004 and 5006 to translate in the direction shown by the arrows 5012 and 5014. The translational coupling 5002 is not limited to any particular shape or form, however, and may be implemented in other manners.

Figure 51:
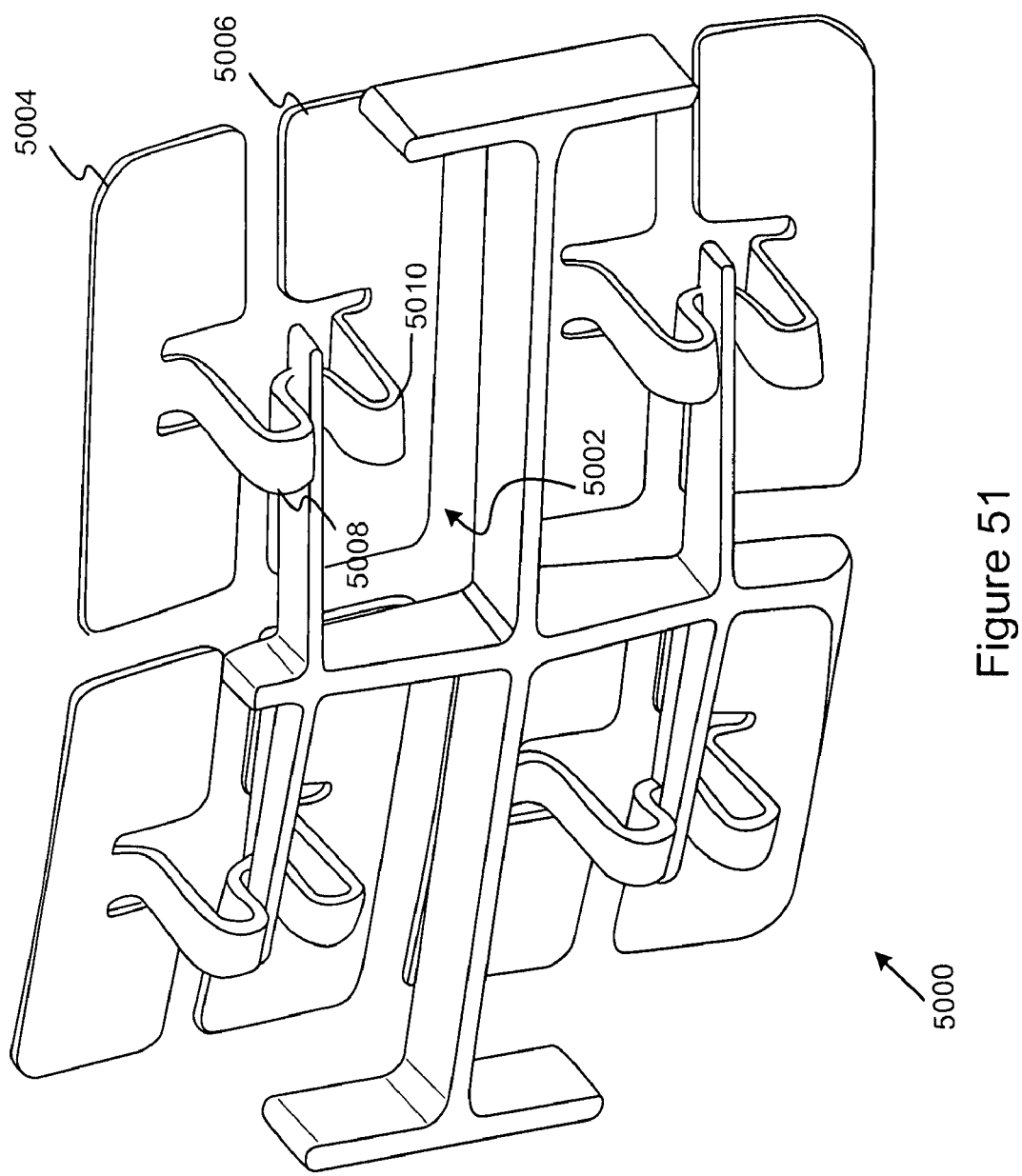
FIG. 51 shows a pixelated support structure with translating load bearing elements.

Through the translational coupling 5002, the load bearing elements may move in the plane of the skin. Accordingly, as the skin is stretched or compressed (e.g., when the lumbar spine is flexed) the load bearing elements may move without shearing on the skin. FIG. 51 shows a perspective view of the torsional support structure 5000 and translational coupling 5004.

Figure 46:
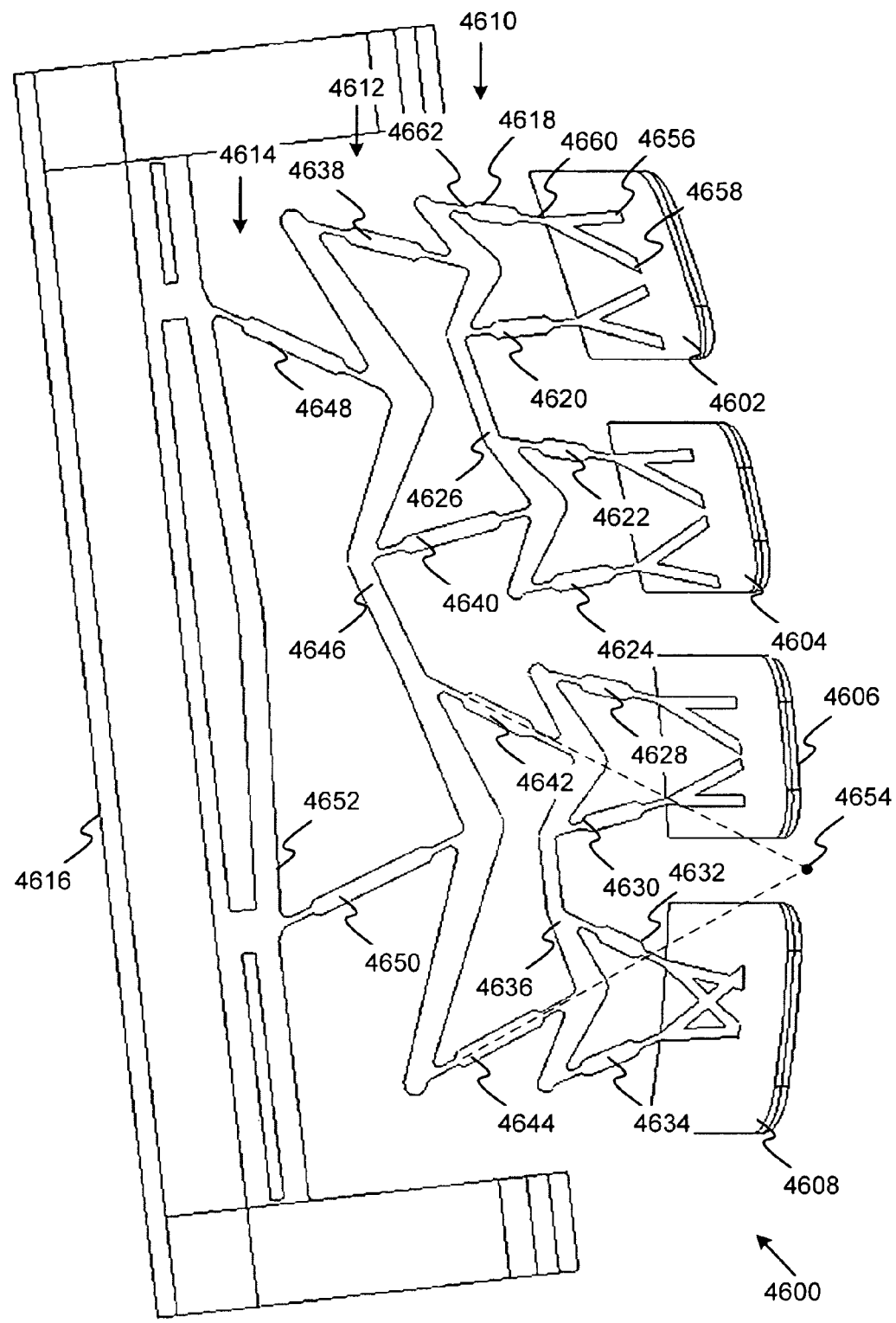
FIG. 46 shows a side view of a multi-bar pixelated support structure.

In FIG. 46, a side view of a multi-bar tiered pixelated support structure 4600 is present. The structure 4600 may include two columns of four load bearing elements. For of the load bearing elements are shown and are labeled 4602, 4604, 4606, and 4608. Three tiers 4610, 4612, and 4614 may support the load bearing elements. The structure 4600 may be made of polypropylene in an injection molding process.

A portion 4616 of the structure 4600 may couple to an underlying frame or other structural member through bolts, screws, or other fasteners, through a snap-fit, or in other ways. The structural member may be a portion of a chair frame corresponding to the lower back, for example. The load bearing elements 4602-4608 may then support the lower back as described in more detail below. In general, it is noted that more or fewer load bearing elements and/or tiers may be employed, and that the structure 4600 may be tailored to match any body part by individually adjusting the size, shape, or stiffness of the structure's components.

The tiers 4610-4614 may include one or more four bar connections. In the tier 4610, four sets of four bar connections are present. In the first set, the living hinges 4618 and 4620 emerge as individual members from the first tier base 4626.

Each living hinge may include two narrowed portions that operate as hinge points. The hinge points for the living hinge 4618 are labeled 4660 and 4662. Similarly, the second set of 4-bar connections includes the hinge points around the living hinges 4622 and 4624. The third and fourth sets of four bar connections emerge from the first tier base 4636. The third and fourth sets are formed by the living hinges 4628, 4630, 4632, and 4634.

In the second tier 4612, the living hinges 4638, 4640, 4642, and 4644 emerge from the second tier base 4646. The living hinges 4638 and 4640 implement a four bar connection to the first tier base 4626, and the living hinges 4642 and 4644 implement a four bar connection to the first tier base 4636. Similarly, in the third tier 4614, the two living hinges 4648 and 4650 emerge from the third tier base 4652 and implement a four bar connection to the second tier base 4646.

In the third tier 4610, the living hinges may branch into one or more support fingers connected to load bearing elements. For example, the living hinge 4618 branches out into the first support finger 4656 and the second support finger 4658.

FIG. 46 shows that the bases 4626, 4636, and 4646 may be formed in a V-shape. The V-shape occupies less space than a straight connection and may contribute to the compactness of the structure 4600. In one implementation for a lumbar support, the structure 4600 may be approximately 10 inches wide and approximately 6 inches tall. The load bearing elements may be approximately 4.5 inches wide and approximately 1.3 inches tall. The total thickness of the support structure 4600, excluding the load bearing elements 4602-4608 and base 4616 may be approximately 3.2 inches. In one implementation, they may be 0.030" thick and may narrow down at either end, but may vary widely depending on the implementation.

The living hinges may be individually oriented to impart selected rotational characteristics to the load bearing elements 4602, 4604, 4606, and 4608. As one example, the living hinges 4642 and 4636 are angled to set a center of rotation 4654 for the load bearing elements 4606 and 4608. For lumbar support, the centers of rotation may be set at any distance at or above the surface of the load bearing elements. In particular, the centers of rotation may be selected such that the load bearing elements 4606 and 4608 move with the skin, rather than along the skin.

Figure 47:
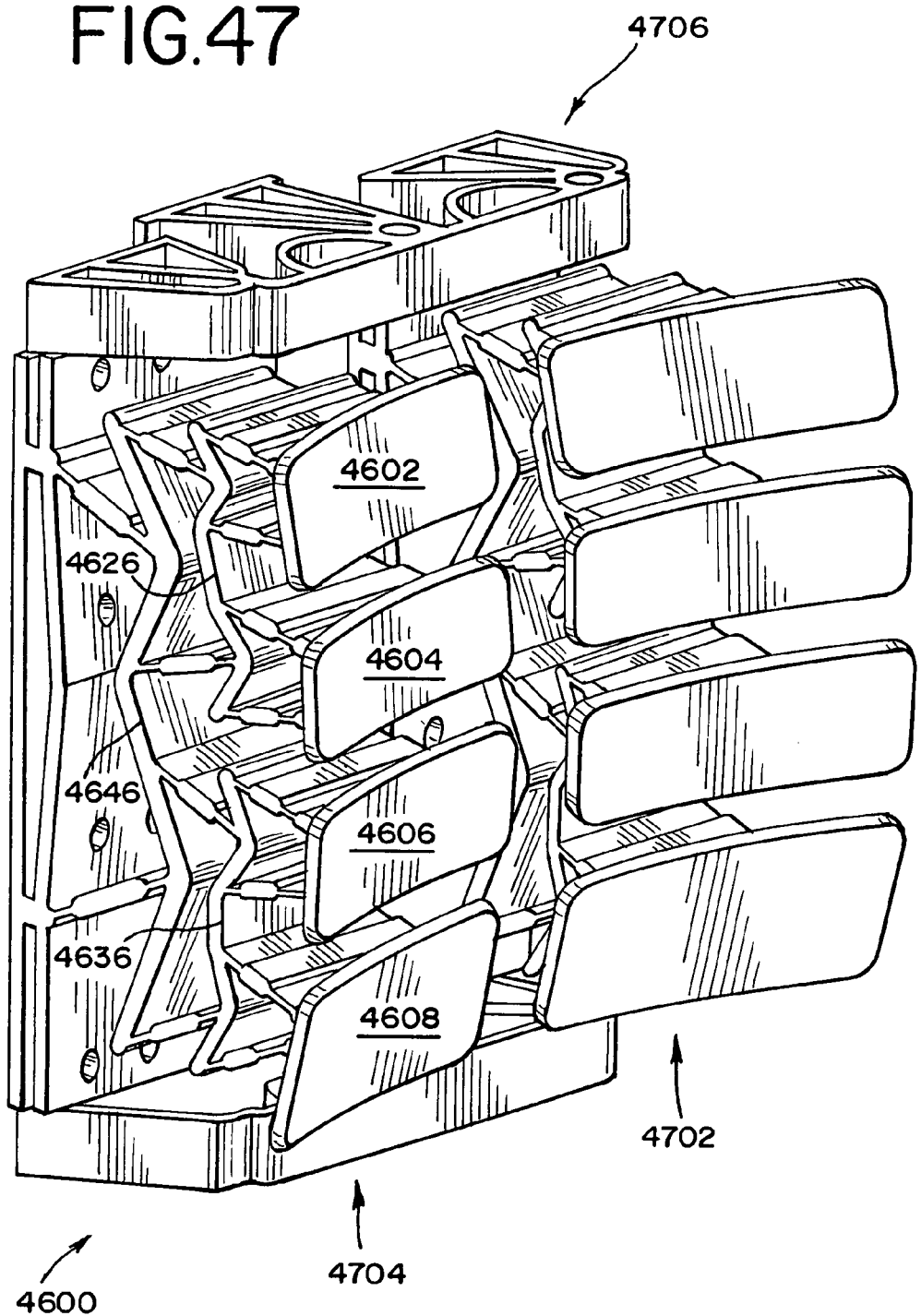
FIG. 47 shows a perspective view of a multi-bar pixelated support structure.

FIG. 47 shows a perspective view of the structure 4600. The structure 4600 includes a first column 4702 and a second column 4704 of load bearing elements (e.g., elements 4602-4608). The structure 4600 may also include pivot points 4706, described in more detail below with respect to FIG. 48.

Figure 48:
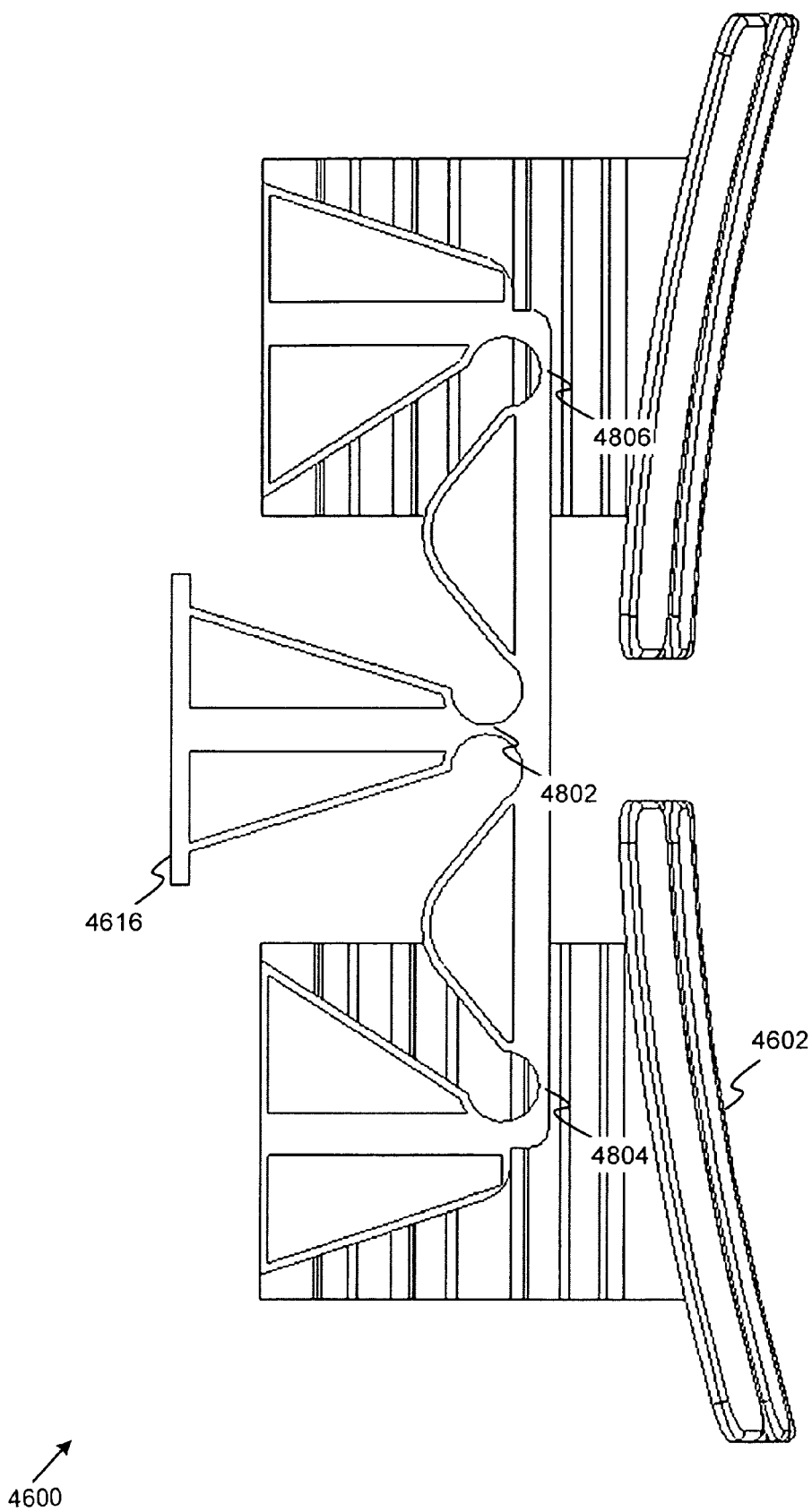
FIG. 48 shows a top view of a multi-bar pixelated support structure.

In FIG. 48, a top view of the support structure 4600 is shown. Three pivot points are present, including the central pivot point 4802, and the column pivot points 4804 and 4806. The pivot points 4802-4806 may be formed as a narrowed section of material and may be thickness controlled to impart any desired amount of stiffness to the pivot point.

The columns 4702 and 4704 may pivot together on the central pivot point 4802. In addition, the first column 4702 may pivot on the pivot point 4806 independently of the second column 4704. Similarly, the second column 4704 may pivot on the pivot point 4804 independently of the first column 4702. The structure 4600 thereby responds to and provides ergonomic or balanced support for loads placed on the structure 4600.

Figure 52:
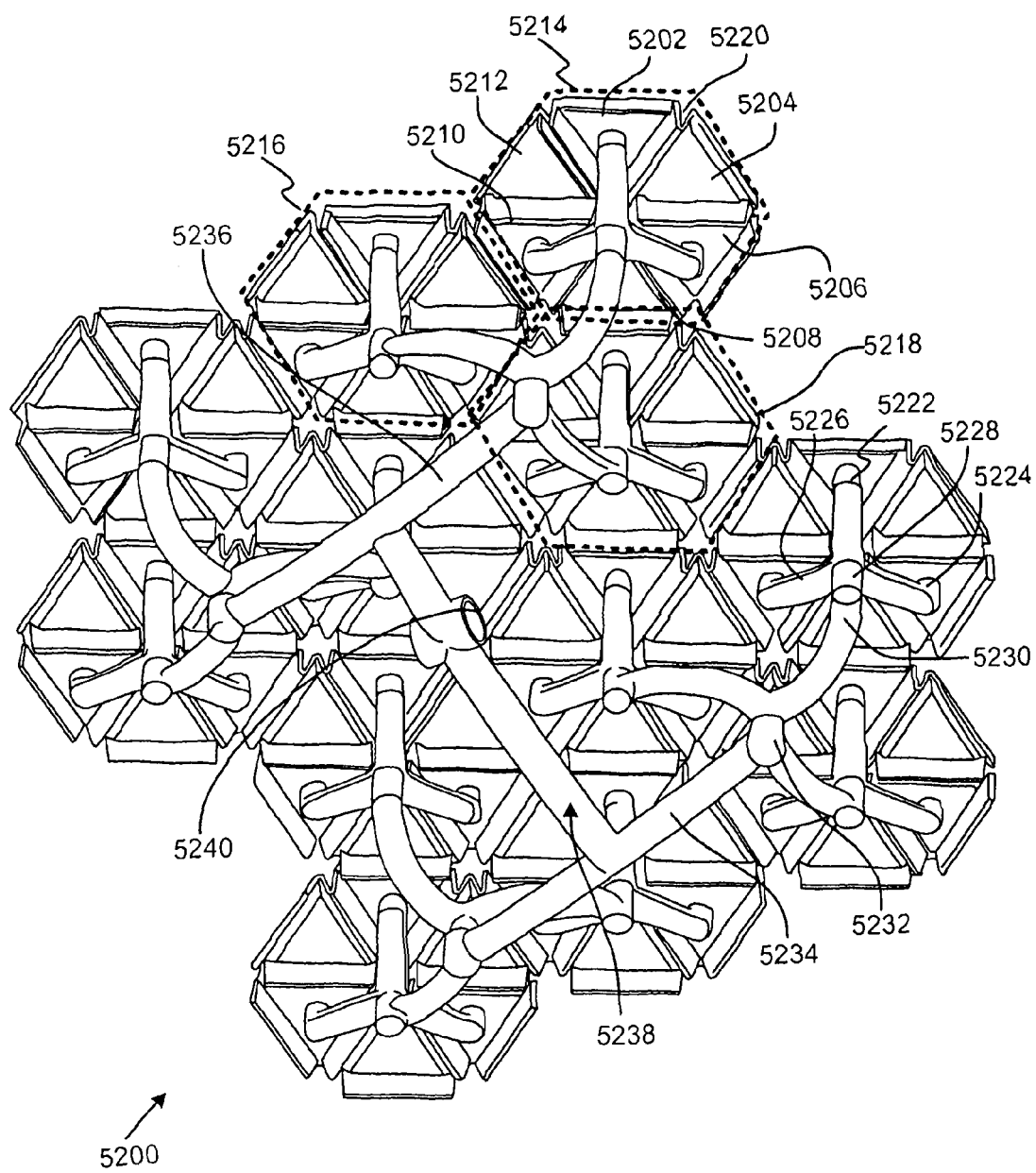
FIG. 52 shows a multiple tier pixelated support structure.

FIG. 52 shows a multiple tier pixelated support structure 5200. The structure 5200 may include first-tier load bearing elements such as those labeled 5202, 5204, 5206, 5208, 5210, and 5212. In the implementation shown in FIG. 52, the load bearing elements 5202-5212 are triangular. Triangular load bearing elements may provide enhanced conformance to the body part that the load bearing elements support, in comparison with other load bearing element shapes. However, other load bearing element shapes may also be used in conjunction with or instead of the triangular shapes.

The load bearing elements 5202-5212 may form groups. For example, the structure 5200 includes hexagonal load bearing element groups, three of which are labeled 5214, 5216, and 5218. Living hinges 5220 may connect individual load bearing elements to form a load bearing surface from one or more load bearing elements and/or one or more groups.

The load bearing surface may take many different shapes and sizes. As examples, the load bearing surface may extend in two dimensions to provide a chair seat, or may extend primarily in one dimension as a linear strip of load bearing elements. The load bearing surface may also take on form in three dimensions. For example, the load bearing surface may take a convex shape. The convex shape may match the body shape of a relatively small chair occupant. The living hinges 5220 may flatten to accommodate relatively large chair occupants on the load bearing surface. As the surface adapts to the contour of the sitter's buttocks, the living hinges 5220 will expand and flatten.

The structure 5200 may also include load bearing element support arms such as rockers connected to the load bearing elements. Three of the rockers are labeled 5222, 5224, and 5226. The rockers may connect through a rocker connection such as a shockmount to a second-tier support arm. One of the rocker connections is labeled 5228 and one of the second-tier support arms is labeled 5230 in FIG. 52. The rocker connections 5228 may accord the rockers a lower spring rate than the load bearing elements, may take vertical load compressively, and may allow angular rocking with force feedback. In one implementation, the rocker connections 5228 are ball and socket joints.

The rockers may provide support to any one or more of the load bearing elements. In FIG. 52, the rockers provide support to three of the six load bearing elements in each hexagonal group. For example, the load bearing elements 5202, 5206, and 5210 are directly supported by rockers, while load bearing elements 5204, 5208, and 5212 are supported through living hinges to adjacent load bearing elements 5202, 5206, and 5210.

The load bearing elements may attach to the rockers in many ways. The load bearing elements may attach through a snap fit joint, such as a ball and socket joint, through a fastener, or in other manners. The second tier support arms 5230 may be straight or may include curvature, for example, to meet manufacturability process constraints. The second tier support arms 5230 and rockers may be a single injection molded part or may be individually formed.

One or more of the second-tier support arms may emerge from a support arm connection such as the connection labeled 5232. The support arm connections 5232 may be implemented as noted above with regard to the rocker connections 5228. The support arm connection be part of a third-tier support arm, such as the third-tier arms labeled 5234 and 5236.

The hexagonal load bearing element groups 5214, 5216 and 5218 form a tri-hex load bearing surface that is supported by the second tier. Specifically, second tier support arms that emerge from a common support arm connection may each support one of the load bearing element groups. Accordingly, eighteen load bearing elements may perform load balancing at the same rate. The center of the tri-hex surface may be located under pre-selected anatomical areas, such as the ischial tuberosites, under the thigh centerline, or other areas and may keep forces balanced at that point. The third-tier support 5238 may then proportion loads between or among the functional areas. The third tier support 5238 may vary the ratio of the length of its arms to give proportionally higher loads in any given location.

As shown in FIG. 52, the third-tier support arms 5234 and 5236 may be part of a third-tier support 5238. The third-tier support 5238 may include a coupling 5240. The coupling 5240 may connect to structural elements such as pins, rods, or other fasteners to connect the structure 5200 to adjacent structures, for example to extend the load bearing surface in a given direction.

The third-tier support 5238 may be H-shaped and may be a separately molded part. The H-shape support 5238 includes the support arms 5234 and 5236 connected by a bar on which the coupling 5240 may be located. The third-tier support 5238 may connect through the bar to an underlying support frame through pinning, for example with a steel pin, a molded snap fit connection, a fastener, or other connection.

One or more of the tiers may alone or in combination with other tiers provide curvature to the load bearing surface. The curvature is self-tailoring and adapts to the body part to the supported by the load bearing surface. For example, a load bearing surface that forms a chair seat have a curvature consistent with the buttocks.

The elements shown in FIG. 52 may be formed through an injection molding process, a vacuum or heat forming process, or by other processes. The elements may be formed from polypropylene, thermoplastic elastomers, Hytrel™ material, polyethylene, polyamide (with or without fillers), glass filed nylon, fiberglass, spring steel, or other materials. Each element may be adjusted in size, shape, dimension, and/or material to impart a selected stiffness to any portion of the load bearing surface. The load bearing surface may thereby provide tailored support for selected body parts across the surface.

A layer of material may be placed over the top of the load bearing elements. The material may be a knit fabric or other interface between the load and the load bearing elements.

Figure 53:
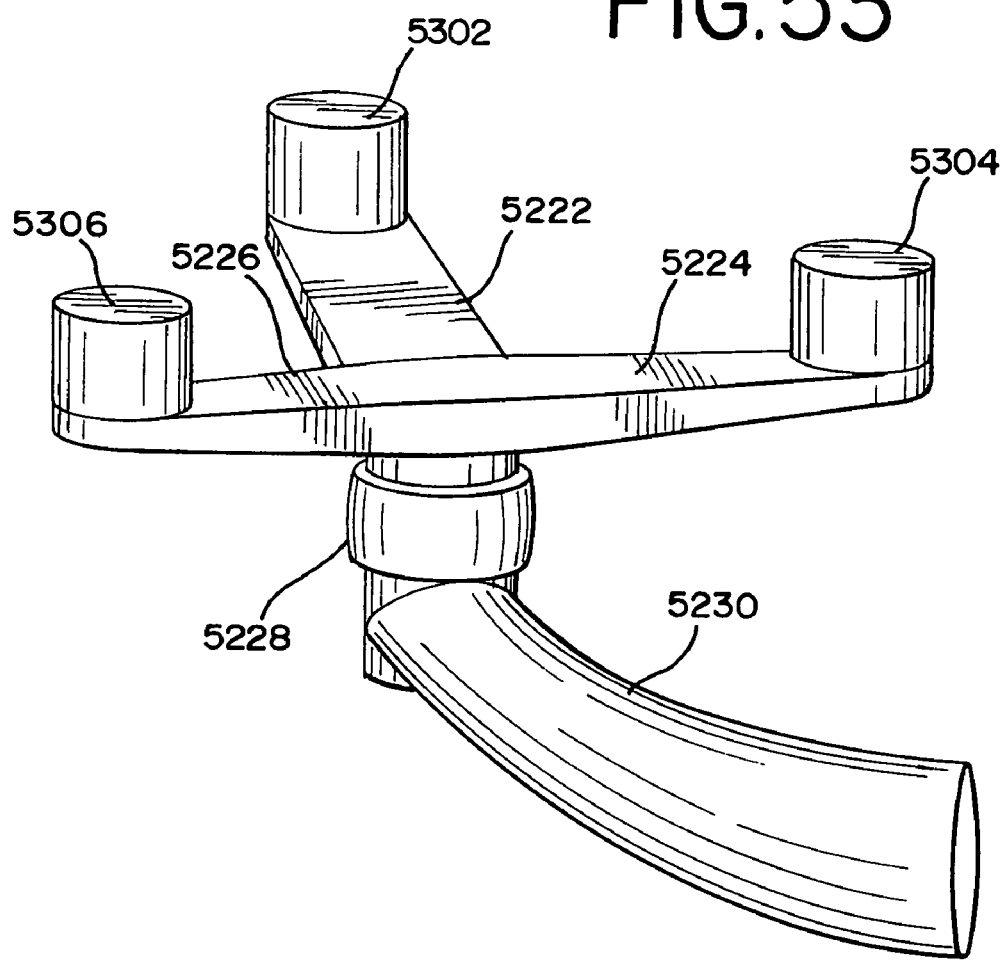
FIG. 53 shows a structural rocker and arm that may be incorporated into a pixelated support structure.

FIG. 53 shows an expanded view of the rockers 5222, 5224, and 5226. The rocker connection 5228 and a portion of the support arm 5230 is also shown. The rockers 5222, 5224, and 5226 connect to the load bearing elements through connection points 5302, 5304, and 5306. The connection points 5302, 5304, and 5306 may implement a snap fit connection or joint, such as a ball and socket joint, may be a fastener, or may provide a connection in other manners.

The rockers 5222, 5224, and 5226 may provide approximately one inch of separation between the load bearing element connection points 5302, 5304, and 5306. The triangular load bearing elements 5202-5212 may correspondingly be approximately 1 inch on a side. Other sizes and distances may also be used.

The rockers 5222, 5224, and 5226 and/or the support arms 5230 may be formed from a glass filed nylon or Polybutylene Terephtalate (PBT) material. The rocker connection 5228 (and support arm connections 5232) may be a shockmount formed from Hytel material, Santoprene material, or other material. The rocker connection 5228 may be implemented with a softness between a Shore D 35 and a Shore A 80-95 softness. Other softnesses may be selected.

Figure 54:
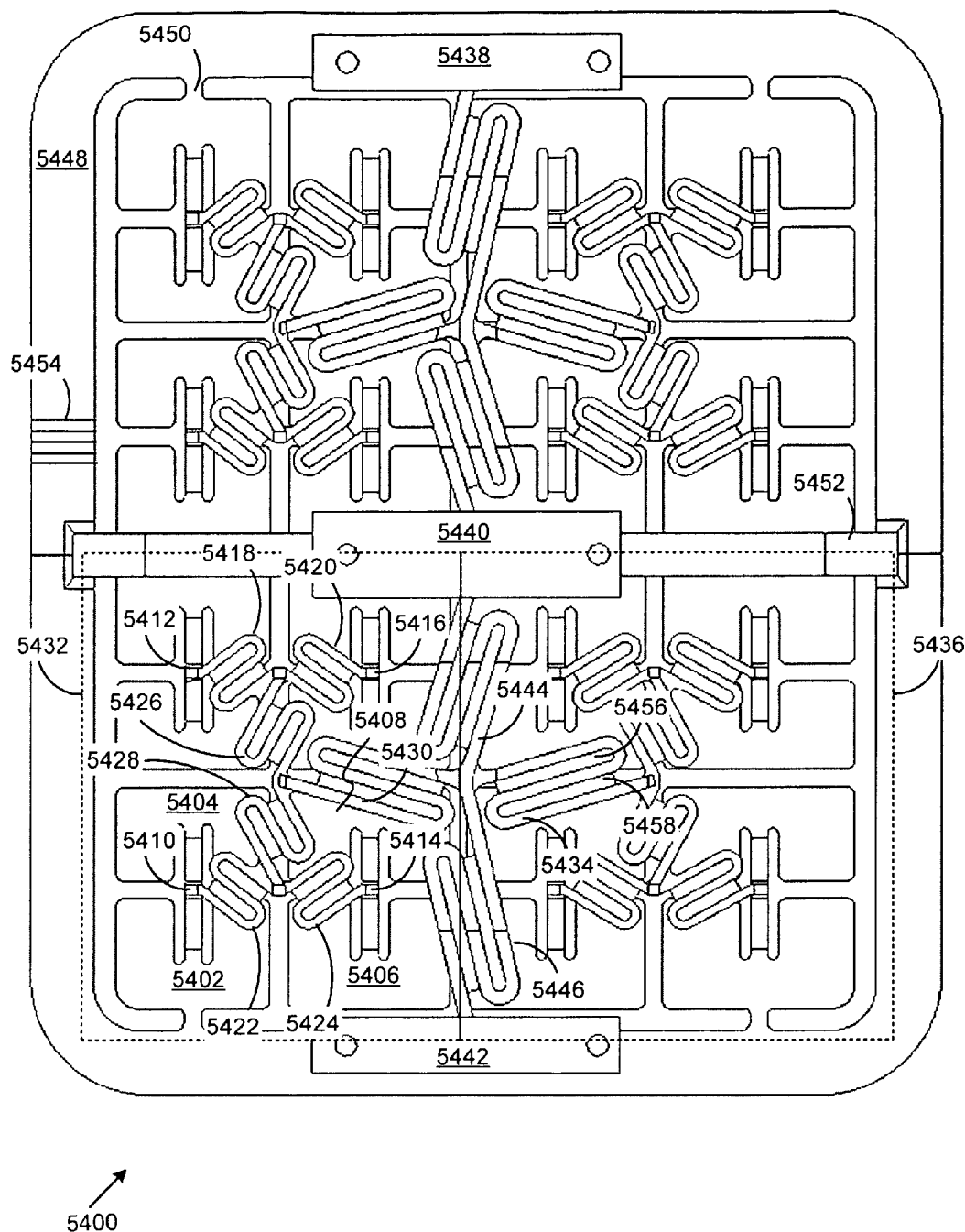
FIG. 54 shows a bottom view of a torsional pixelated support structure.

FIG. 54 shows a bottom view of a torsional pixelated support structure 5400. The structure 5400 may form all or part of a chair seat or other support structure. The structure 5400 includes load bearing elements, four of which are labeled 5402, 5404, 5206, and 5208. The load bearing elements may be formed and interconnected as described above with reference to FIGS. 44 and 45. As will be described in more detail below, however, one or more connecting bars may be replaced with connecting bars with a longer effective length.

In the structure 5400, the connecting bar between pairs of load bearing elements may include a support post. The support post 5410 may extend away form the load bearing elements and may provide a mechanical stop to displacement of the load bearing elements. Alternatively, a supporting structural member behind the structure 5400 may include stops that extend up toward the structure 5400. The support post 5410 extends from the connecting bar between the load bearing elements 5402 and 5404. Support posts for neighboring pairs of load bearing elements are labeled 5412, 5414, and 5416.

In the implementation shown above, the connecting bars (e.g., connecting bar 4436) between pairs of load bearing elements were substantially straight. The connecting bars, for example those between pairs of load bearing elements, may take other shapes at any tier, however. As shown in FIG. 54, the connecting bars in the second and third tiers are S-shaped.

Four of the S-shaped bars in the second tier are labeled 5418, 5420, 5422, and 5424. The S-shaped bars 5418-5424 may connect together at one end, and may connect at the other end to the support posts 5410-5416. In a manner analogous to the connect bar 4442, additional S-shaped bars may connect together multiple pairs of load bearing elements in the second tier. For example, the S-shaped bar 5426 connects between the S-shaped connecting bars 5412 and 5416 to connect together two pairs of load bearing elements. Similarly, the S-shaped bar 5428 connects between the S-shaped connecting bars 5422 and 5424 to connect together the two pairs of load bearing elements 5402-5408.

At the third tier, S-shaped bars may also connect together larger sets of load bearing elements. As shown in FIG. 54, the S-shaped bar 5430 connects four pairs of load bearing elements 5432. The S-shaped bar 5434 connects four pairs of load bearing elements 5436.

The S-shape may provide an effectively longer connecting bar. In FIG. 54, the S-shaped bars are folded back on themselves and consume approximately the same amount of space as a relatively straight connection bar, yet are approximately three times longer. The additional length increases the amount of flexing and deflecting in the connecting bars.

Each connecting bar may have an individually selected cross section or height, shape, material, or other characteristics. The height of a connection bar may vary along its length (e.g., by approximately 0.010 inches). The thickness of each connection bar may increase between tiers (e.g., by approximately 0.020 inches). The cross section may be increased or decreased, for example, to stiffen or loosen the connecting bar.

In one implementation, the S-shaped bars in the second tier (e.g., the connection bar 5418) may be 0.090 inches thick, and may increase from 0.375 inches to 0.475 inches in height along their length. The height of the S-shaped bars in the third tier (e.g., the connection bar 5430) may be 0.110 inches thick and may increase from 0.475 inches in height to 0.575 inches in height along their length.

The structure 5400 may include mounting points. The mounting points may connect to an underlying frame or other structure using fasteners, a snap-fit, an interference fit, or in other manners. Three mounting points 5438, 5440, and 5442 are shown.

The mounting points may establish independent pixelated support structures through their connections to the support structure 5400. For example, the portion of the pixelated support structure 5400 between the mounting points 5438 and

5440 may move and react independently from the portion of the pixelated support structure 5400 between the mounting points 5440 and 5442. Accordingly, a single structure 5400 may react as multiple independent support structures.

In the third tier, S-shaped connection bars may couple the load bearing elements and second tier to the mounting points. In FIG. 54, for example, the S-shaped connection bar 5444 connects the S-shaped connection bars 5430 and 5434 to the central mounting point 5440. The S-shaped connection bar 5446 connects the S-shaped connection bars 5430 and 5434 to the peripheral mounting point 5442.

The structure 5400 may include a peripheral support 5448. The support 5448 may provide a connection point for a fabric or other covering for the structure 5400. The size and shape of the support 5448 may vary widely. In one implementation, the support 5448 is 0.75 inches wide and 0.09-0.10 thick. The support 5448 may connect to the structure 5400 through connection tabs 5450 to one or more load bearing elements. Alternatively or additionally, the support 5448 may connect to the structure 5400 through a connection 5452 to a mounting point, such as the mounting point 5440.

Alternatively, the support may include bellows, folds, or other deformable structures 5454. The deformable structures 5454 may provide a degree of flexibility in the support 5448. In one implementation the deformable structures 5454 may be aligned with the space between one or more load bearing elements in a pair.

One or more of the S-shaped connecting bars may include webbing in one or more locations. The webbing may vary in thickness between implementations, and may be, for example, approximately 0.025 inches thick. For example, the connecting bar 5434 includes webbing 5456 and 5458 between each fold of the connecting bar 5434. The webbing may be centrally vertically located between the folds in the connecting bars. The webbing may help prevent lateral bending of the load bearing elements.

In other embodiments, the bottom tier of S-shaped connection bars may have a curved rolling surface. The rolling surfaces may be designed to permit rolling motion in one or more planes. For example, the rolling surfaces may permit left to right rolling motion.

The structure 5400 may be fabricated through a molding process, for example. The load bearing elements, connection bars between the load bearing elements, and support 5448 may be formed in a first injection mold. The lower tiers may be formed in a second injection mold. A snap fit, interference fit, fastener or other connection may be made between the first and second molded portions to form the structure 5400.

Figure 55:
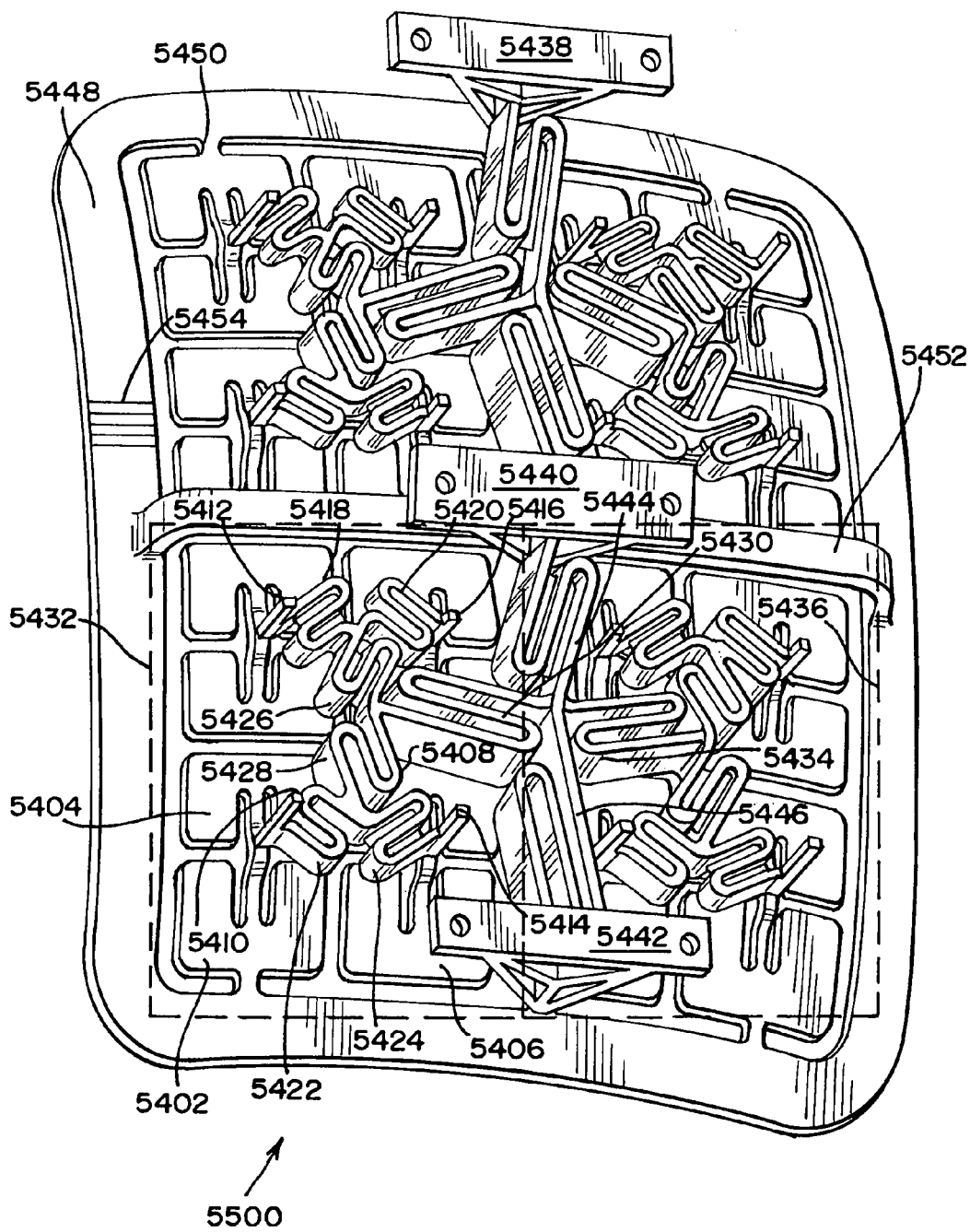
FIG. 55 shows a bottom perspective view of a torsional pixelated support structure.
Figure 56:
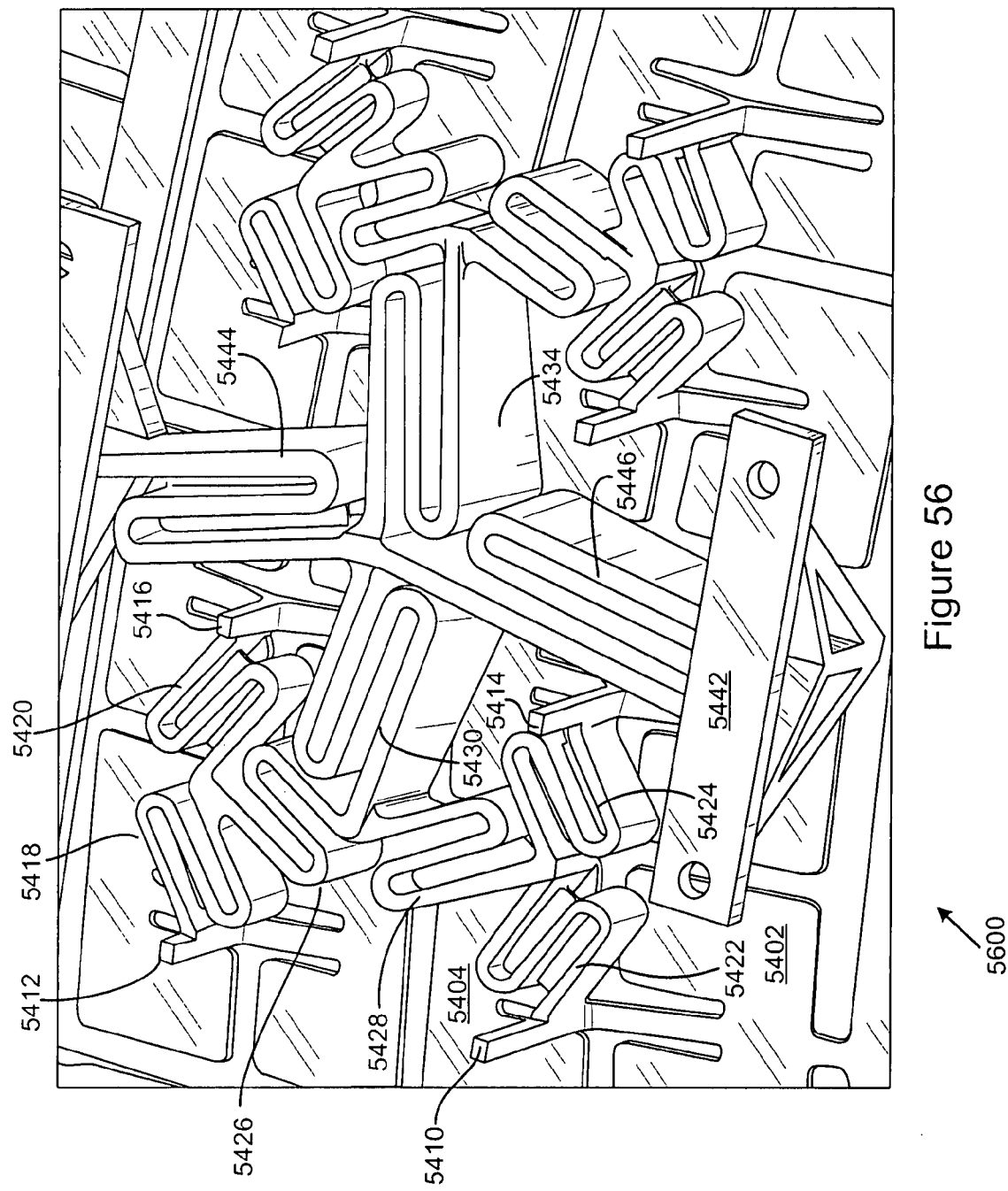
FIG. 56 shows an enlarged view of a portion of a torsional pixelated support structure.
Figure 57:
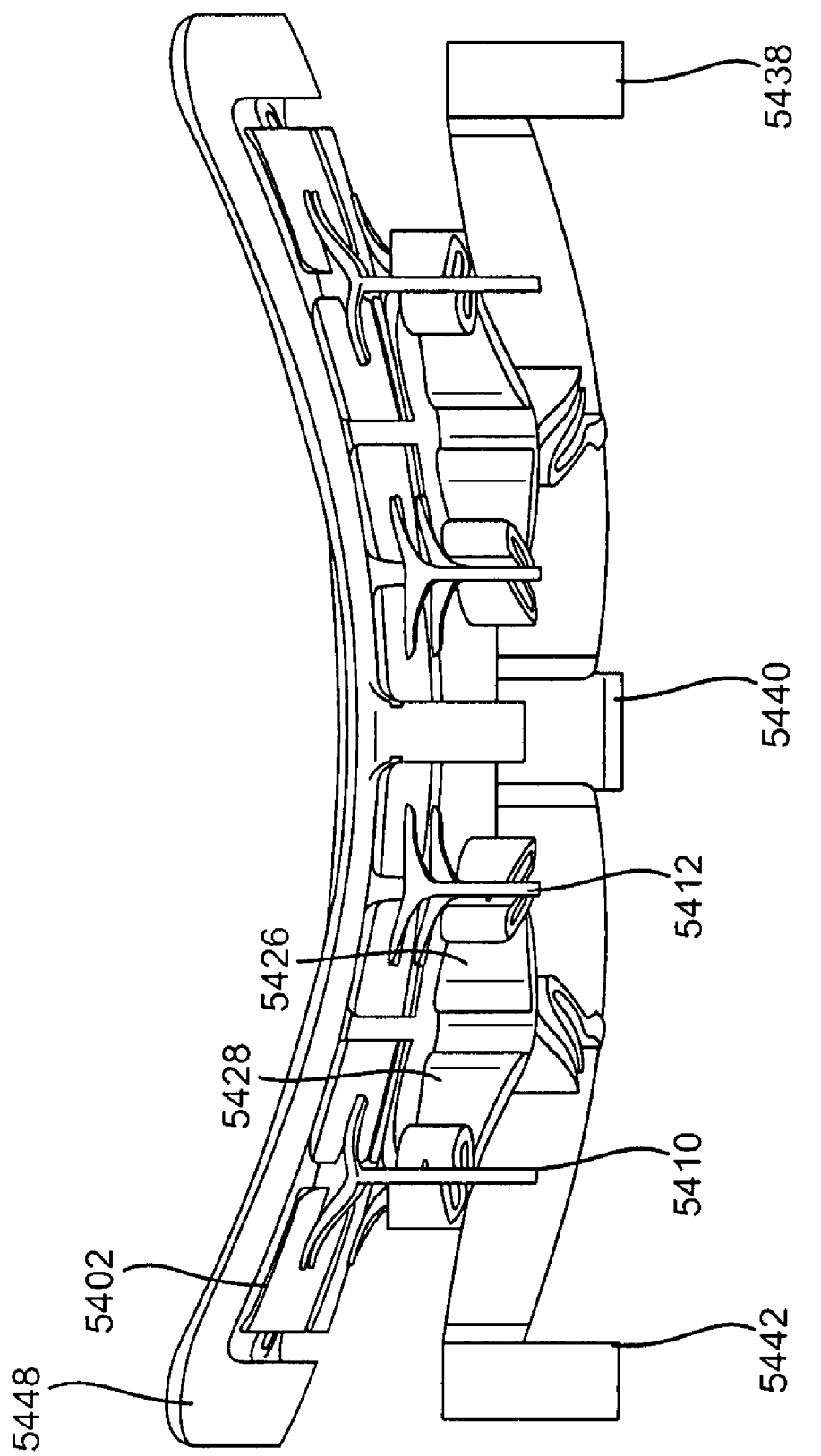
FIG. 57 shows a side view of a torsional pixelated support structure.
Figure 58:
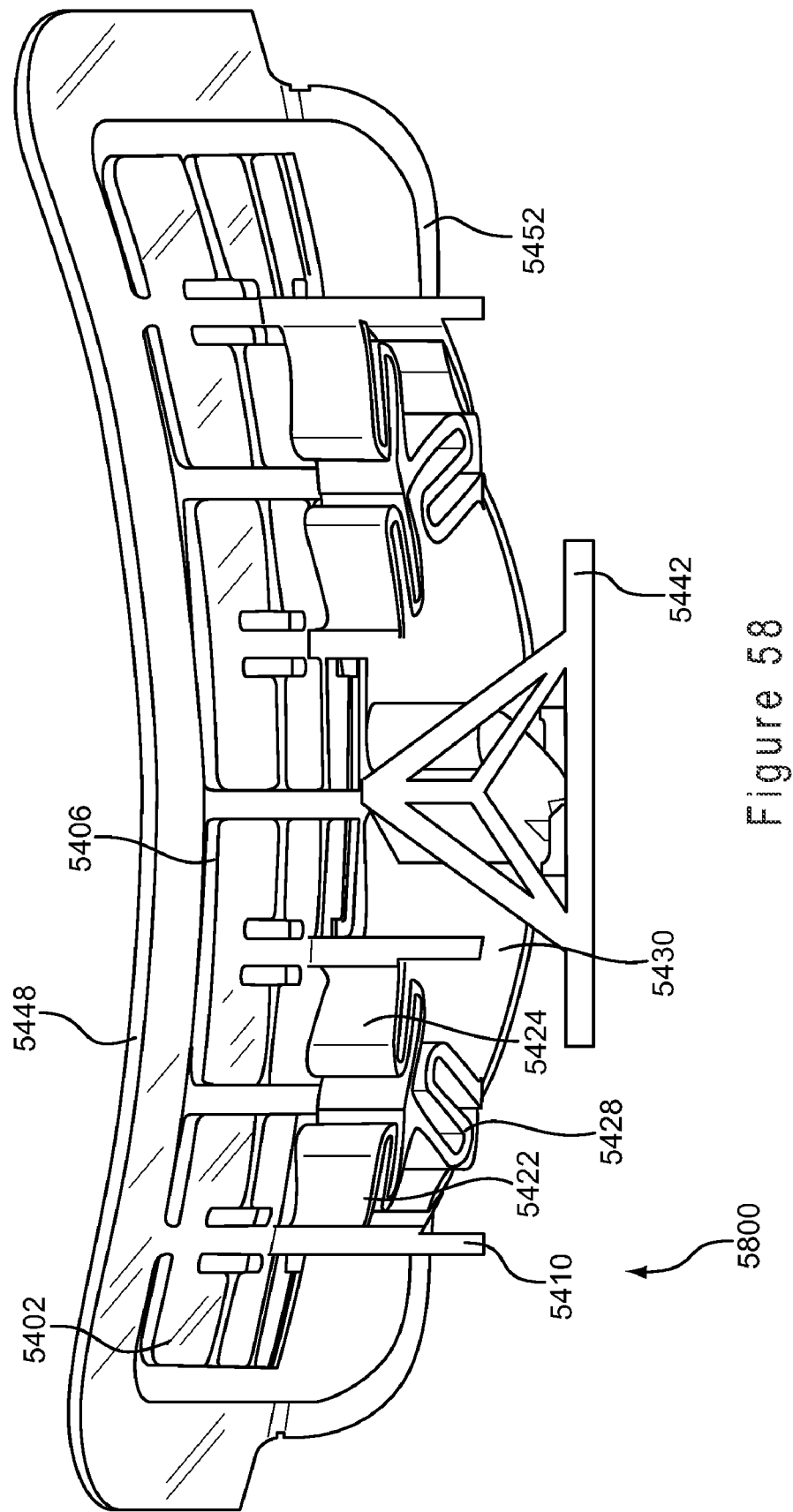
FIG. 58 shows a side view of a torsional pixelated support structure.

FIG. 55 shows a bottom perspective view 5500 of a torsional pixelated support structure. The perspective view 5500 (and side view 5800) shows that the mounting points may be formed from a triangular truss structure. The mounting points may be formed in other manners, however. FIG. 56 shows an enlarged view 5600 of a portion of the support structure 5400. FIG. 57 shows a side view 5700 of the support structure 5400. FIG. 58 shows a side view 5800 of the support structure 5400.

Figure 59:
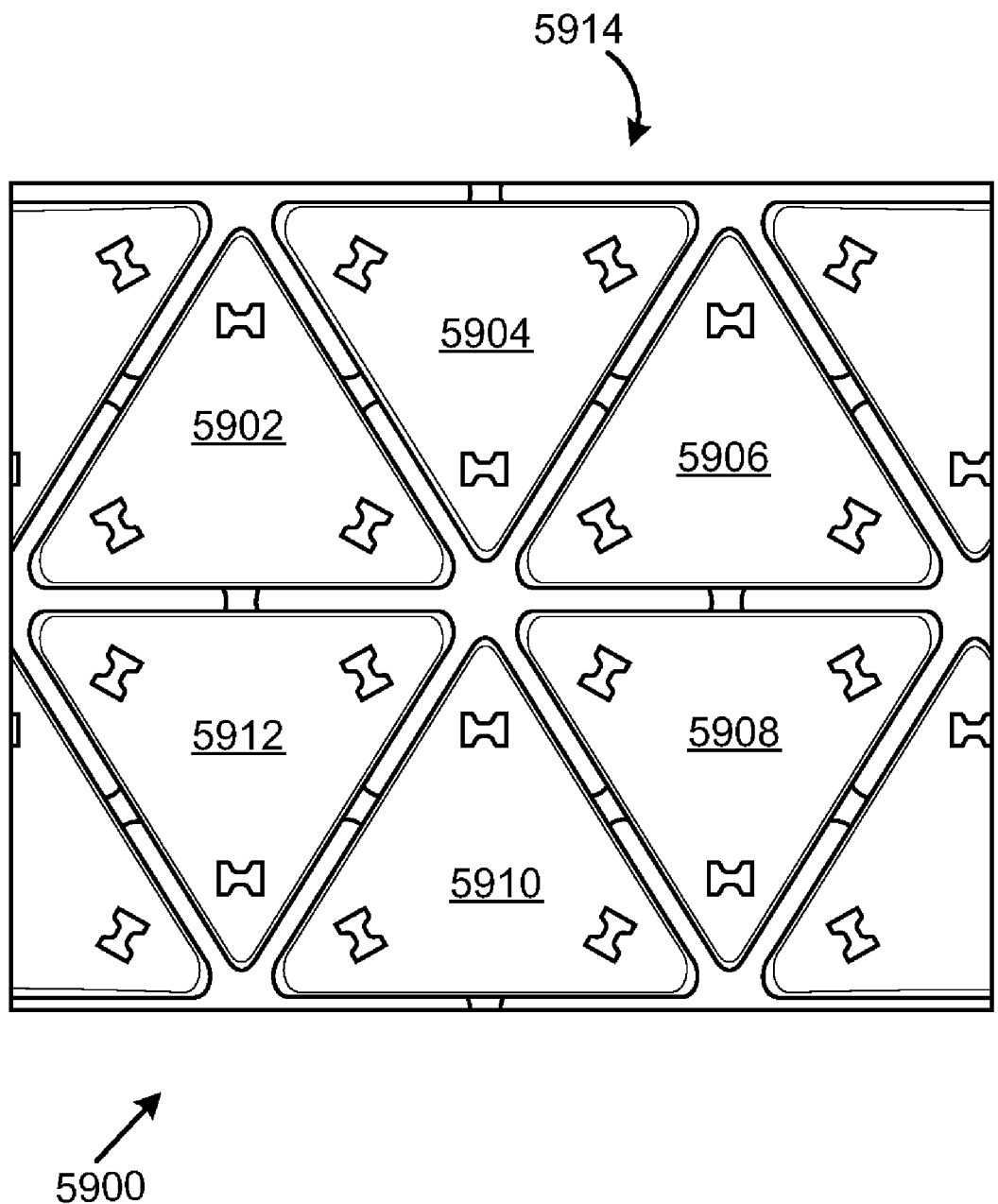
FIG. 59 shows a triangular load bearing element.

FIG. 59 shows triangular load bearing elements 5902, 5904, 5906, 5908, 5910, and 5912 arranged in a hexagonal set 5914. The load bearing elements 5902-5912 are shown as equilateral triangles approximately 3 inches on a side. However, the load bearing elements 5902-5912 may vary widely in size, shape, and material. In other implementations, the load bearing elements 5902-5912 may be 0.5-1.5 inches on a side, for example approximately 1 inch on each side. The load bearing element size and shape may vary across any support structure that incorporates the load bearing elements 5902-5912, for example to tailor support to a specific body part. The load bearing elements may be formed from polypropylene, thermoplastic elastomers, Hytrel™ material, polyethylene, polyamide (with or without fillers), glass filed nylon, fiberglass, or other materials.

Figure 60:
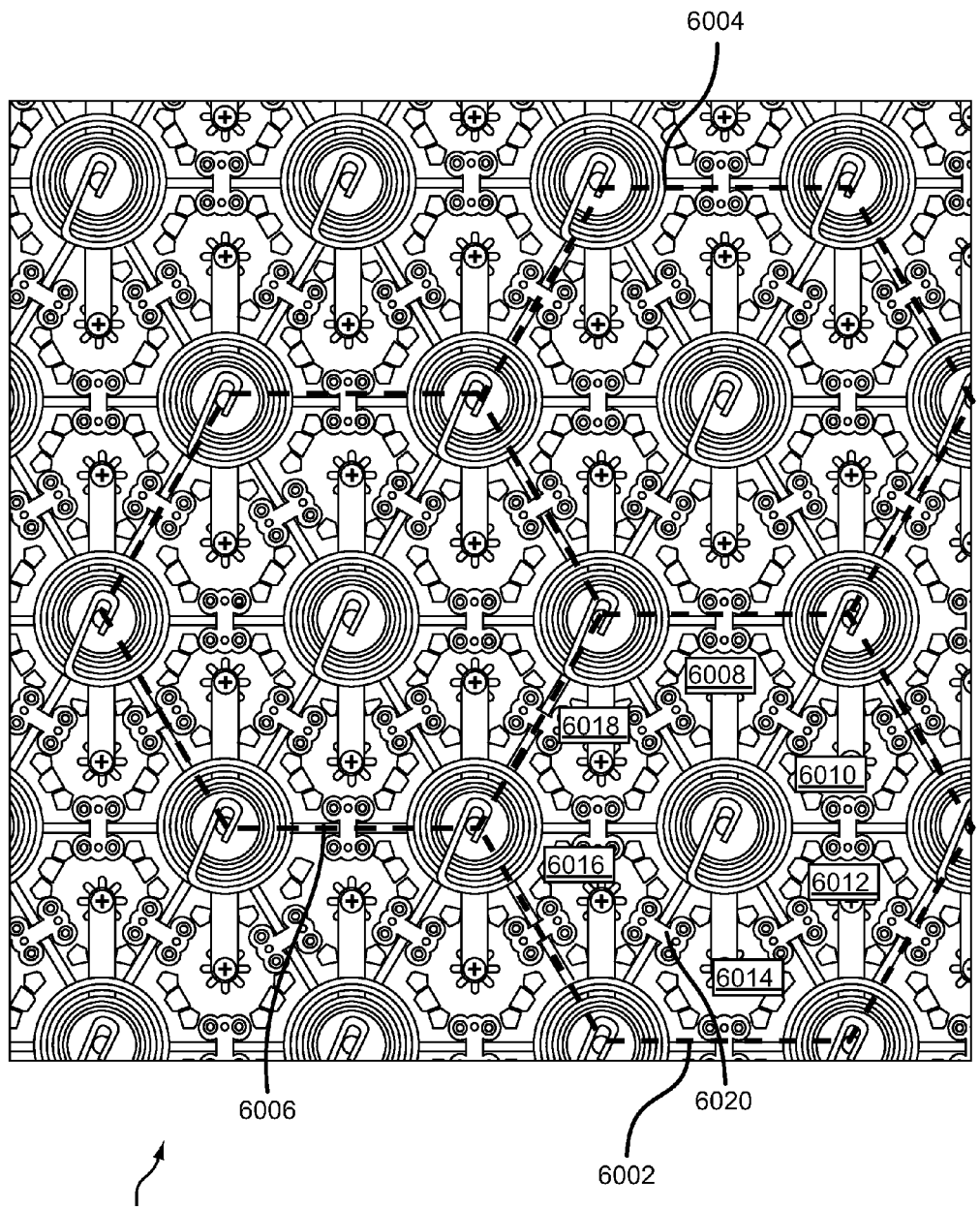
FIG. 60 shows a bottom view of a pixelated support structure.

FIG. 60 shows a bottom view of a pixelated support structure 6000 that incorporates hexagonal sets of the load bearing elements. Three hexagonal sets are labeled 6002, 6004, and 6006. The hexagonal set 6002, for example, includes the load bearing elements 6008, 6010, 6012, 6014, 6016, and 6018.

As shown in FIG. 60, the load bearing elements may be connected together to form load bearing surfaces. The load bearing surface may include injected molded sections that define multiple connected load bearing elements. One or more bridges between load bearing elements may permit the load bearing elements to twist or flex (e.g., an approximately flat bar bridge), to displace from one another (e.g., a bar connection with a U-shape or undulation out of the plane of the load bearing elements), or permit the load bearing elements freedom of motion or rotation in other directions or along other axes. Alternatively, one or more of the bridges may be substantially stiff and may hold the load bearing elements in place without rotation or translation.

Alternatively or additionally, one or more individually formed load bearing elements may be connected through individually formed bridges between the load bearing elements. For example, the bridge 6020 connects the load bearing elements 6008 and 6010. The bridge 6020 may be located approximately half way along one edge of each load bearing element 6008, 6010, although other locations are also suitable. The bridges may be secured to the load bearing elements using fasteners such as screws, bolts, interference fits, snap fits, or other securing mechanisms.

The bridge 6020 may take many shapes and forms to provide any desired freedom of movement or flexion to the load bearing elements. For example, the bridge 6020 may include an approximately flat connection between each load bearing element to prevent load bearing elements from separating from one another. Alternatively, the bridge 6020 may include a U-shape, undulation, or other displacement of material between load bearing elements that permits the load bearing elements to displace away from one another.

Figure 61:
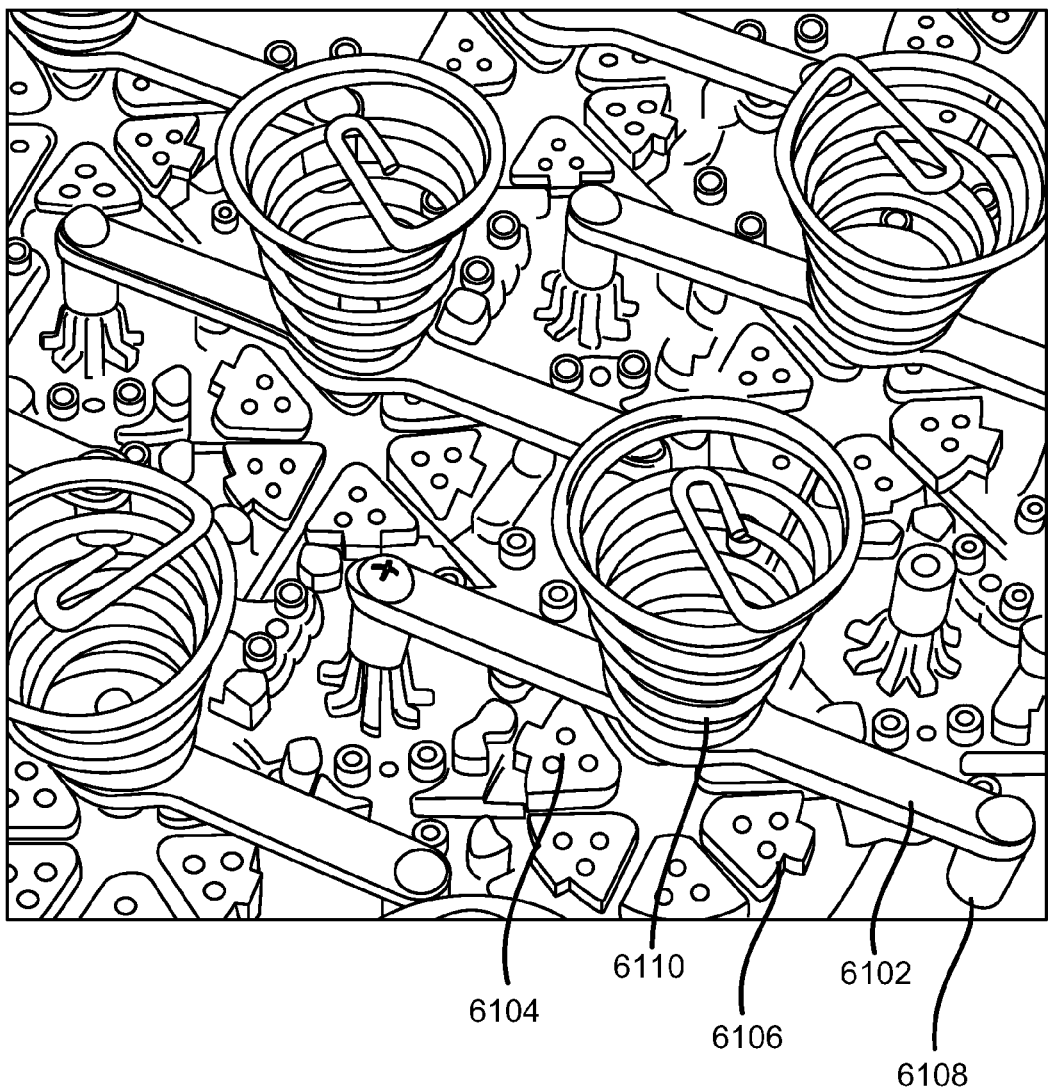
FIG. 61 shows an isometric view of a pixelated support structure.

The load bearing surface may include multiple tiers of support elements, including the load bearing elements as a first tier. FIG. 61 shows a perspective view of a portion of a second support tier and a portion of a third support tier. As shown in FIG. 61, the second tier of support elements may include connection bars 6102 between load bearing elements (e.g., between the load bearing elements 6104 and 6106). The connection bars 6102 may be vertically displaced from the load bearing elements by shockmounts 6108.

The connection bars 6102 may be made from spring steel to impart substantially stiffness to the connection bar. Alternatively, one or more connection bars 6102 may be made from nylon, or other flexible materials. The connection bars may be secured to the shockmounts 6108 through a screw, bolt, snap fit, or other fastener. Similarly, the shockmounts 6108 may be secured to the load bearing elements 6104, 6106 through a screw, bolt, snap fit, threaded connection, or other fastening mechanism. In other implementations, the shockmounts 6108 may be implemented as injected molded ball and socket joints.

The third support tier may include conical springs 6110, cantilever springs, or other support elements connected to the first tier. The third support tier may connect to an underlying frame. The underlying frame may define a chair seat, chair back, or any other load bearing structure.

The multiple tier load bearing surface shown in FIG. 60 provides support over substantially all of its surface. As an individual sits on the surface, multiple support elements in the second and third tiers take up the load and provide support. For example, the conical springs, located at the centers of the hexagonal sets, assist neighboring conical springs to take up loads that are centered between the springs.

The pixelated support elements and structures may be employed in a wide range of designs for supporting the body, including seats, backrests, mattresses, and the like. The pixelated support elements and structures provide enhanced ergonomic body support structures that may be adapted to provide excellent fit and comfort tailored to individual body parts, as well as healthy support for the body, across a wide range of individual body types.

It is therefore intended that the foregoing detailed description be regarded as illustrative rather than limiting, and that it be understood that it is the following claims, including all equivalents, that are intended to define the spirit and scope of this invention.

The invention claimed is:

1. A load bearing body-support structure comprising:
a first layer comprising an elastomeric member, said elastomeric member elongatable between at least a first and second condition in response to a load being applied perpendicular to said first layer, wherein said elastomeric member has a first spring rate in a direction perpendicular to said first layer, and wherein said elastomeric member is in tension when in said second condition;
a second layer comprising a plurality of pixelated load bearing elements each having a body-facing surface, wherein at least some adjacent pairs of pixelated load bearing elements are spaced apart in a first direction, said pixelated load bearing elements of each pair are spaced apart and interconnected with connector elements that are arranged in parallel relationship in a second direction substantially perpendicular to said first direction; and
at least one spring disposed between said first and second layers, said at least one spring having a second spring rate, wherein said second spring rate is less than said first spring rate.

2. The load bearing body-support structure of claim 1 where said first layer comprises a plurality of pixelated load bearing elements, and where said at least one spring comprises a plurality of springs disposed between said plurality of pixelated load bearing elements of said first layer and said plurality of pixelated load bearing elements of said second layer.

3. The load bearing body-support structure of claim 2 where said plurality of pixelated load bearing elements of said first layer are integrally formed and interconnected as a single piece of material.

4. The load bearing body-support structure of claim 3 where said plurality of pixelated load bearing elements of said first layer are interconnected with a plurality of connector elements.

5. The load bearing body-support structure of claim 4 where said plurality of connector elements are disposed below a support surface of adjacent ones of said plurality of pixelated load bearing elements of said first layer.

6. The load bearing body-support structure of claim 4 where said plurality of connector elements comprise living hinges.

7. The load bearing body-support structure of claim 6 where said living hinges comprise a V-shape.

8. The load bearing body-support structure of claim 1 where said plurality of pixelated load bearing elements of said second layer are integrally formed and interconnected as a single piece of material.

9. The load bearing body-support structure of claim 1 where said plurality of connector elements comprise living hinges.

10. The load bearing body-support structure of claim 9 where said living hinges comprise a V-shape.

11. A load bearing body-support structure comprising:
a first layer comprising an elastomeric material, said elastomeric material elongatable between at least a first and second condition in response to a load being applied perpendicular to said first layer, wherein said elastomeric material has a first spring rate in a direction perpendicular to said first layer, and wherein said elastomeric material is in tension when in said second condition;
a second layer comprising a compressible member supported by the first layer, said compressible member having a second spring rate, wherein said second spring rate is less than said first spring rate; and
a third layer supported by said second layer and defining a body-facing surface, wherein said third layer comprises a plurality of nodes spaced apart in at least one direction, wherein said plurality of nodes are interconnected with a plurality of connector elements disposed below said body-facing surface of adjacent ones of said plurality of nodes, wherein at least some adjacent pairs of nodes are spaced apart in a first direction, said nodes of each pair are spaced apart and interconnected with connector elements that are arranged in parallel relationship in a second direction substantially perpendicular to said first direction.

12. The load bearing body-support structure of claim 11 wherein said compressible member comprises at least one spring.

13. The load bearing body-support structure of claim 11 wherein said first layer comprises a plurality of nodes spaced apart in at least one direction with a gap formed therebetween.

14. The load bearing body-support structure of claim 13 wherein said compressible member comprises a plurality of springs supported by corresponding ones of said plurality of nodes.

15. The load bearing body-support structure of claim 13 wherein said plurality of nodes are integrally formed and interconnected as a single piece of material.

16. The load bearing body-support structure of claim 15 where said plurality of nodes of said first layer are interconnected with a plurality of connector elements.

17. The load bearing body-support structure of claim 16 where said plurality of connector elements are disposed below a support surface of adjacent ones of said plurality of nodes of said first layer.

18. The load bearing body-support structure of claim 16 where said plurality of connector elements comprise living hinges.

19. The load bearing body-support structure of claim 18 where said living hinges comprise a V-shape.

20. The load bearing body-support structure of claim 11 wherein said third layer is directly supported by said second layer.

21. The load bearing body-support structure of claim 11 wherein said compressible member comprises a plurality of springs supporting corresponding ones of said plurality of nodes of said third layer.

22. A load bearing body-support structure comprising:
a first layer comprising an elastomeric material, said elastomeric material elongatable between at least a first and second condition in response to a load being applied perpendicular to said first layer, wherein said elastomeric material has a first spring rate in a direction perpendicular to said first layer, and wherein said elastomeric material is in tension when in said second condition;
a second layer comprising a compressible member supported by the first layer, said compressible member having a second spring rate, wherein said second spring rate is less than said first spring rate; and
a third layer supported by said second layer and defining a body-facing surface, wherein said third layer comprises a plurality of nodes spaced apart in at least a first direction with a gap formed between adjacent ones of said plurality of nodes spaced apart in at least said first direction, wherein said plurality of nodes of said third layer are interconnected with a plurality of connector elements having at least a portion thereof disposed below said body-facing surface of adjacent ones of said plurality of nodes of said third layer, wherein at least some adjacent pairs of nodes wherein at least some adjacent pairs of nodes are spaced apart in said first direction, said nodes of each pair are spaced apart and interconnected with connector elements that are arranged in parallel relationship in a second direction substantially perpendicular to said first direction.

23. The load bearing body-support structure of claim 22 wherein said first layer comprises a plurality of nodes spaced apart in at least said first direction with a gap formed between adjacent ones of said plurality of nodes spaced apart in at least said first direction.

24. The load bearing body-support structure of claim 23 wherein said plurality of nodes of said first layer are interconnected with a plurality of connector elements in at least a second direction substantially perpendicular to at least said first direction.

* * * * *